(12) United States Patent
Lee et al.

(10) Patent No.: US 10,573,884 B2
(45) Date of Patent: Feb. 25, 2020

(54) IONIC LIQUID-ENABLED HIGH-ENERGY LI-ION BATTERIES

(71) Applicants: Se-Hee Lee, Superior, CO (US); Daniela Molina Piper, Boulder, CO (US); Tyler Evans, Boulder, CO (US)

(72) Inventors: Se-Hee Lee, Superior, CO (US); Daniela Molina Piper, Boulder, CO (US); Tyler Evans, Boulder, CO (US)

(73) Assignee: Regents Of The University Of Colorado, A Body Corporate, Denver, CO (US)

( * ) Notice: Subject to any disclaimer, the term of this patent is extended or adjusted under 35 U.S.C. 154(b) by 73 days.

(21) Appl. No.: 15/544,836

(22) PCT Filed: Jan. 28, 2016

(86) PCT No.: PCT/US2016/015455
§ 371 (c)(1),
(2) Date: Jul. 19, 2017

(87) PCT Pub. No.: WO2016/123396
PCT Pub. Date: Aug. 4, 2016

(65) Prior Publication Data
US 2018/0006294 A1 Jan. 4, 2018

Related U.S. Application Data

(60) Provisional application No. 62/110,286, filed on Jan. 30, 2015, provisional application No. 62/151,918, filed on Apr. 23, 2015.

(51) Int. Cl.
*H01M 10/052* (2010.01)
*H01M 4/134* (2010.01)
(Continued)

(52) U.S. Cl.
CPC .......... *H01M 4/134* (2013.01); *H01M 4/131* (2013.01); *H01M 4/133* (2013.01); *H01M 4/386* (2013.01);
(Continued)

(58) Field of Classification Search
CPC ................ H01M 10/052; H01M 10/0525
See application file for complete search history.

(56) References Cited

U.S. PATENT DOCUMENTS 5,240,794 A 8/1993 Thackeray et al.
7,618,678 B2 11/2009 Mao et al.
(Continued)

FOREIGN PATENT DOCUMENTS

| CN | 102820483 A | 12/2012 |
| WO | WO2013169826 | * 11/2013 |
| WO | 2016070120 A1 | 5/2016 |

OTHER PUBLICATIONS

PCT Application No. PCT/US2016/015455. International Search Report and Written Opinion, dated Jun. 17, 2016, 12 pages.
(Continued)

*Primary Examiner* — Olatunji A Godo
(74) *Attorney, Agent, or Firm* — Perkins Coie LLP

(57) ABSTRACT

Various embodiments of the present disclosure describe energy storage devices. In one example, an energy storage device includes an anode having a plurality of active material particles, a cathode having a transition metal oxide material, and an electrolyte including a room temperature ionic liquid to couple the anode to the cathode. Each of the plurality of anode active material particles have a particle size of between about one micrometer and about fifty micrometers. One or more of the plurality of anode active material particles are enclosed by and in contact with a membrane coating permeable to lithium ions.

24 Claims, 37 Drawing Sheets

(51) Int. Cl.

| | |
|---|---|
| H01M 4/131 | (2010.01) |
| H01M 4/505 | (2010.01) |
| H01M 4/525 | (2010.01) |
| H01M 10/0525 | (2010.01) |
| H01M 4/485 | (2010.01) |
| H01M 10/0568 | (2010.01) |
| H01M 10/0569 | (2010.01) |
| H01M 4/133 | (2010.01) |
| H01M 10/44 | (2006.01) |
| H01M 4/38 | (2006.01) |
| H01M 4/36 | (2006.01) |
| H01M 4/02 | (2006.01) |

(52) U.S. Cl.
CPC ........... *H01M 4/485* (2013.01); *H01M 4/505* (2013.01); *H01M 4/525* (2013.01); *H01M 10/0525* (2013.01); *H01M 10/0568* (2013.01); *H01M 10/0569* (2013.01); *H01M 10/44* (2013.01); *H01M 10/448* (2013.01); *H01M 4/366* (2013.01); *H01M 2004/027* (2013.01); *H01M 2300/0045* (2013.01)

(56) References Cited

U.S. PATENT DOCUMENTS

| | | | |
|---|---|---|---|
| 8,158,282 B2 | 4/2012 | Zhamu et al. | |
| 8,986,880 B2 | 3/2015 | Odani et al. | |
| 2005/0136330 A1 | 6/2005 | Mao et al. | |
| 2008/0083901 A1* | 4/2008 | Park | H01M 4/131 252/182.1 |
| 2009/0202913 A1* | 8/2009 | Sakaguchi | H01M 4/0452 429/231.95 |
| 2010/0159334 A1 | 6/2010 | Kashima et al. | |
| 2011/0111294 A1* | 5/2011 | Lopez | H01M 4/134 429/217 |
| 2011/0129731 A1* | 6/2011 | Wakizaka | H01M 4/0435 429/217 |
| 2012/0021297 A1* | 1/2012 | Hauser | H01M 2/16 429/303 |
| 2012/0059129 A1 | 3/2012 | He et al. | |
| 2012/0082903 A1 | 4/2012 | Zhang et al. | |
| 2012/0316716 A1* | 12/2012 | Odani | H01M 10/0567 701/22 |
| 2013/0040203 A1* | 2/2013 | Yoon | H01M 4/1393 429/231.8 |
| 2013/0045420 A1 | 2/2013 | Biswal et al. | |
| 2014/0087250 A1 | 3/2014 | Coowar et al. | |
| 2014/0106215 A1 | 4/2014 | Nanda et al. | |
| 2014/0154572 A1* | 6/2014 | Singh | H01M 4/525 429/215 |
| 2014/0186701 A1 | 7/2014 | Zhang et al. | |
| 2017/0338474 A1 | 11/2017 | Lee et al. | |

OTHER PUBLICATIONS

Liu, XH, et al. "Size-dependent fracture of silicon nanoparticles during lithiation," ACS Nano. 2012, vol. 6. No. 2; abstract; pp. 1522, 1528.

Wang, C et al. "Self-healing chemistry enables the stable operation of silicon microparticle anodes for high-energy lithium-ion batteries," Nature Chemistry. 2013. vol. 5. No. 12, 7 pages.

Piper, Daniela Molina et al., "Stable silicon-ionic liquid interface for next-generation lithium-ion batteries," Nature Communications, vol. 6, Feb. 25, 2015, 10 pages.

Fang, S. et al., "High performance three-dimensional GE/cyclized-polyacrylonitrile thin film anodes prepared by RF magnetron sputtering for lithium ion batteries," Journal of Materials Science, Mar. 2014, vol. 49, Issue 5, pp. 2279-2285, on-line Dec. 12, 2013, 9 pages.

Piper, Daniela Molina, et al., "Conformal Coatings of Cyclized-PAN for Mechanically Resilient Si nano-Composite Anodes," Advanced Energy Materials, vol. 3, Issue 6, Mar. 7, 2013, pp. 697-702, Wiley Online Library.

Piper, Daniela Molina, et al., "Hierarchical Porous Framework of Si-Based Electrodes for Minimal Volumetric Expansion," Advanced Materials, vol. 26, Jun. 13, 2014, pp. 3520-3525, Wiley Online Library.

Supplementary European Search Report for European Patent Application No. PCT/US2016/015455, dated May 3, 2018 from the European Patent Office, 8 pages.

European Patent Office, Communication pursuant to Article 94(3) EPC for Application No. 16744138.5, dated Mar. 26, 2019, 5 pages.

Taiwan Intellectual Property Office, Examination Report for Application No. 105102981, dated Jun. 17, 2019.

* cited by examiner

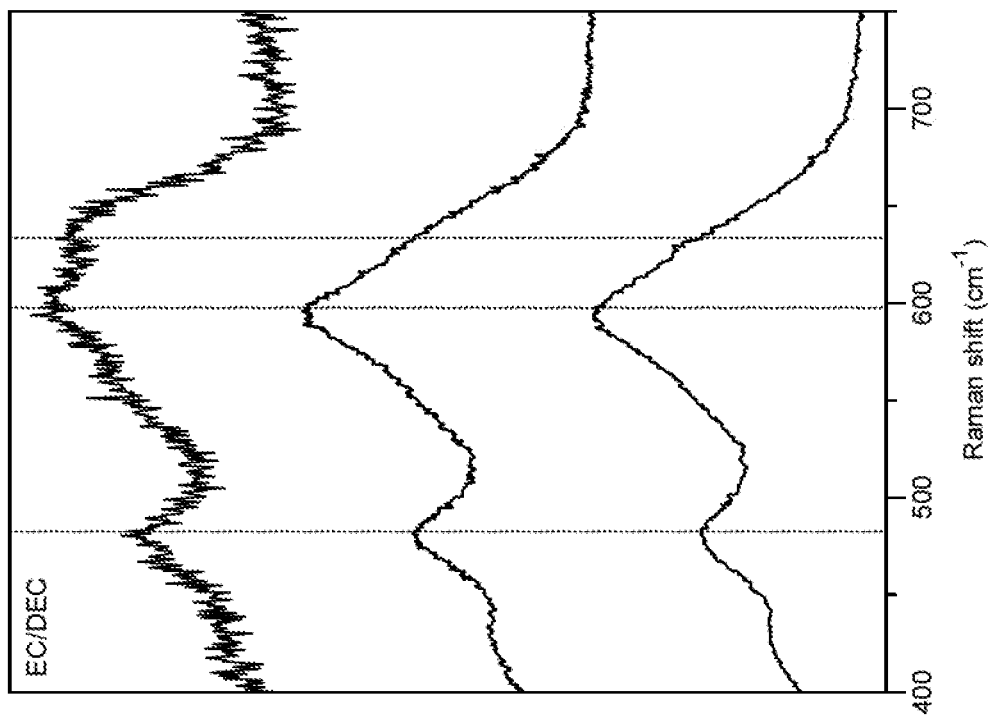
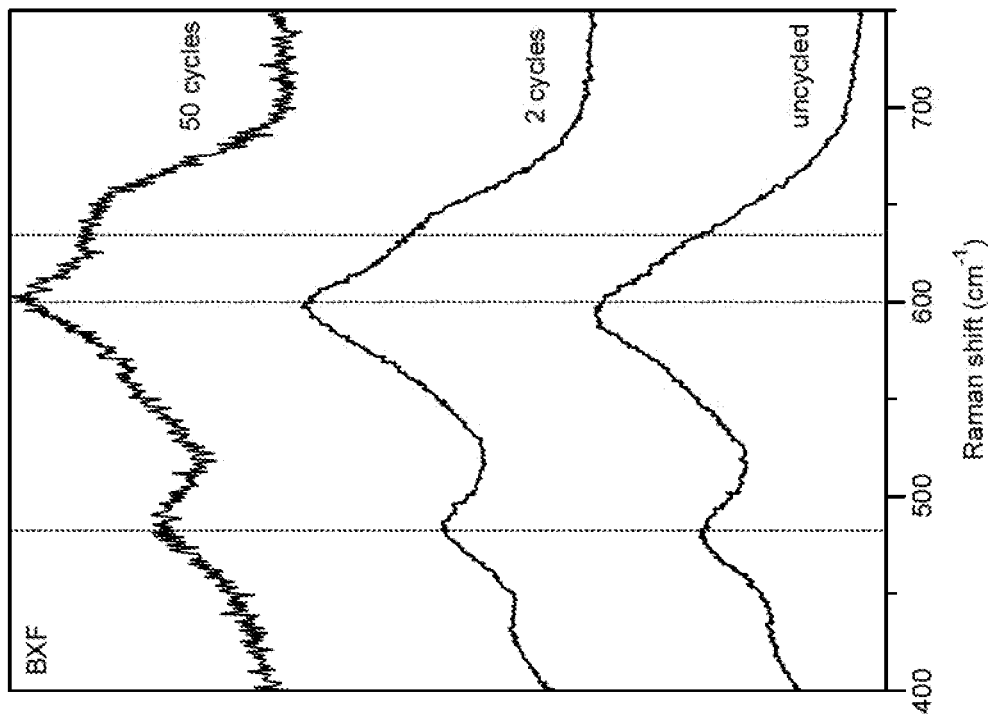
FIG. 15A
FIG. 15B

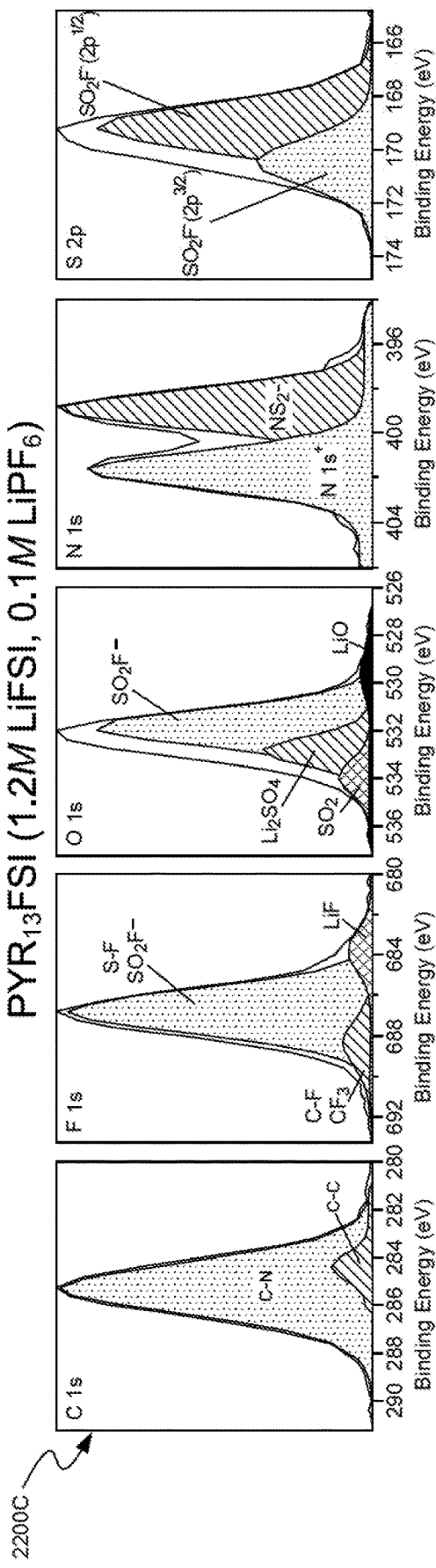
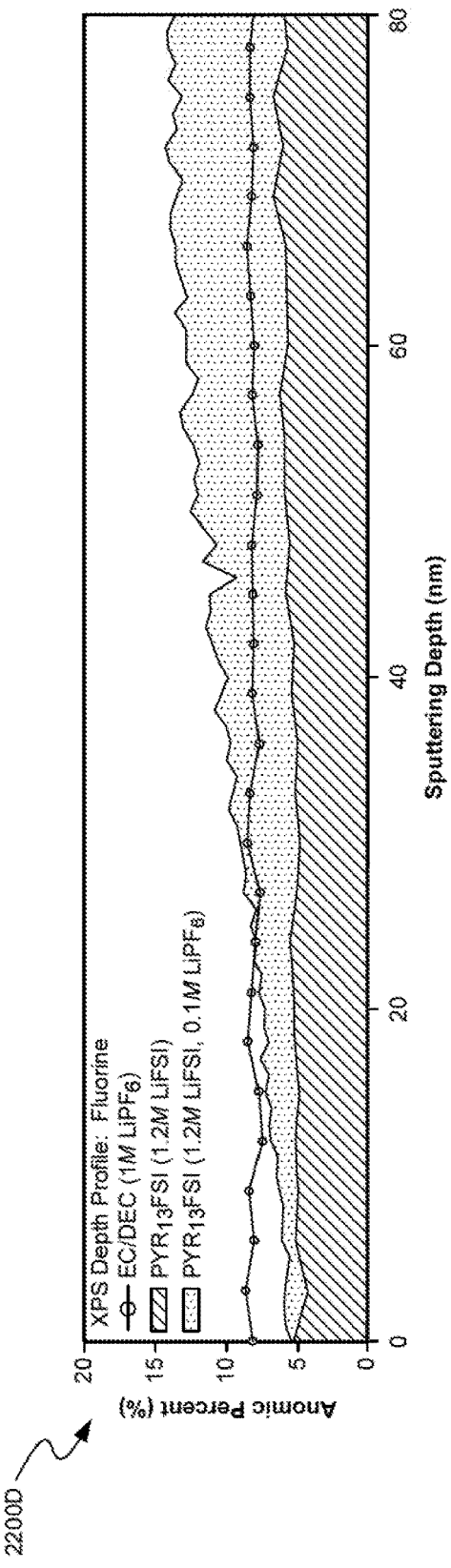
FIG. 22C
FIG. 22D

IONIC LIQUID-ENABLED HIGH-ENERGY LI-ION BATTERIES

RELATED APPLICATIONS

This application is a 35 USC § 371 National Stage application of International Application No. PCT/US2016/015455, entitled "IONIC LIQUID-ENABLED HIGH-ENERGY LI-ION BATTERIES," filed on Jan. 28, 2016, which claims priority to U.S. Provisional Application No. 62/110,286, filed Jan. 30, 2015, and U.S. Provisional Application No. 62/151,918, filed Apr. 23, 2015, the contents of which are incorporated by reference herein in their entireties.

STATEMENT REGARDING FEDERALLY SPONSORED RESEARCH

This invention was made with government support under grant number DMR 1206462 awarded by the National Science Foundation. The government has certain rights in the invention.

TECHNICAL FIELD

This disclosure relates to energy storage devices such as lithium-ion electrochemical cells and batteries. More specifically, the disclosure relates to anodes, cathodes, and electrolytes separately and in combination as used in, e.g., lithium-ion energy storage devices and batteries.

BACKGROUND

Rechargeable lithium-ion ("Li-ion") batteries often use expensive and toxic materials, such as cobalt. In addition, current lithium-ion batteries using high-capacity and highly energy dense electrode materials typically fail after a relatively small number of charging and discharging cycles. Some currently existing Li-ion technologies have energies of about 230-270 Wh/kg at a price point of about $300/kWh. However, the Department of Energy and the automotive industry have targeted an improvement in energy to 400 Wh/kg at a price point of approximately $200/kWh. Incorporating high-energy materials may help to improve energy and lower price. Such Li-ion configurations may include a Silicon (Si) anode and a nickel-rich nickel-manganese-cobalt (NMC) or lithium-manganese-rich (LMR) cathode.

Silicon is one of the most attractive high-energy anode materials for use in lithium-ion batteries. Silicon has a low working voltage and high theoretical specific capacity of 3579 mAh/g, nearly ten times higher than that of currently known graphite electrodes. Despite these advantages, a silicon anode has serious disadvantages that discourage its use in a commercial battery. One of these disadvantages is associated with silicon's severe volume expansion during lithiation. While a commercialized graphite electrode expands roughly 10-13% during lithium intercalation, silicon's expansion is nearly 300%, generating structural degradation and instability of the solid-electrolyte interphase (SEI). Instability in the solid-electrolyte interphase in a silicon anode shortens the battery life to levels that render it unattractive for commercialization.

Degradation of the silicon active material has been mitigated by incorporating nanoscale materials including nanoparticles, nanowires, core-shell nanowires, nanotubes, yolk-shell nanoparticles, pomegranate structures, nanoporous structures, and/or nanocomposites. However, the size (below 500 nm in diameter) of these materials, their processing requirements, and the elaborate nano-architectures required for their use in anodes mean that they cannot be produced by commercially viable processes. It is desirable to develop a truly scalable silicon anode capable of effectively utilizing larger, low-cost active material particles while still achieving excellent battery cycling performance. Unfortunately, previous attempts to use large silicon particles showed fast capacity decay or utilized complex tailored binders to mitigate the electrode degradation.

Moreover, the aforementioned nano-material electrode architectures, despite providing significant improvements to silicon electrode performance, lack the needed coulombic efficiency largely because the volume change during silicon alloying and de-alloying renders the solid-electrolyte interphase at the silicon-electrolyte interface mechanically unstable. The solid-electrolyte interphase layer forms on the anode surface through reductive decomposition of the electrolyte during charging of the battery. Silicon anodes suffer extensively from a dynamic solid-electrolyte interphase that must reform each cycle as expansion during lithiation causes the layer to break. Formation of the solid-electrolyte interphase consumes lithium ions and depletes electrolyte during every cycle. Alternative electrolyte compositions and active material surface treatments have been studied in the effort to enhance solid-electrolyte interphase formation on high-capacity anode materials and improve half-cell coulombic efficiency. In spite of these efforts, the coulombic efficiency achieved throughout cycling is still insufficient for a long lasting silicon-based full-cell.

Lithium-manganese-rich (LMR) layered oxides, also known as over-lithiated oxides (OLO), are of interest as cathode materials for lithium-ion batteries given their high capacities (greater than 250 mAh/g) and energy densities. A commonly studied over-lithiated oxide material is formulated as $(x)Li_2MnO_3(1-x)LiR_1O_2$ ($R_1$=Mn, Ni, Co) and is often described as being composed of layered $Li[Li_{1/3}Mn_{2/3}]O_2$ (generally designated as $Li_2MnO_3$) and $LiR_1O_2$ with a specific capacity of ~250 mAh/g. It has been proposed that these materials are composed of two phases, namely a parent trigonal layered $LiR_1O_2$ phase (space group [R-3m]) with monoclinic $Li_2MnO_3$-like (space group [C2/m]) components. This material may be referred to as both a "layered-layered" composited and a "solid solution."

Despite their high specific capacities, these materials are susceptible to rapid capacity fade due to the evolution of the $Li_2MnO_3$ and $LiR_1O_2$ parent structures towards a spinel phase during electrochemical cycling. This effect also results in a lower operating voltage, thereby damaging the energy density of the cell (often referred to as "voltage fade"). During the first charge cycle, this phase change is known to occur at the surface of the electrode particles in combination with oxygen evolution as $Li_2O$ is lost from the $Li_2MnO_3$ parent structure. During subsequent cycles, the layered to spinel phase change continues from particle shell to core, accompanied by the dissolution of Mn ($Mn^{2+}$). While the phase change occurring during the first cycle is seen as an "activation" step, the long-term phase change of the lithium-manganese-rich layered oxide material causes a gradual lowering in operating voltage of the cell and capacity degradation, rendering the material inadequate for utilization in lithium-ion batteries.

Various strategies have been employed in order to counteract the phase change in this material including doping the crystals with alkali atoms in an attempt to support the lithium layers or reducing the manganese content to restrict formation of the $Mn_{tetragonal}$ phase. However, these methods have found little success.

Ni-rich NMC materials also suffer from capacity fade due to metal leaching. These materials are also unstable at high temperatures and highly exothermic, which may lead to explosions in the presence of conventional electrolytes. The nickel-rich chemistries exhibit structural degradation and thermal instabilities; these problems worsen with higher nickel content, higher temperature, and higher cutoff voltages (>4.4 V vs. Li/Li$^+$). In general, Ni-rich cathode materials with a layered structure undergo structural degradation from the layered R-3m phase to the spinel-like Fd-3m phase and the rock-salt Fm-3m phase. This structural change is caused by the migration of the transition metal ions into the lithium layer during charge/discharge cycling. The metal ion migration leads to the layered-to-spinel phase transformation, and this transformation is exacerbated by cycling conditions such as high voltage and high temperature due to the increasing number of vacant Li sites during full delithiation and the diffusion of transition metal ions. This structural change leads to capacity fade (decreasing number of Li vacancies for intercalation and active material loss due to metal dissolution). Moreover, the decomposition of organic electrolytes at high voltages leads to higher interfacial resistances and increased rates of structural degradation. Conventional efforts aimed at solving the aforementioned problems with the LiNi$_x$M$_{1-x}$O$_2$ material may attempt to passivate the electrode-electrolyte interface using complex surface modifications, often with a conductive polymer. Despite resulting in improvements in cycling stability, such techniques do not address thermal instabilities/safety and are not sufficient for commercial application, which requires high stability for over 300 cycles.

SUMMARY

In some embodiments, an anode composition is described. The anode composition can include micron-sized Silicon particles (μSi particles) enclosed by a membrane permeable to lithium ions. In some embodiments, the membrane comprises a polymer, and the μSi particles have a diameter in the range of from 1 to 30 microns. Methods of preparing the anode composition and manufacturing anodes from the anode composition are also described herein.

In some embodiments, hybrid anode composites are described. The hybrid anode composites may include μSi particles in addition to conventional active materials such as graphite, with both materials being enclosed by or attached to a membrane permeable to lithium ions.

Various embodiments of the present disclosure include a lithium-ion battery containing an anode (μSilicon coated in polyacrylonitrile) and a cathode (either a lithium-manganese-rich oxide or nickel-rich oxide NMC cathode), both electrodes being enabled by a ionic liquid (IL or RTIL)-based electrolyte.

The technology described herein enables both a μSi/LMR battery and a μSi/Ni-rich NMC battery through the use of ionic liquid-based electrolyte compositions. The problems with μSi/LMR and μSi/Ni-rich NMC electrodes are solved (or mitigated to commercially viable levels) by the utilization of RTIL-based electrolyte compositions and modifications including fluorinated salt additives, fluorinated solvents, sulfone solvents, or other solvents including borates such as triethyl borate. The technology described herein solves problems found in both the μSi anode and the LMR and Ni-rich NMC cathodes using the same electrolyte. This may allow a full Li-ion battery to be built with a high amount of energy and low cost.

BRIEF DESCRIPTION OF THE DRAWINGS

FIG. 15 shows the Raman spectra of Li$_{1.35}$Ni$_{0.32}$Mn$_{0.68}$O$_2$ electrodes (85:7.5:7.5 et. % OLO:PVDF:AB) after 0, 2, and 50 cycles in RTIL PYR$_{13}$FSI (1.2M LiFSI) electrolyte (left) and conventional EC/DEC (1M LiPF$_6$) electrolyte (right).

FIG. 22C shows XPS analysis of the major elemental constituents forming the CEI on LMR electrodes after cycling in RTIL PYR$_{13}$FSI (1.2M LiFSI, 0.1M LiPF$_6$) electrolytes (including carbon, fluorine, oxygen, nitrogen, and sulfur).

FIG. 22D shows XPS depth profiling highlighting fluorine content in the CEI formed in each electrolyte of FIGS. 22A-22C.

DETAILED DESCRIPTION

In the following description, specific details are provided to impart a thorough understanding of the various embodiments of the invention. Upon having read and understood the specification, claims and drawings hereof, however, those skilled in the art will understand that some embodiments of the invention may be practiced without hewing to some of the specific details set forth herein. Moreover, to avoid obscuring the invention, some well-known methods, processes, devices, and systems finding application in the various embodiments described herein are not disclosed in detail.

μSi Anode

In some embodiments, an improved anode includes micron-sized silicon (μSi) and a self-containment mechanism. The improved anode allows for reversible cycling of the micron-sized silicon particles through the utilization of the self-containment mechanism. For large silicon particles (particles having a diameter of more than about 150 nanometers), the particles will pulverize during initial charge-discharge cycling. Rather than developing a complex architecture to mitigate this phenomenon, which is inherent in the material, the anode described herein utilizes a system by which the pulverization of the material is contained in a mechanically resilient enclosure. Consequently, the solid-electrolyte interphase (SEI), preferentially forming on the mechanically resilient enclosure, is not subject to a breakage-reformation behavior throughout cycling, as happens when the solid electrolyte interphase forms directly on the active anode material.

Figure 1:
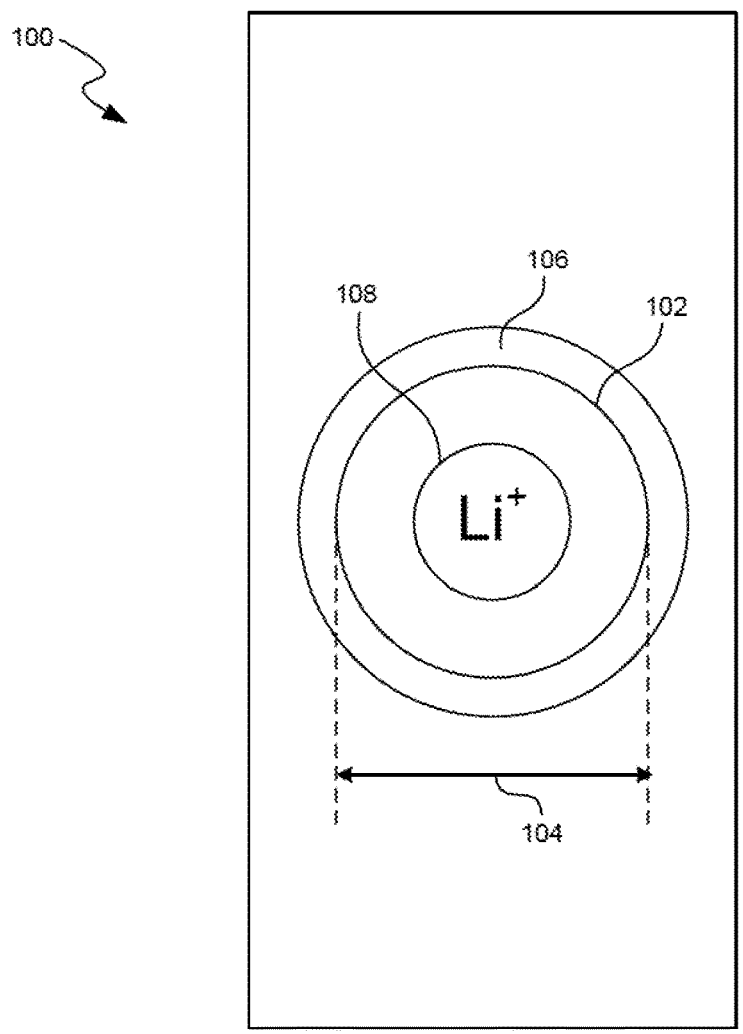
FIG. 1 shows a schematic representation of an anode including one or more active particles enclosed by a membrane in accordance with various aspects of the present disclosure.

FIG. 1 shows a schematic representation of an anode 100 according to various aspects disclosed herein. The anode 100 is an electrode into which positive electric charge (in the form of lithium cations) flows during normal operation (discharging) when incorporated into an energy storage and conversion device, such as a rechargeable lithium-ion battery. In some embodiments, the anode 100 includes one or more active material particles 102 (each having a diameter 104) enclosed by a membrane 106 permeable to lithium ions 108. Thus while FIG. 1 shows a single active material particle 102, multiple active material particles 102 may be enclosed by the membrane 106. The active material particles 102 are a source of electrons when the anode 100 is incorporated into an electrochemical cell.

The active material particles 102 are not limited to being formed from a particular material. In some embodiments, the active material particles 102 are formed from substantially silicon. Other exemplary materials suitable for use in connection with the forming of the active material particles 102 include a crystalline form of carbon (such as graphite), germanium, or a mixture of amorphous silicon and substantially crystalline silicon.

In some embodiments, each active material particle has a diameter 104 in the range of from about one to about fifty micrometers. The active material particles 102 are not limited to having a diameter 104 in the range of between about one and about fifty micrometers. In some embodiments, each active material particle 102 has a diameter 104 in a range of between about 500 nanometers and about one micrometer, one and about five micrometers, between about one and about ten micrometers, between about one and about twenty micrometers, between about ten and about twenty micrometers, between about ten and about fifty micrometers, or between about twenty and about fifty micrometers. In some embodiments, the active material particles 102 comprising the anode composite may include a mixture of particle sizes ranging from about 500 nanometers to about fifty micrometers.

In some embodiments, the membrane 106 is a flexible structure enclosing each of the one or more active material particles 102. In some embodiments, the membrane 106 may enclose one or multiple active material particles 102. In some embodiments, the membrane 106 includes a conductive material. In some embodiments, the conductive material includes a mechanically resilient polymer (a polymer having the ability to expand and contract with minimal mechanical failure), such as polyacrylonitrile (PAN). In some embodiments, the polymer is self-cyclizing with heat treatment. In some embodiments, the polymer comprises cyclized polyacrylonitrile (cPAN).

In some embodiments, the ratio, by weight, of the active material particles 102 to the membrane 106 can be selected to improve the performance of the anode when incorporated into a lithium-ion battery. In some embodiments, the weight ratio of the one or more active material particles 102 to the membrane 106 is about 7 to about 3. In some embodiments, the weight ratio of the one or more active material particles 102 to the membrane 106 is about 8 to about 2. In some embodiments, the weight ratio of the one or more active material particles 102 to the membrane 106 is about 9 to about 1.

Figure 2:
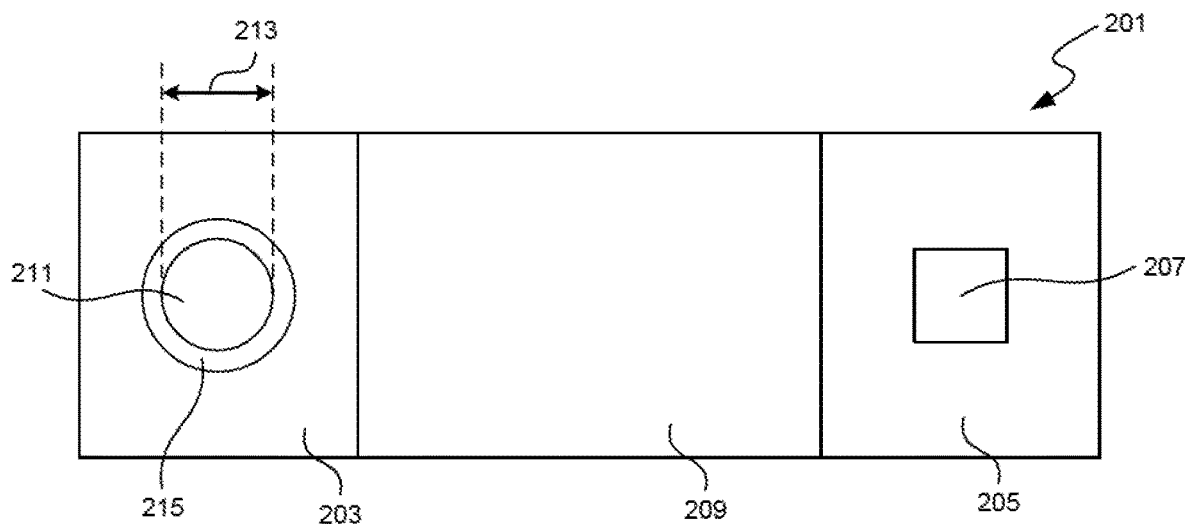
FIG. 2 shows a block diagram of an example energy storage device in accordance with various aspects of the present disclosure.

FIG. 2 shows a block diagram of an example of an energy storage device 201 incorporating the μSi anode described previously. The energy storage device 201 includes a μSi anode 203, a cathode 205 including a transition metal oxide material 207, and a room temperature ionic liquid (RTIL) electrolyte 209 contacting the anode 203 and the cathode 205. In operation, the energy storage device 201 converts chemical energy into electrical energy. In some embodiments, the energy storage device 201 is a rechargeable lithium-ion electrochemical cell or battery.

While in some embodiments the anode 203 is μSi anode as described previously, in other embodiments, the anode 203 is not limited to being formed using a particular material, but rather can be formed from a variety of materials.

In some embodiments, a method for making the μSi anode as described previously includes mixing a polymer and an active material to form a polymer active material mix, combining the polymer active material mix and a solvent to form a slurry, blading the slurry onto a current collector, and applying heat to the current collector including the slurry. In some embodiments, mixing the polymer and the active material to form a polymer active material mix includes mixing polyacrylonitrile and one or more silicon particles having a diameter of between about one micrometer and about fifty micrometers. In some embodiments, combining the polymer and the solvent to form a slurry includes combining polyacrylonitrile and polar organic solvents to form the slurry.

Figure 3A:
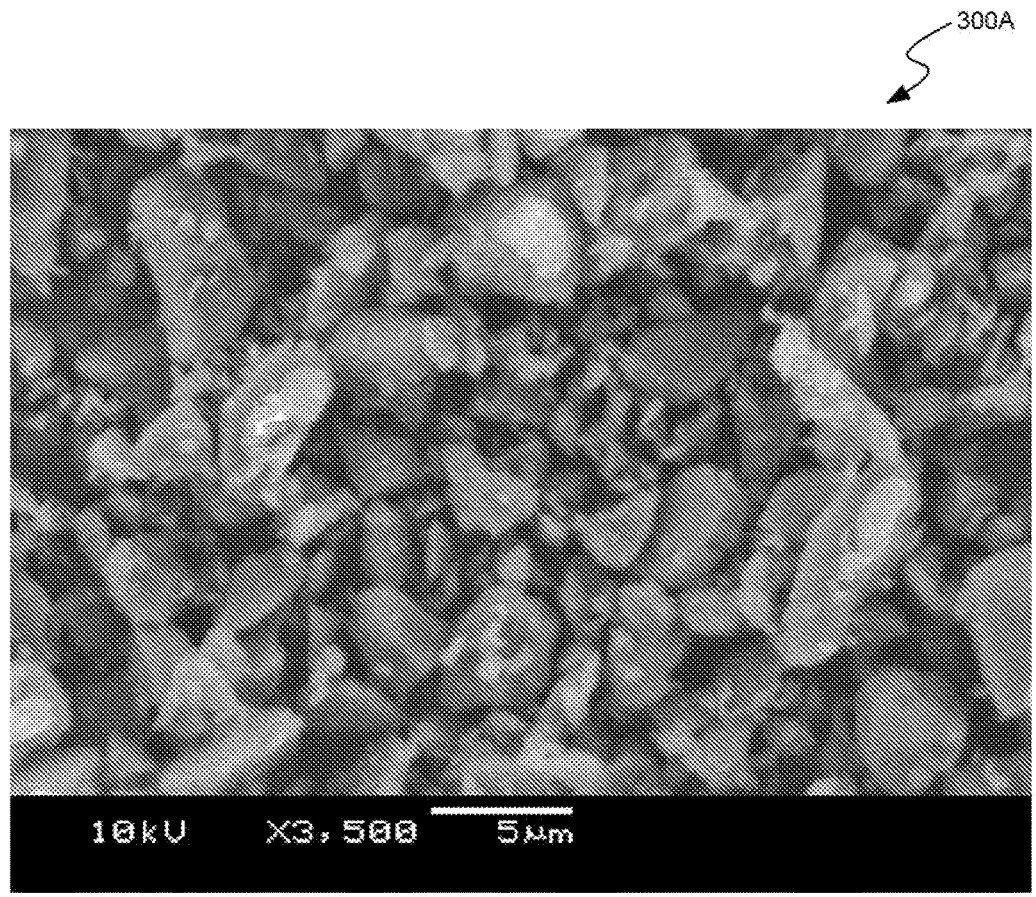
FIG. 3A shows a SEM micrograph of coarse μSi material that can be utilized in the anodes.
Figure 3B:
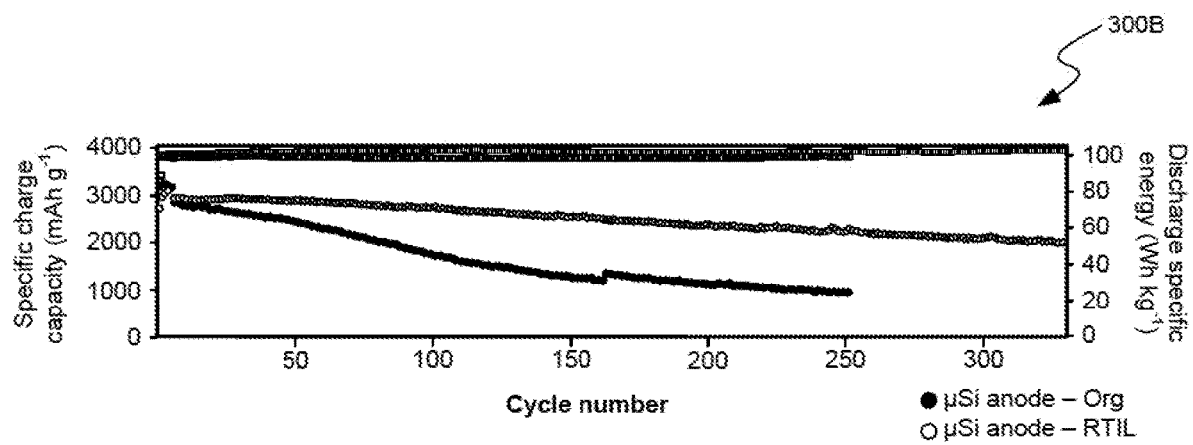
FIG. 3B shows half-cell electrochemical data of μSi-cPAN anodes cycled in EC/DEC and RTIL.

When used in combination with an imide-based room temperature ionic liquid (RTIL) electrolyte, such as $PYR_{13}FSI$ (LiFSI), the μSi anode shows high performance. In addition, the μSi anode also enables relatively high performance in conventional, organic electrolyte as shown in FIGS. 3A and 3B, demonstrating the effectiveness of the self-contained fragmentization mechanism. FIG. 3A shows a SEM micrograph 300A of one type of μSi material (Alfa Aesar, USA) that can be utilized in the anodes. FIG. 3B shows half-cell electrochemical data 300B of μSi-cPAN anodes cycled in EC/DEC and RTIL.

Figure 4:
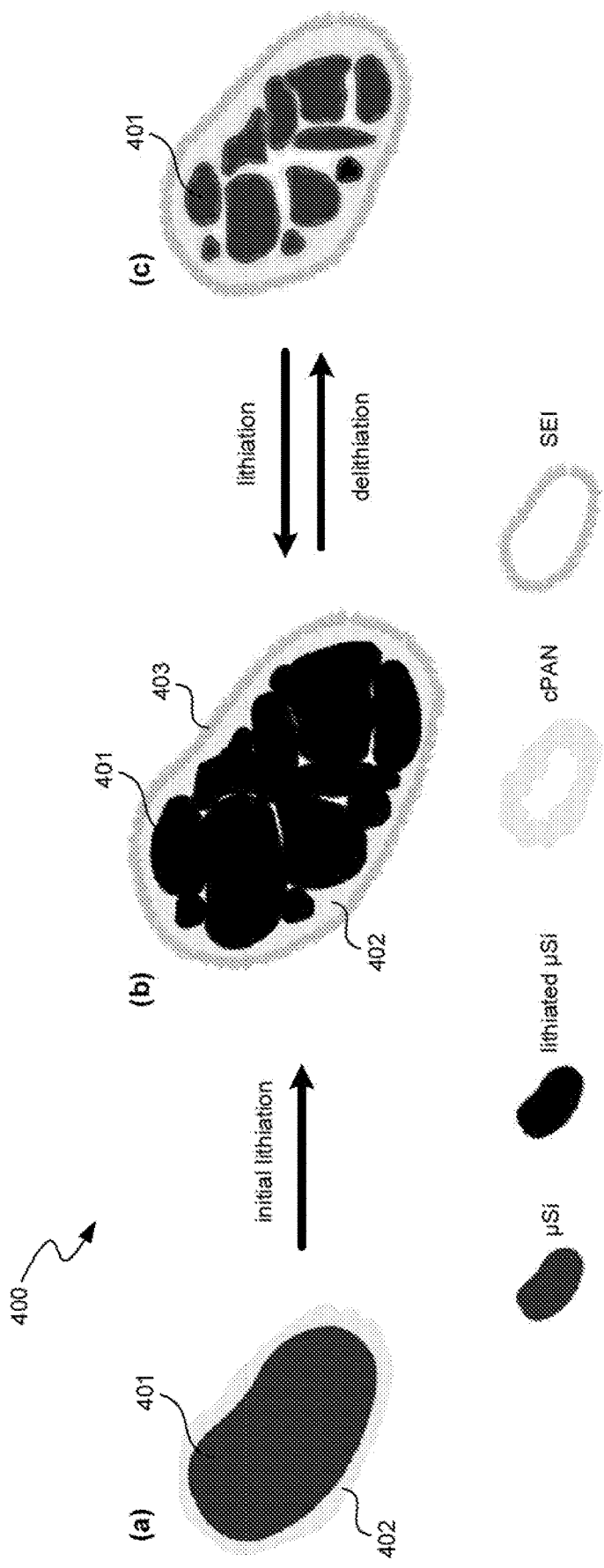
FIG. 4 shows a schematic representation of the "self-contained" fragmentation of micron-sized silicon (μSi) particles, in accordance with various aspects of the present disclosure.
Figure 5:
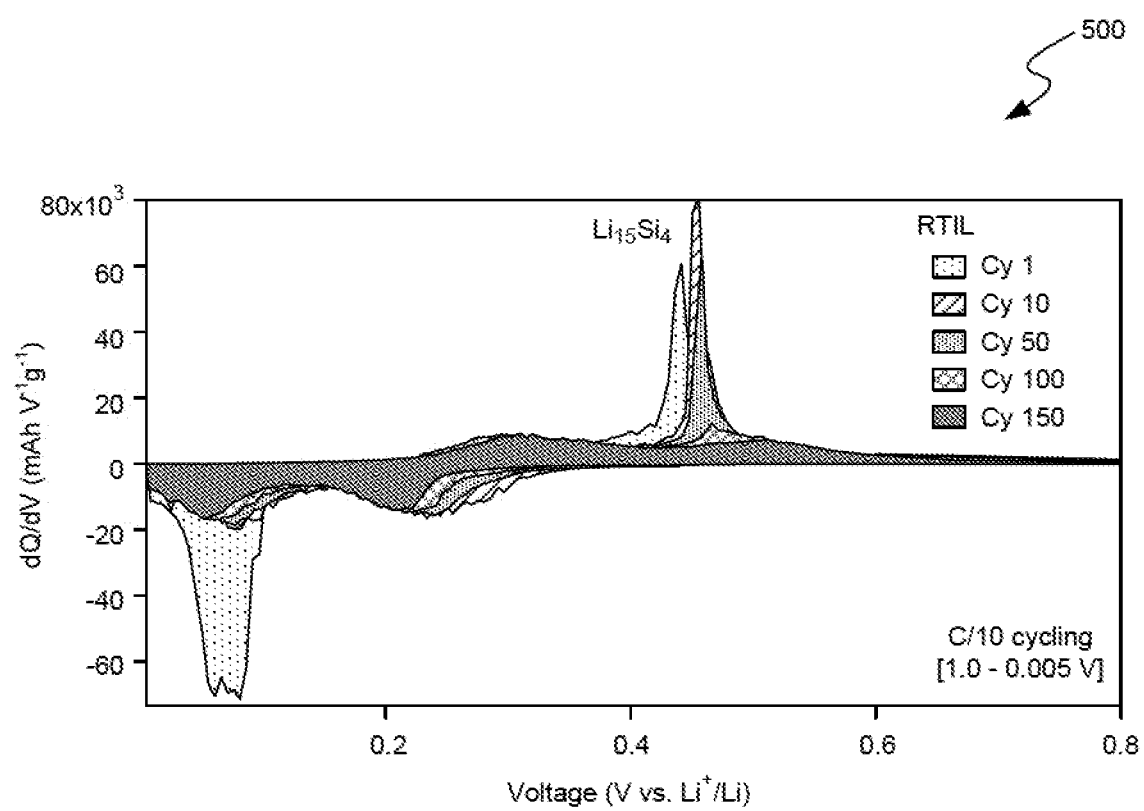
FIG. 5 shows a differential capacity (dQ/dV) plot of μSi cycled in imide-based RTIL electrolyte.

FIG. 4 shows a schematic representation 400 of the "self-contained" fragmentation of μSi particles, in accordance with various aspects of the present disclosure. This self-contained fragmentation can provide improved cycling performance. In FIG. 4(a), the micron-size silicon 401 is enclosed by cyclized polyacrylonitrile (cPAN) 402. During initial lithiation, the μSi particles 401 reach the $Li_{15}Si_4$ crystalline phase, which is verified by the first delithiation cycle in the differential capacity profiles shown in FIG. 5. FIG. 5 shows differential capacity (dQ/dV) plots 500 of μSi cycled in imide-based RTIL. The extended cycling shows that the $Li_{15}Si_4$ crystal phase is lost after 100-150 cycles. Due to the size of the pristine silicon particles (greater than 150 nm), the μSi particles fracture, crack, and ultimately pulverize as shown for 1-5 micron particles in an SEM micrograph in FIG. 3A.

In FIG. 4(b), illustrating initial lithiation, solid-electrolyte interphase (SEI) 403 forms on the cPAN interface 402, and the μSi particles 401 fragmentize without suffering electronic or ionic disconnections from the rest of the composite electrode or affecting (breaking) the SEI formed.

In FIG. 4(c), illustrating delithiation, fragmentized silicon particles 401 contract without losing network connectivity, avoiding isolation and thus loss of any active material utilization throughout cycling.

Figure 6A:
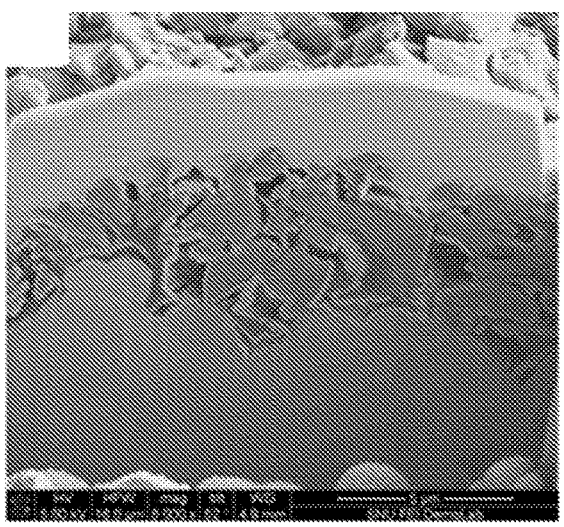
FIG. 6 shows high-resolution transmission electron microscopy (HR-TEM) micrographs of μSi-PAN (8-2 wt. ratio) electrodes before cycling (micrographs a and b), after full initial lithiation (micrographs c and d), and after a 16th delithiated cycle validating the "self-contained fragmentization" mechanism/process throughout cycling (micrographs e and f).
Figure 6B:
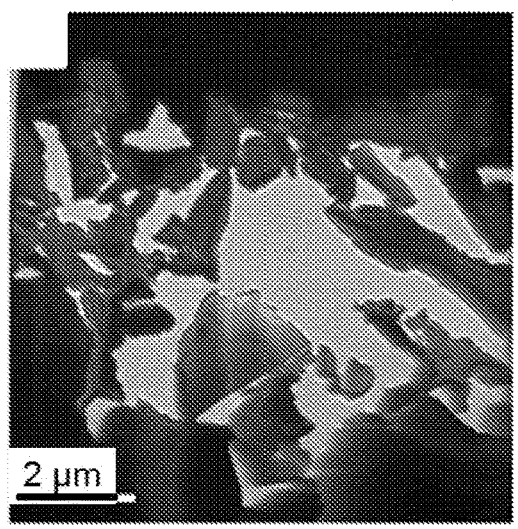
Figure 6C:
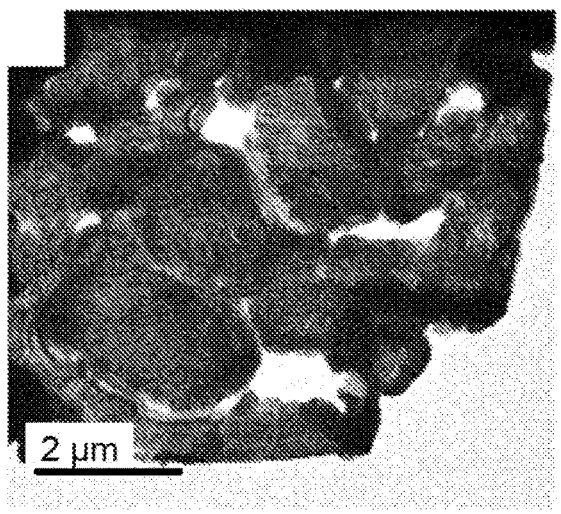
Figure 6D:
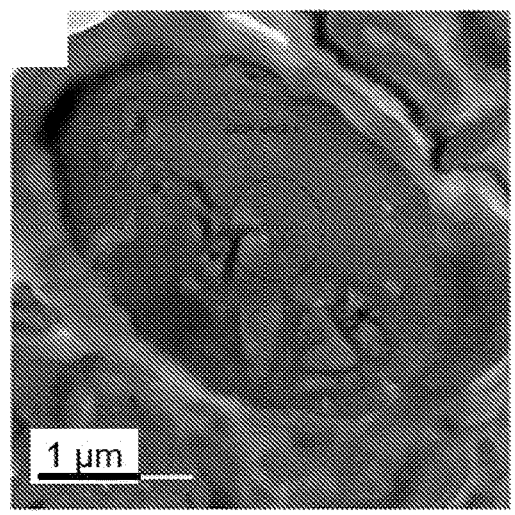
Figure 6E:
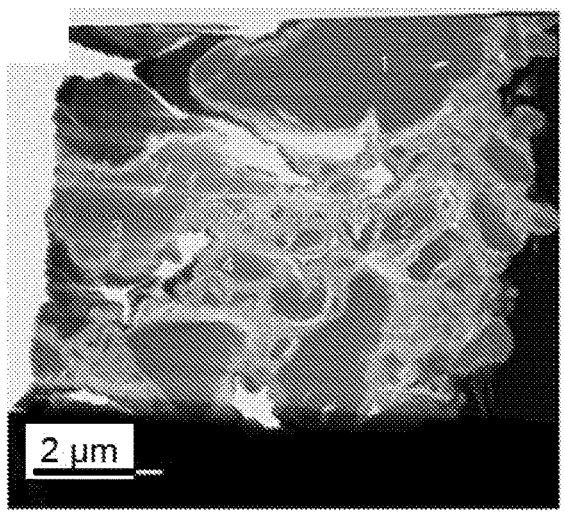
Figure 6F:
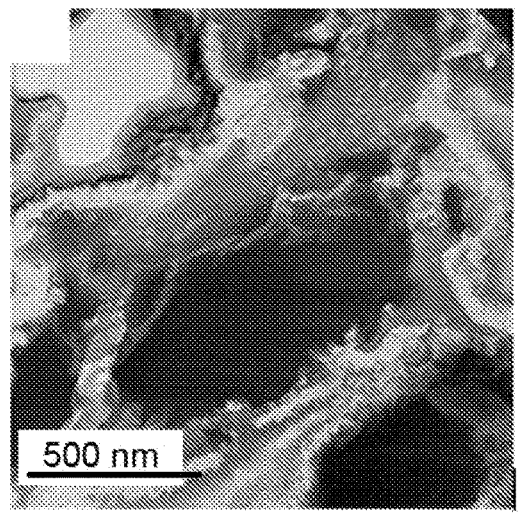

FIGS. 6A-6F show high-resolution transmission electron microscopy (HR-TEM) micrographs 600 of μSi-PAN (8-2 wt. ratio) electrodes before cycling (FIGS. 6A and 6B), after full initial lithiation (FIGS. 6C and 6D), and after a 16th delithiated cycle validating the "self-contained fragmentization" mechanism/process throughout cycling (FIGS. 6E and 6F). The HR-TEM was performed on cross-sections of μSi/PAN anode composites. The micrographs 600 show the strong adherence and connections between the polyacrylonitrile conductive coating and silicon particles at each stage of cycling. The micrographs of FIGS. 6E and 6F validate the "self-contained fragmentation" mechanism, showing that the fractured silicon and resulting silicon particles with reduced size maintain contact with the polymer coating, allowing for high capacity retention and charge/mass transfer in the composite.

"Hybrid" μSi Anode Composites

In some embodiments, the utilization of μSi in lithium-ion battery anodes may be improved by combining μSi with conventional active materials. This provides slightly lower capacities, compared to a pure Si electrode, but aids in minimizing the drawbacks of the silicon material (volume expansion, etc.).

The mixture of μSi particles in graphite electrodes has previously been implemented to commercial practice to increase the capacity of the anodes. However, this process is limited to the inclusion of at most 5% (by weight) of μSi active material. Any amount surpassing the 5% limit will destroy the electrode's network due to Si's massive volumetric expansion and contraction during lithiation and delithiation, as described previously.

However, the technology described in the present disclosure is compatible with such mixed composite systems (such as silicon and graphite) containing >5% (by weight) uSi. These composites, containing both silicon and conventional active materials such as graphite, are often easier to process and handle. The self-contained fragmentization mechanism described herein can be utilized to enable μSi particles in mixed anode composites. These materials may be referred to as "hybrid" composite electrodes.

In some embodiments, the hybrid composite electrode includes μSi used in combination with conventional active materials. Examples of suitable conventional active materials include, but are not limited to, nano-silicon, graphite, hard-carbons ('non-graphitizable' carbons), tin, germanium and/or other metals. This combination of materials is enclosed by a membrane permeable to lithium ions as described previously, and results in improved cycling performance. The self-contained fragmentization mechanism described previously enables the mixture of not only μSi material with other carbons and metals, but it also allows for the inclusion of high μSi mass loadings within the composite mixture (as high as 90% mass of μSi active material). In some embodiments, the hybrid composite electrode can include from 5 to 95% μSi and from 5 to 95% of one or more conventional active materials.

Figure 7:
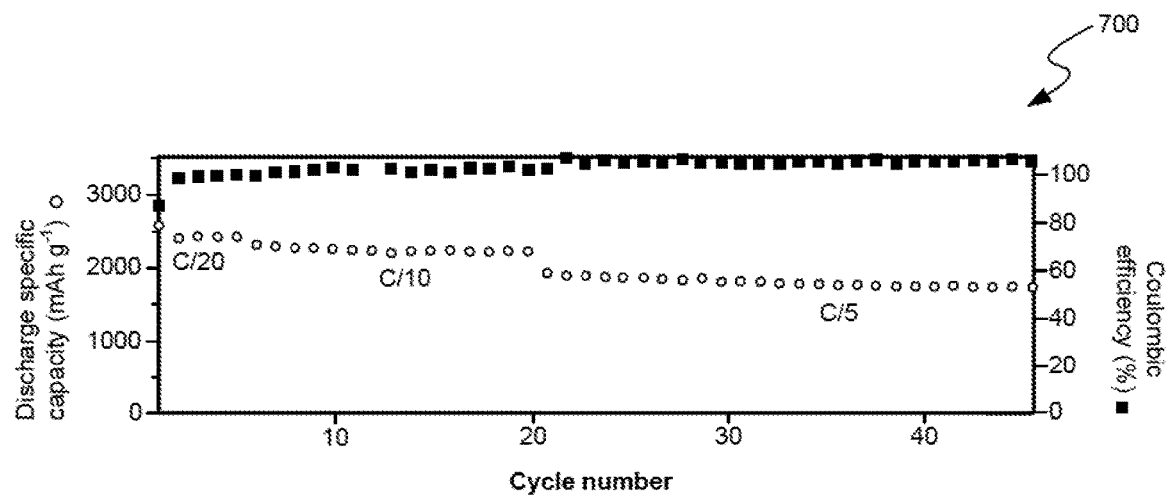
FIG. 7 shows specific discharge capacity with coulombic efficiencies of a hybrid anode composed of micron-silicon and graphite.
Figure 8:
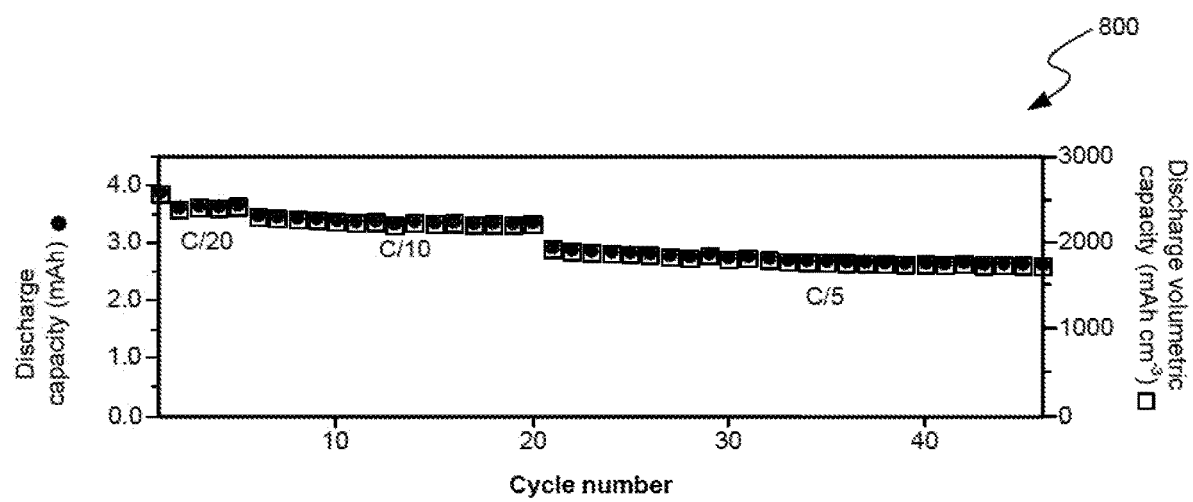
FIG. 8 shows specific discharge capacity with volumetric capacities of a hybrid anode composed of micron-silicon and graphite.

The hybrid electrodes can be tailored according to capacity requirements from the anodes by modifying the mass loading of the μSi material. For example, a hybrid anode composed of 67% μSi and 33% graphite will results in stable specific capacities of ~2200 mAh/g of active material as illustrated in FIGS. 7 and 8. FIG. 7 shows the cycling performance 700 of a hybrid anode composed of μSi and graphite according to embodiments described herein, encapsulated in a cPAN membrane permeable to lithium-ions. In particular, FIG. 7 shows specific discharge capacity with coulombic efficiencies.

FIG. 8 shows the cycling performance 800 of a hybrid anode composed of μSi and graphite according to embodiments described herein, encapsulated in a cPAN membrane permeable to lithium-ions. In particular, FIG. 8 shows specific discharge capacity with volumetric capacities. The cycling performance 700 and 800 depicted in FIGS. 7 and 8 demonstrate the ability of the self-contained fragmentization mechanism to maintain contact to all μSi particles while also providing a conductive matrix to host the reversible cycling of graphite throughout the cycling of the hybrid anodes.

Methods for Avoiding Ex Situ Anode Pre-Conditioning

Lithium metal, including stabilized lithium metal powder (SLMP), has been utilized as a laboratory tool to pre-lithiate graphite anodes and silicon anodes. Pre-lithiation of such electrodes allows for the compensation of the uptake of lithium during SEI formation. Previously known techniques include mechanically induced lithiation by which SLMP is placed on the anode surface under applied pressure to induce intercalation or alloying in the anode material. This mechanical method was previously seen as mandatory, as the SLMP powder must be "activated" by crushing/pulverization.

However, according to embodiments described herein, an electrolyte composition can be prepared and utilized in order to eliminate the need for this mechanical method. The composition generally includes a mixture of a RTIL (or modified-RTIL) and lithium metal powder (such as SLMP). The RTIL and/or modified-RTIL is capable of "activating" the SLMP material without the need for a mechanical application. In some embodiments, the mixture includes from 95 to 99.9% RTIL or modified-RTIL and from 0.1 to 5% SLMP (by weight). Any suitable RTIL and SLMP may be used in the composition.

Methods of in-situ conditioning generally include providing the mixture of RTIL and SLMP described above in the presence of a μSi anode material to thereby allow for alloying and lithiation. In some embodiments, this involves injecting the mixture into an electrochemical cell. Adding SLMP to the electrolyte or separator allows for compensation of lithium uptake during SEI formation. In alternate embodiments, the SLMP can be added to RTIL electrolyte already in the presence of a μSi anode material. In still other embodiments, the conditioning can also be carried out by bathing the anode in the RTIL+SLMP mixture prior to building a full-cell. In some embodiments, the mixture can be added to the surface of the μSi anode prior to building an electrochemical cell.

Figure 9:
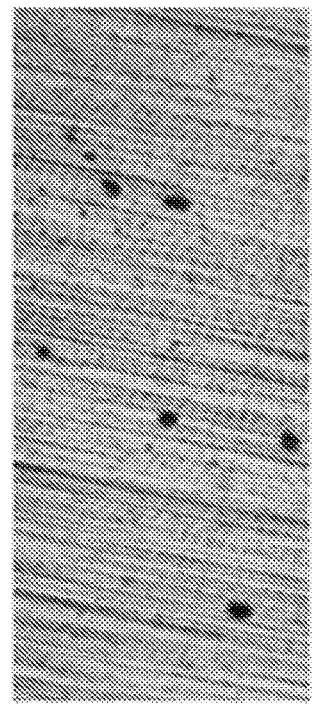
FIG. 9 shows microscope images of aluminum working electrodes taken from Al/Li cells after charging to 4.5 V for 12 hours.
Figure 9:
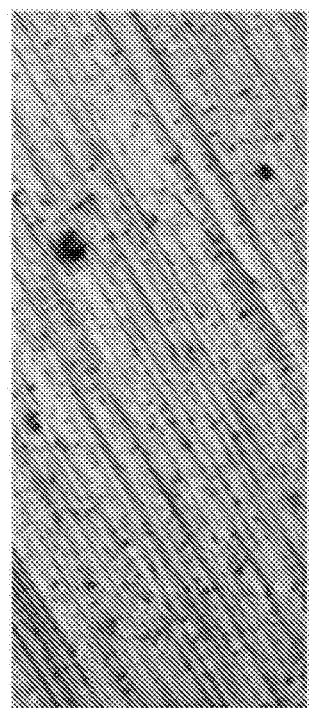
Figure 9:
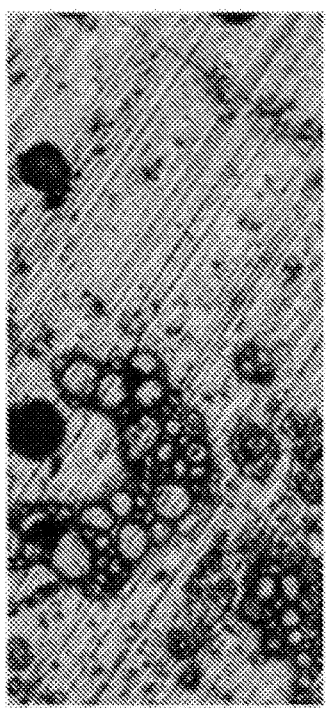

The effectiveness of the conditioning techniques described previously may be demonstrated using aluminum/lithium cells containing the RTIL+SLMP mixture. Applying a voltage of 4.5 V vs. Li/Li+, which simulates charging in a Li-ion full-cell, induces the formation of an aluminum-lithium alloy in cells containing the RTIL+SLMP electrolyte, while adding SLMP to cells containing conventional electrolyte does not result in alloying, as shown in FIG. 9. FIG. 9 shows microscope images 900 of aluminum working electrodes taken from Al/Li cells after charging to 4.5 V for 12 hours. Addition of SLMP powder to the $PYR_{13}FSI$ (1.2M LiFSI) electrolyte, and then injecting this electrolyte into the cell leads to formation of a Li—Al alloy. This infers the non-mechanical activation of SLMP in the RTIL electrolyte. In other words, adding SLMP to the RTIL allows for SLMP utilization.

Figure 10:
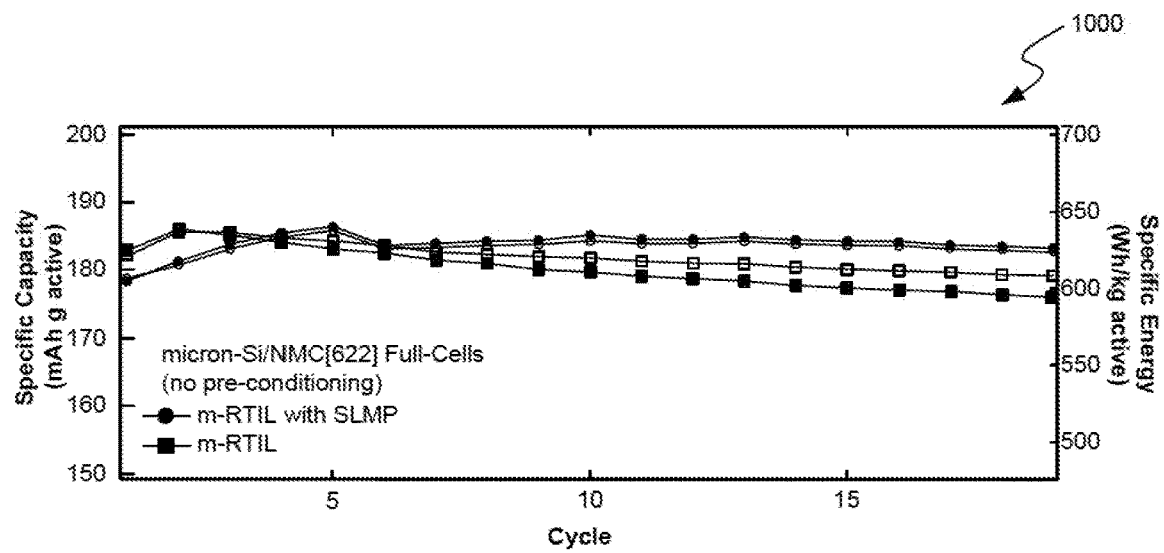
FIG. 10 shows the behavior of full-cells (μSi/NMC[622]) containing RTIL electrolyte with and without lithium metal powder additive.

This technique has been demonstrated in full-cells containing pristine μSi anodes. FIG. 10 shows the behavior 1000 of full-cells containing RTIL electrolyte. A micronSi/NMC622 full-cell containing no SLMP electrolyte additive demonstrates poor stability at rates above C/5, as shown in FIG. 10. Conversely, a micronSi/NMC622 full-cell containing SLMP electrolyte additive demonstrates high degrees of stability at rates above C/5. At higher rates, diffusion induced stress causes SEI instabilities on the anode; a less robust SEI will breakdown. SLMP provides extra lithium to compensate lithium uptake during initial SEI formation and allows for a more stable SEI capable of resilience at high rates.

LMR Cathode and Room Temperature Ionic Liquid Electrolyte

In some embodiments, a method of enabling long-term high-energy cycling in a lithium ion cell includes the use of room temperature ionic liquid electrolytes with lithium-manganese-rich (LMR) cathodes. The RTIL electrolyte restricts the phase change of the LMR oxide parent structure, enabling long-term cycling in a lithium-ion cell. Electrochemical cells, such as batteries, are formed by fabricating an anode (negative electrode) and cathode (positive electrode) and placing them on either sides of a separator layer, which allows passage of only ionic charge, while forcing electrons through an outer circuit connecting the electrodes.

The cathode is an electrode by which electrons enter the electrochemical cell. The cathode is not limited to being formed from a particular material. The cathode may include a transition metal oxide layer, such as an over-lithiated oxide layer (sometimes referred to as lithium-manganese-rich oxide). In some embodiments, the over-lithiated oxide material comprises a doped over-lithiated oxide material. Doped over-lithiated oxide materials are formed by including an anion dopant or a cation dopant in the over-lithiated oxide material. Exemplary anion dopants include halides, such as fluorine, chlorine, and bromine or combinations thereof. Exemplary cation dopants include elements such as boron, aluminum, zinc, chromium, titanium, calcium, and gallium or combinations thereof. In some embodiments, the weight percent of the over-lithiated oxide material is between about eighty percent of the weight of the cathode and about ninety-five percent of the weight of the cathode.

A room temperature ionic liquid functions as an electrolyte in an electrochemical cell. A room temperature ionic liquid is any salt that has a melting point below the ambient temperature. In some embodiments, a room temperature ionic liquid includes $PYR_{13}FSI$ (1.2M LiFSI). $PYR_{13}$ is Nmethyl-N-propyl pyrrolidinium formed by protonation of pyrrolidine. FSI is the anion bis(fluorosulfonyl)imide.

In some embodiments, a room temperature ionic liquid includes a fluorinated cosolvent additive. A fluorinated cosolvent additive is a second solvent added to enhance the solvent power of the primary solvent. Exemplary fluorinated cosolvent additives suitable for use in connection with a room temperature ionic liquid include fluoroethylene carbonate (FEC) and di-(2,2,2 trifluoroethyl)carbonate (DF-DEC). Fluoroethylene carbonate is a fluorinated cyclic carbonate. When used in lithium-ion batteries it enables the formation of thin and stable solid electrolyte interphase layer, which is insoluble in the electrolyte, in turn increasing the cycling efficiency of the lithium-ion electrochemical cell.

Figure 11:
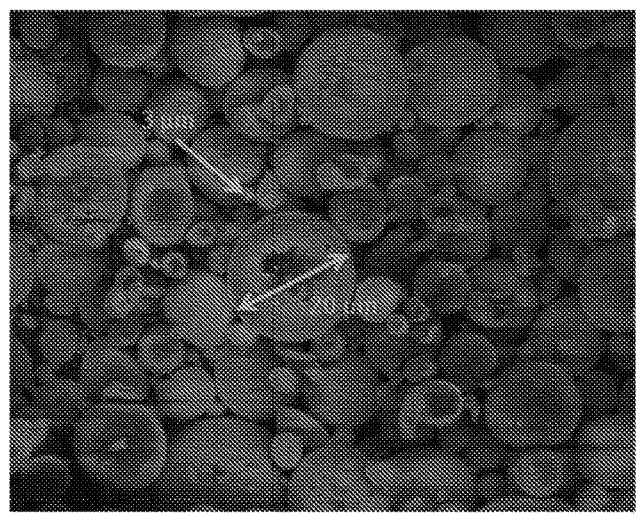
FIG. 11 shows a micrograph of Li$_{1.35}$Ni$_{0.32}$Mn$_{0.68}$O$_2$ material with secondary particle sizes ranging from 3-20 μm and primary particle sizes ranging from 200-400 nm.

Previous studies report over-lithiated oxide particle sizes of 300-400 nm, while several studies report the intentional hindrance of layered to spinel phase change using larger particle sizes (0.6-1.2 μm). Because phase change starts at the surface of the over-lithiated oxide particles in contact with liquid electrolyte, the lower exposed surface area caused by the larger particle sizes reduces the rate of phase change and capacity degradation. FIG. 11 shows a micrograph 1100 of $Li_{1.35}Ni_{0.32}Mn_{0.68}O_2$ material (supplied by Johnson Controls) with secondary particle sizes ranging from 3-20 μm and primary particle sizes ranging from 200-400 nm. With this relatively small particle size, the cycling data is more substantial.

Figure 12:
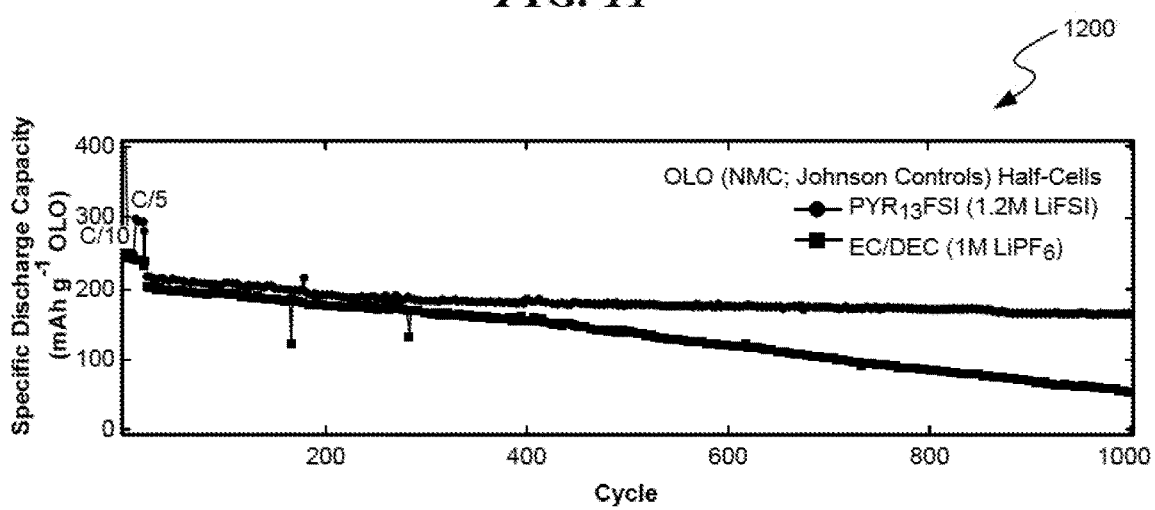
FIG. 12 shows data for (0.35)Li$_2$MnO$_3$.(0.65)LiNi$_{1/2}$Mn$_{1/2}$O$_2$ (or Li$_{1.35}$Ni$_{0.32}$Mn$_{0.68}$O$_2$) half-cells cycled in both RTIL PYR$_{13}$FSI (1.2M LiFSI) electrolyte and conventional organic EC/DEC (1M LiPF$_6$) electrolyte.

FIG. 12 shows data 1200 for $(0.35)Li_2MnO_3 \cdot (0.65)LiNi_{1/2}Mn_{1/2}O_2$ (or $Li_{1.35}Ni_{0.32}Mn_{0.68}O_2$) half-cells cycled in both room temperature ionic liquid $PYR_{13}FSI$ (1.2M LiFSI) electrolyte and conventional organic EC/DEC (1M LiPF$_6$) electrolyte. The specific capacity in FIG. 12 is normalized to the active material mass. The data displays the unexpected superior cycling of the lithium-rich material in room temperature ionic liquid, owed to the hindrance of layered-to-spinel phase change during long-term cycling. While the half-cell cycled in room temperature ionic liquid electrolyte maintains 85% of its capacity, calculated from the beginning of 1 C cycling to 1000 cycles, the half-cell cycled in organic electrolyte maintains only 30% of its 1 C capacity after 1000 cycles.

Figure 13:
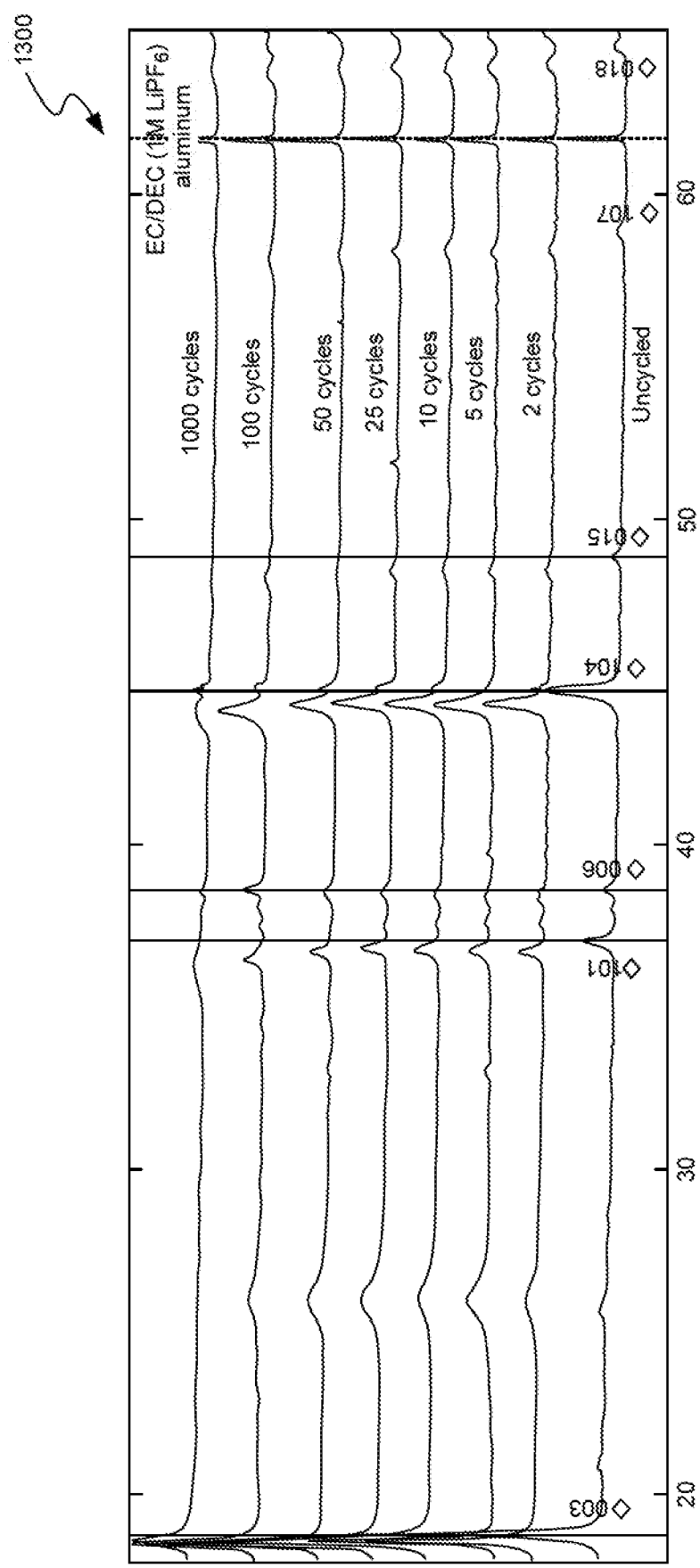
FIG. 13 shows XRD spectra of Li$_{1.35}$Ni$_{0.32}$Mn$_{0.68}$O$_2$ cycled for 0, 2, 5, 10, 25, 50, 100, 500, and 1000 cycles in half-cells containing organic EC/DEC (1M LiPF$_6$) electrolyte.
Figure 14:
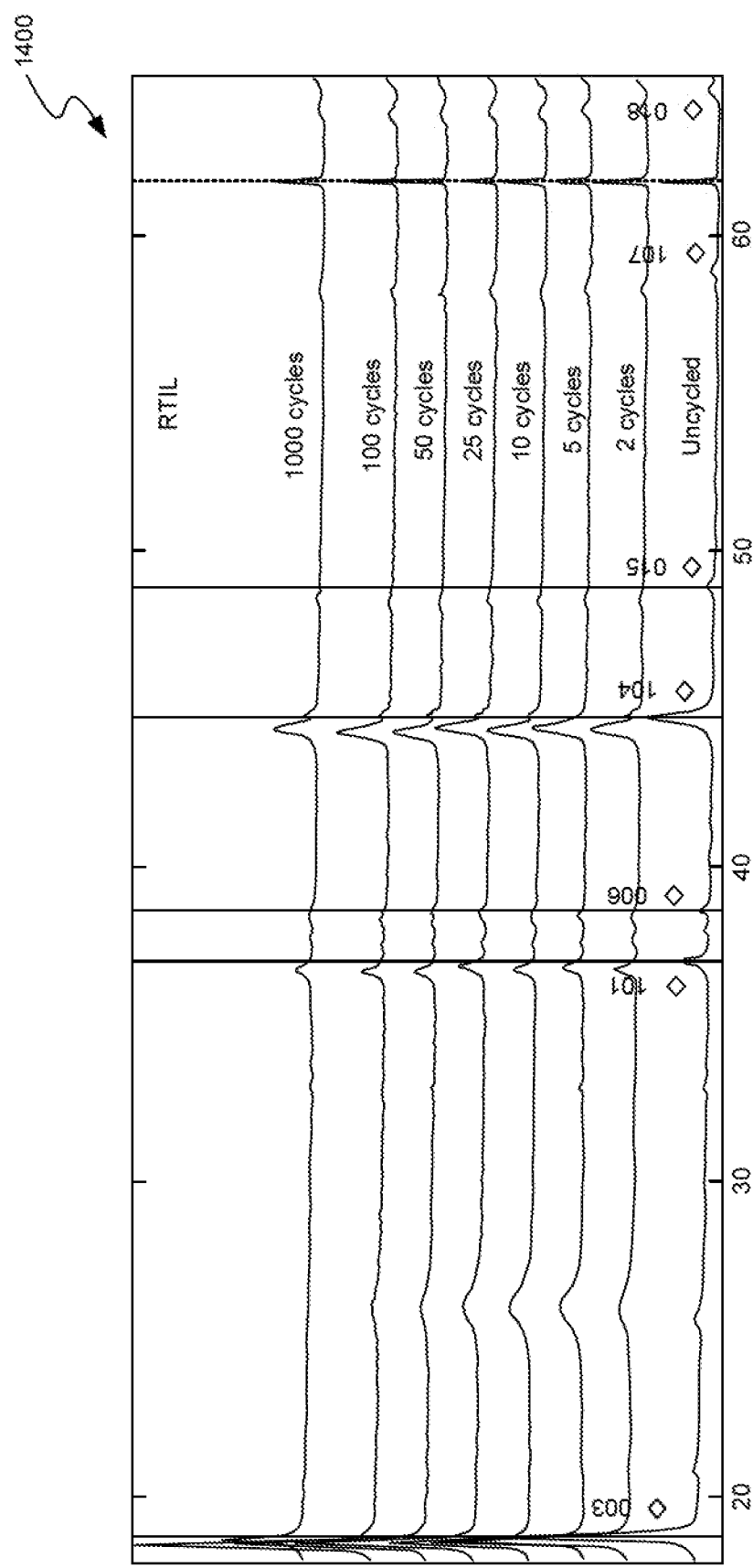
FIG. 14 shows XRD spectra of Li$_{1.35}$Ni$_{0.32}$Mn$_{0.68}$O$_2$ cycled for 0, 2, 5, 10, 25, 50, 100, 500, and 1000 cycles in half-cells containing RTIL PYR$_{13}$FSI (1.2M LiFSI) electrolyte.

This superior electrochemical reversibility is caused by reduced phase change over long-term cycling. This postulation is confirmed by the XRD spectra shown in FIG. 13 and FIG. 14. FIG. 13 shows XRD spectra 1300 of $Li_{1.35}Ni_{0.32}Mn_{0.68}O_2$ cycled for 0, 2, 5, 10, 25, 50, 100, 500, and 1000 cycles in half-cells containing organic EC/DEC (1M LiPF$_6$) electrolyte, while FIG. 14 shows XRD spectra 1400 of $Li_{1.35}Ni_{0.32}Mn_{0.68}O_2$ cycled for 0, 2, 5, 10, 25, 50, 100, 500, and 1000 cycles in half-cells containing room temperature ionic liquid $PYR_{13}FSI$ (1.2M LiFSI) electrolyte. Evident in both sets of spectra is the splitting of the [104] peak at approximately 46° 2θ and the loss of peaks between 20-25°2θ during early cycling (1-10) cycles. This is accompanied by peak shifting towards lower angles. During early cycling, these phenomena are indicative of "activation" of the lithium-rich material, a required step in cycling (first charge to >4.6 V vs. Li/Li$^+$), causing formation of the tetragonal spinel phase [C2/m] at the surface of the active material particles and evolution of oxygen as $Li_2O$ is lost from the particle surface. This data suggests that the over-lithiated oxide material is activated by similar mechanisms in both room temperature ionic liquid and organic electrolytes. Most substantially, the unexpected preservation of the material structure to 1000 cycles in room temperature ionic liquid, while the XRD peaks deform significantly after 1000 cycles in organic electrolyte. This behavior indicates the continued phase change and evolution of the spinel $LiMn_2O_4$ as the majority phase in the material cycled in organic electrolyte, whereas phase change is hindered in room temperature ionic liquid.

To further investigate the material behavior exhibited during the early cycles of over-lithiated oxide in both electrolytes, results from an ex situ Raman spectroscopy study are displayed in FIG. 15. FIG. 15 shows the Raman spectra 1500 of $Li_{1.35}Ni_{0.32}Mn_{0.68}O_2$ electrodes (85:7.5:7.5 et. % OLO:PVDF:AB) after 0, 2, and 50 cycles in $PYR_{13}FSI$ (1.2M LiFSI) electrolyte (left) and conventional EC/DEC (1M LiPF$_6$) electrolyte (right). Raman spectroscopy provides an understanding of the Li—O bonding environments in the electrodes, which leads to information regarding the crystallographic structure of the material. Both $PYR_{13}FSI$ and EC/DEC electrolyte systems depict similar structural changes during the first 50 cycles; however, these changes are much more pronounced in the electrodes cycled in organic electrolyte. The uncycled samples show two major stretches at 600 cm$^{-1}$ and about 485 cm$^{-1}$. These peaks are assigned as $A_{1g}$, describing the symmetrical stretching of the Metal-O bond, and $E_g$, describing symmetrical bond deformation, respectively. The $A_{1g}$ peak is relatively sharp without any splits, meaning that the $Li_2MnO_3$-like Mn-rich regions are well mixed with the $LiMnO_2$ region in a layered structure with [R-3m] symmetry. However, these patterns are altered in the sample after 50 electrochemical cycles. The $A_{1g}$ peak begins to split into two different $A_{1g}$ peaks at 600 $cm^{-1}$ and about 630 $cm^{-1}$. This separation is much more pronounced in the electrode cycled in organic electrolyte. The sharp distinction between two $A_{1g}$ peaks identifies the existence of two different local Metal-O arrangements. This is reminiscent of mixed characteristics of both spinel and layered phases. The peak at about 630 $cm^{-1}$ is therefore a strong indication of the existence of spinel-like cation ordering. The peaks at about 600 $cm^{-1}$ and 485 $cm^{-1}$ imply layered characteristics. In the sample cycled 50 times in organic electrolyte, we can clearly observe that the peaks representing the layered characteristics are diminished compared to those cycled in room temperature ionic liquids. The Raman spectral data 1500 indicates that while electrodes in both electrolytes undergo phase change during early cycling associated with activation of the lithium-rich material, the phase change after 50 cycles is much less significant in room temperature ionic liquids.

Figures 16A, 16B:
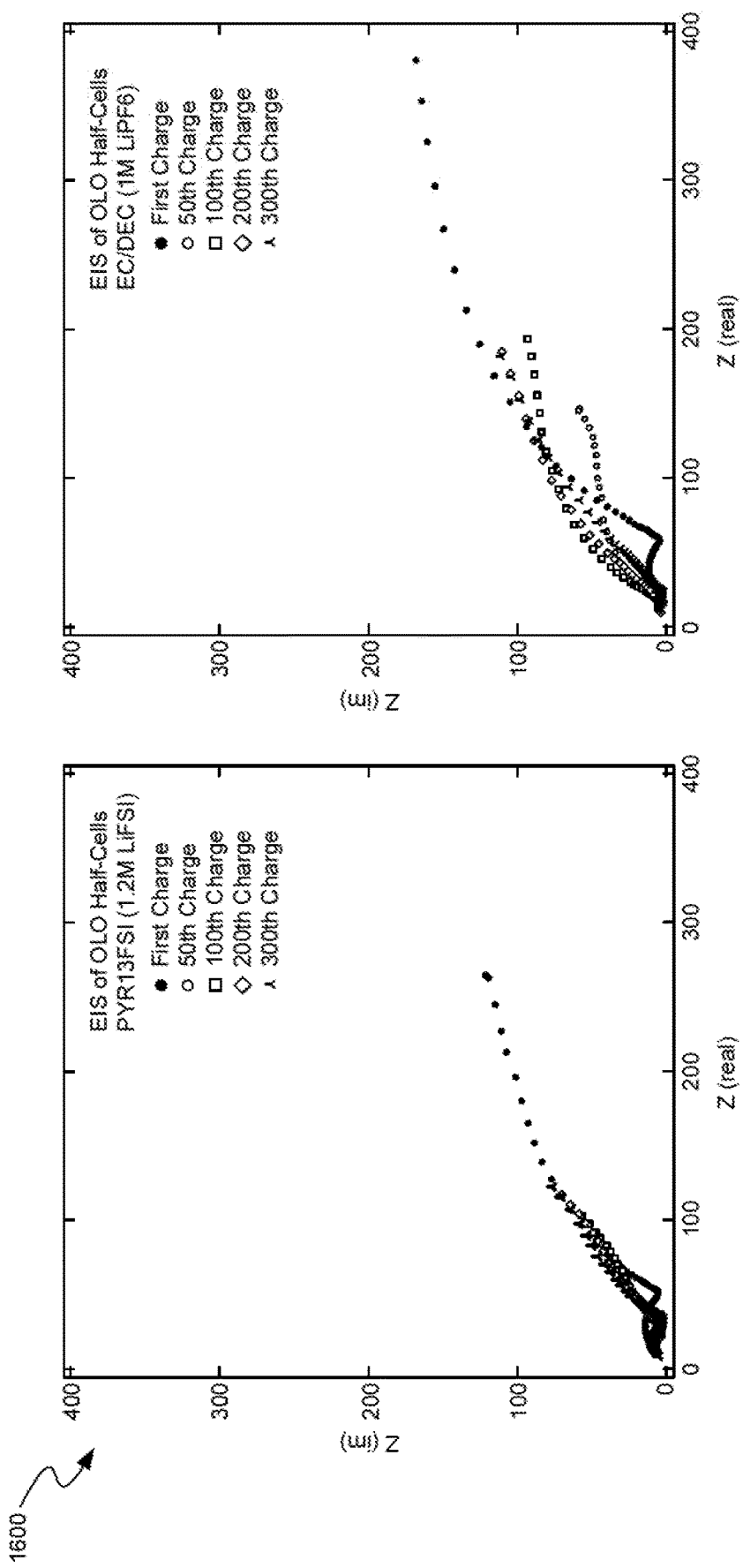
FIG. 16 shows electrochemical impedance spectroscopy (EIS) of LMR half-cells, performed at full charge, and cycled in in RTIL PYR$_{13}$FSI (1.2M LiFSI) electrolyte (left) and conventional EC/DEC (1M LiPF$_6$) electrolyte (right).

It is proposed that the cause of such improved performance using an FSI based room temperature ionic liquid electrolyte is the favorable surface chemistry and interfacial compatibility between the lithium-manganese-rich layered oxide material and the electrolyte. Carbonate electrolytes, including those containing $LiPF_6$, undergo oxidative decomposition during electrochemical cell charging, forming acidic $H^+$ and HF species. Subsequently, these protons promote disproportionation of $Mn^{3+}$, accelerating the dissolution of Mn and leading to the capacity and voltage fade that plagues the lithium-manganese-rich oxide chemistry. Also of note is the fact that the spinel phase of lithium-manganese-rich oxide materials is more thermodynamically stable in acidic environments. Moreover, the accumulation of a thick solid electrolyte interphase layer on the cathode and attack by acidic species readily damage the electrode/electrolyte interface, inducing large charge transfer resistances ($R_{ct}$) that reduce capacity and rate performance. Electrochemical impedance spectroscopy (EIS) was used to directly probe changes in $R_{ct}$ during cycling of lithium-manganese-rich oxide half-cells in room temperature ionic liquid electrolyte and conventional organic electrolyte, as shown in FIG. 16. FIG. 16 shows the EIS 1600 of LMR half-cells, performed at full charge, and cycled in in $PYR_{13}FSI$ (1.2M LiFSI) electrolyte (left) and conventional EC/DEC (1M $LiPF_6$) electrolyte (right). It is clear that the cell cycled room temperature ionic liquid electrolyte shows a lower $R_{ct}$, while the cell cycled in organic electrolyte has a higher $R_{ct}$ which grows throughout cycling. This suggests that the $PYR_{13}FSI$ (1.2M LiFSI) electrolyte is highly stable against the lithium-manganese-rich oxide electrode, forming a favorable solid-electrolyte interphase and allowing for high performance and long-term cycling.

Figure 17:
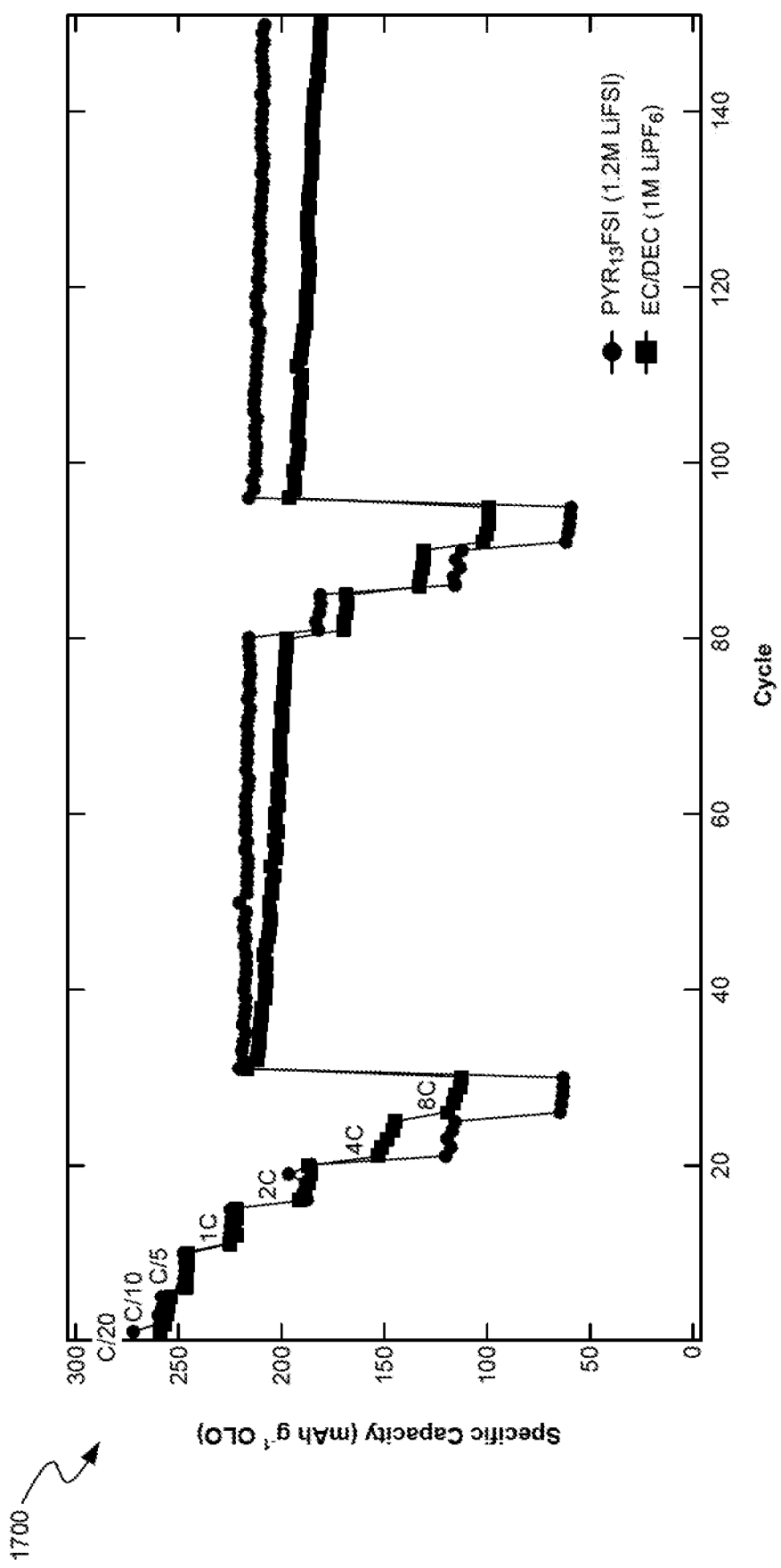
FIG. 17 shows a rate study carried out to compare the rate performance of the (0.35)Li$_2$MnO$_3$.(0.65)LiNi$_{1/2}$Mn$_{1/2}$O$_2$ cathode in both RTIL PYR$_{13}$FSI (1.2M LiFSI) and EC/DEC (1M LiPF$_6$).

Because the degrading effects of the lithium-manganese-rich oxide organic electrolyte pair are known to be exacerbated by high rate cycling, a rate study was carried out to compare the rate performance 1700 of the $(0.35)Li_2MnO_3 \cdot (0.65)LiNi_{1/2}Mn_{1/2}O_2$ cathode in both $PYR_{13}FSI$ (1.2M LiFSI) and EC/DEC (1M $LiPF_6$), as shown in FIG. 17. While the cell containing organic electrolyte exhibits faster capacity fade after cycling at high rates, the cell containing room temperature ionic liquid electrolyte remains stable. This suggests that while phase change and its consequences are more severe at high rates in organic electrolyte, the room temperature ionic liquid successfully mitigates these problems.

Strategies have been developed to enhance the early cycling behavior of the lithium-manganese-rich oxide material in a $PYR_{13}FSI$ (1.2M LiFSI) electrolyte. After scrutinizing the data of the preliminary electrochemical characterization, it is clear that the early stage activation of the $Li_2MnO_3$ material, accompanied by early phase change of the $LiR_1O_2$ component, is occurring even in imide-based room temperature ionic liquid electrolyte. Rather than attempt to mitigate early cycling phase change using a direct surface modification of the lithium-manganese-rich oxide active material, it is shown that the performance of the lithium-manganese rich oxide/room temperature ionic liquid system is improved by utilizing electrolyte additives with the aim of passivating the lithium-manganese-rich oxide surface immediately during initial charging. Thus, these materials allow tailoring the interfacial compatibility of the lithium-manganese-rich oxide/room temperature ionic liquid pair during early cycling.

In addition to characterizing the crystallography and phase change mechanisms associated with the stability of $Li_{1.35}Ni_{0.32}Mn_{0.68}O_2$ in room temperature ionic liquid electrolyte, the unexpected and improved performance of this material in a full-cell paired with a nano-wire silicon anode is demonstrated, where the nano-wires are coated with a thin layer of cyclized polyacrylonitrile.

Figure 18:
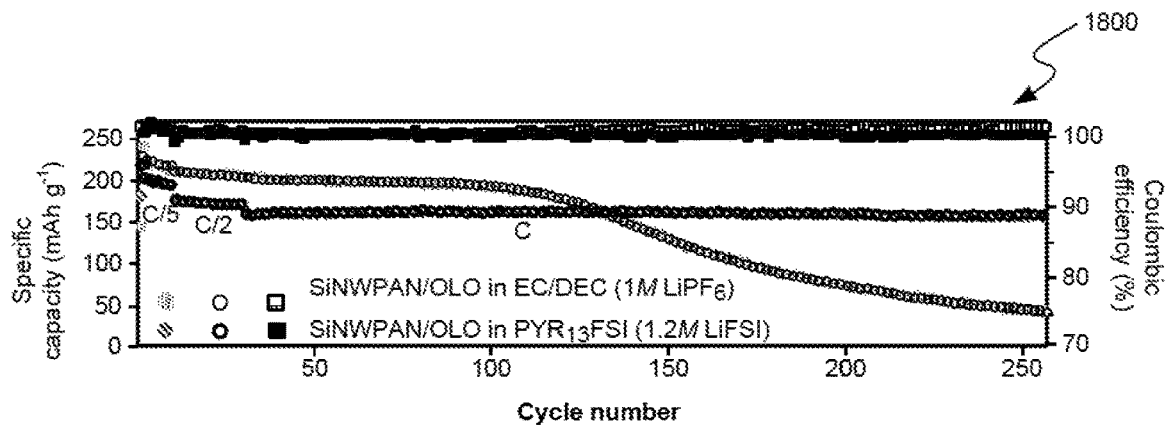
FIG. 18 shows full-cell data of a Li$_{1.35}$Ni$_{0.32}$Mn$_{0.68}$O$_2$ (85:7.5:7.5 et. % OLO:PVDF:AB) cathode paired with a SiNW-cPAN anode and cycled in RTIL PYR$_{13}$FSI (1.2M LiFSI) and EC/DEC (1M LiPF$_6$) electrolytes.

The performance of the SiNW-cPAN/OLO full-cells in both organic and room temperature ionic liquid electrolytes are shown in FIG. 18. FIG. 18 shows full-cell data 1800 of a $Li_{1.35}Ni_{0.32}Mn_{0.68}O_2$ (85:7.5:7.5 et. % OLO:PVDF:AB) cathode paired with a SiNW-cPAN anode and cycled in $PYR_{13}FSI$ (1.2M LiFSI, 0.5M $LiPF_6$) and EC/DEC (1M $LiPF_6$) electrolytes. The specific capacity is normalized to the total active material mass (i.e., the mass of both SiNW and OLO active material). The behavior of the SiNW/$PYR_{13}FSI$/OLO full-cell demonstrates the possibility for a highly energy-dense lithium-ion battery.

When the system is implemented into commercial 18650 form-factor lithium-ion batteries several significant advances at the electrode level and battery level result. At the electrode level, three advances are noteworthy. First, the cathode electro-active material needed would be reduced by 1.4 times that of current state-of-the-art cathode material. Second, the anode electro-active material needed would be reduced by more than 7 times that of state-of-the-art graphite anode. Third, the total electro-active material needed to attain the same energy content in the cell would be reduced by more than 8 times that of current state-of-the-art 18650 cells. At the battery level, for the same mass of electro-active material currently found in state-of-the-art 18650 cell, the described system would be able to achieve an energy-density increase of at least 85%.

Figure 19:
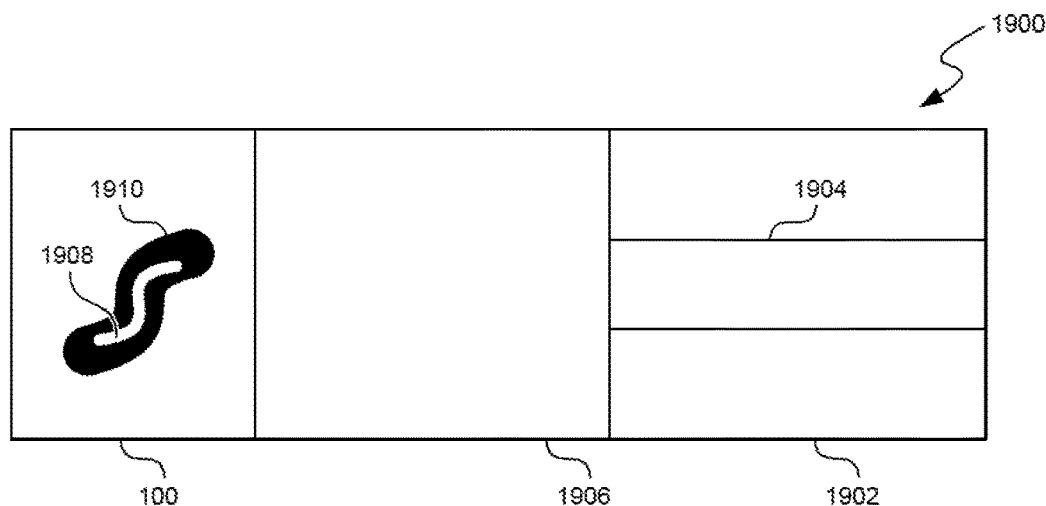
FIG. 19 shows an electrochemical cell, including an anode, a cathode including an over-lithiated oxide layer, and a RTIL to couple the anode to the cathode.

FIG. 19 shows an electrochemical cell 1900 including an anode 100, a cathode 1902 including a transition metal oxide layer 1904, and a room temperature ionic liquid 1906 to couple the anode 200 to the cathode 1902. In operation, the electrochemical cell 1900 converts chemical energy into electrical energy. In some embodiments, the electrochemical cell 1900 is a rechargeable lithium-ion electrochemical cell.

The anode 100, in one embodiment shown in FIG. 1 and described above, is an exemplary anode suitable for use in connection with the electrochemical cell 1900. When incorporated into an energy storage and conversion device, such as a rechargeable lithium-ion electrochemical cell, the anode 100 is an electrode to which positive charge (in the form of lithium cations) flows during normal use. In some embodiments, the anode 100 includes one or more silicon nanowires 1908 coated in cyclized polyacrylonitrile 1910. A silicon nanowire is a substantially silicon nanostructure having a diameter on the order of a about a nanometer.

The cathode 1902 is an electrode by which electrons enter the electrochemical cell 1900. In some embodiments, the cathode 1902 includes a transition metal oxide layer 1904, such as an over-lithiated oxide layer (sometimes referred to as lithium-manganese-rich oxide). In some embodiments, the electrochemical cell 1900 includes a transition metal oxide layer 1904 having the formula $(x)Li_2MnO_2(1-x)LiR_1O_2$, wherein $R_1$ is Mn, Ni, Co, and x is greater than zero and less than one. In some embodiments, x is about 0.1, about 0.2, about 0.3, about 0.4, or about 0.5. In some embodiments, the transition metal oxide layer 1904 has the formula $Li_{1.35}Ni_{0.32}Mn_{0.68}O_2$. In some embodiments, the transition metal oxide layer 1904 has the formula $(0.35)Li_2MnO_3(0.65)LiNi_{1/2}Mn_{1/2}O_2$.

The room temperature ionic liquid 1906 functions as an electrolyte in the electrochemical cell 1900. In some embodiments, the room temperature ionic liquid 1906 includes $PYR_{13}FSI$ (1.2M LiFSI). In some embodiments, the LiFSI has a concentration of 1.2M. In some embodiments, the room temperature ionic liquid 1906 includes an imide-based ionic liquid. An imide-based ionic liquids include an FSI anion. In some embodiments, the room temperature ionic liquid 1906 includes a fluorinated cosolvent additive. In some embodiments, the fluorinated cosolvent additive enhances the solvent power of the room temperature ionic liquid 1906. Exemplary fluorinated cosolvent additives suitable for use in connection with the room temperature ionic liquid 1906 include fluoroethylene carbonate (FEC) and di-(2,2,2 trifluoroethyl)carbonate (DFDEC).

Figure 20:
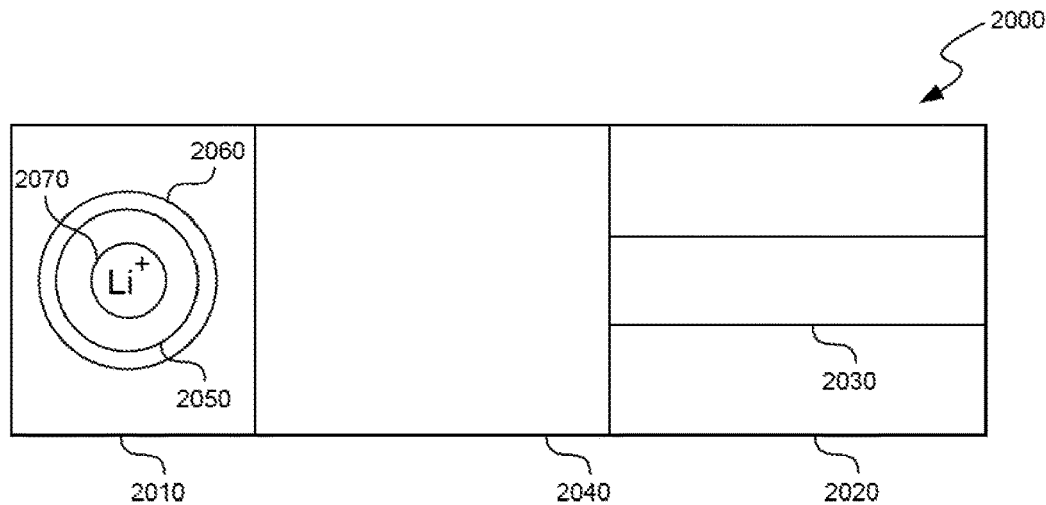
FIG. 20 shows an electrochemical cell including an anode, a cathode including an over-lithiated oxide layer, and an organic electrolyte to couple the anode to the cathode.

FIG. 20 shows an electrochemical cell 2000 including an anode 2010 a cathode 2020 including an over-lithiated oxide layer 2030, and an organic electrolyte 2040 to couple the anode 2010 to the cathode 2020. Organic electrolytes do not include room temperature ionic liquids. In some embodiments, the anode 2010 includes one or more active material particles 2050, each of the one or more active material particles 2050 having a diameter of between about one and about fifty micrometers, and each of the one or more active material particles enclosed by a membrane 2060 permeable to lithium ions 2070. In some embodiments the overlithiated oxide layer 2030 has a formula $(x)Li_2MnO_2(1-x)LiR_1O_2$, $R_1$ is Mn, Ni, or Co, and x is greater than zero and less than one.

Electrolyte Additives

Fluoroethylene carbonate (FEC) and di(2,2,2 trifluoroethyl)carbonate(DFDEC) are exemplary fluorinated cosolvent additives. Lithium fluoride (LiF), lithium tetrafluoroborate ($LiBF_4$), lithium difluoro(oxalato)borate (LiDFOB), lithium hexafluorophosphate ($LiPF_6$), and lithium difluoro(sulfate)borate ($LiDFSO_4B$) are exemplary fluorinated lithium salt additives. Such electrolyte additives are expected to be "sacrificial," forming a more stable interface upon charging that may lower the occurrence of Mn-dissolution and structural degradation while most beneficially aiding in the maintenance of a $Mn^{4+}$ valence state.

Figure 21A:
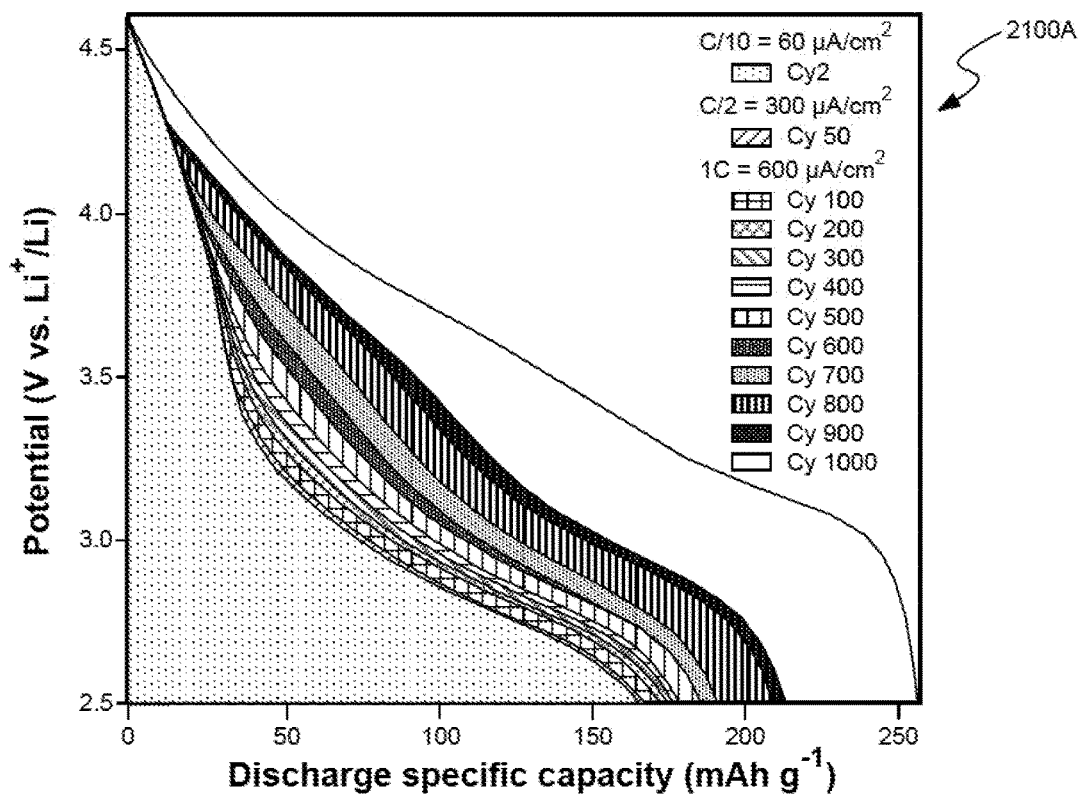
FIG. 21A shows discharge voltage profiles of LMR half-cells cycled in pure RTIL electrolyte.
Figure 21B:
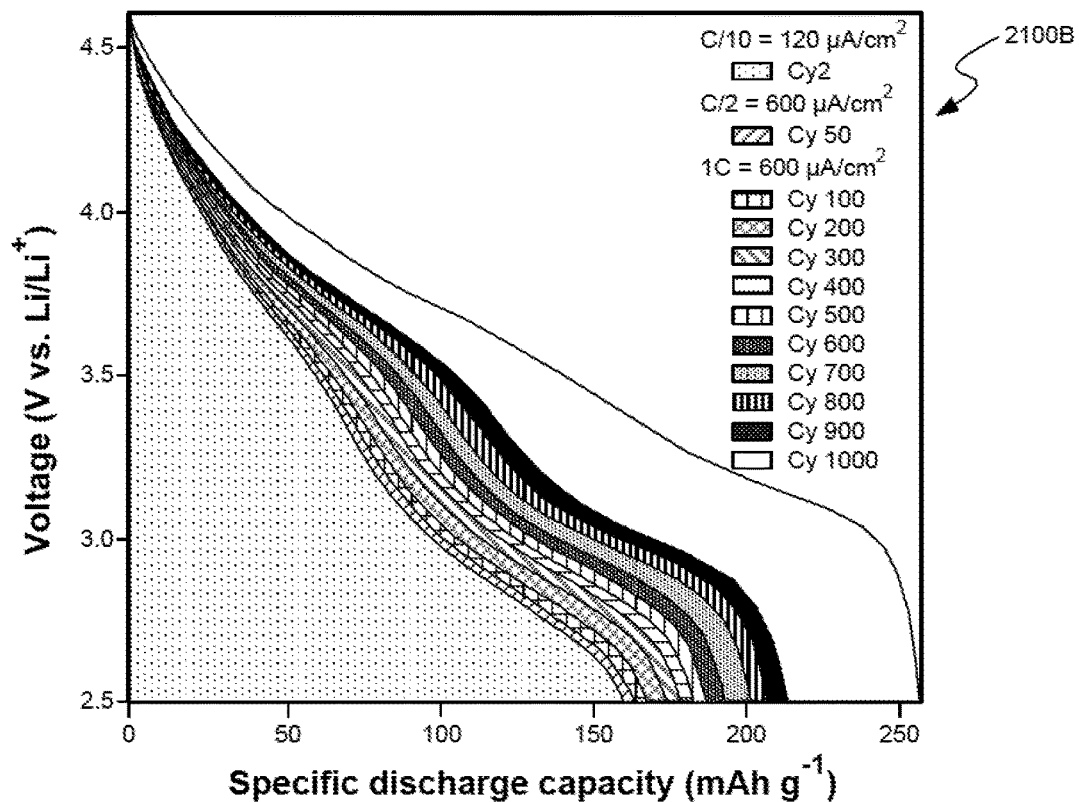
FIG. 21B shows discharge voltage profiles of LMR half-cells cycled in electrolytes with fluorinated additive LiPF$_6$.
Figure 21C:
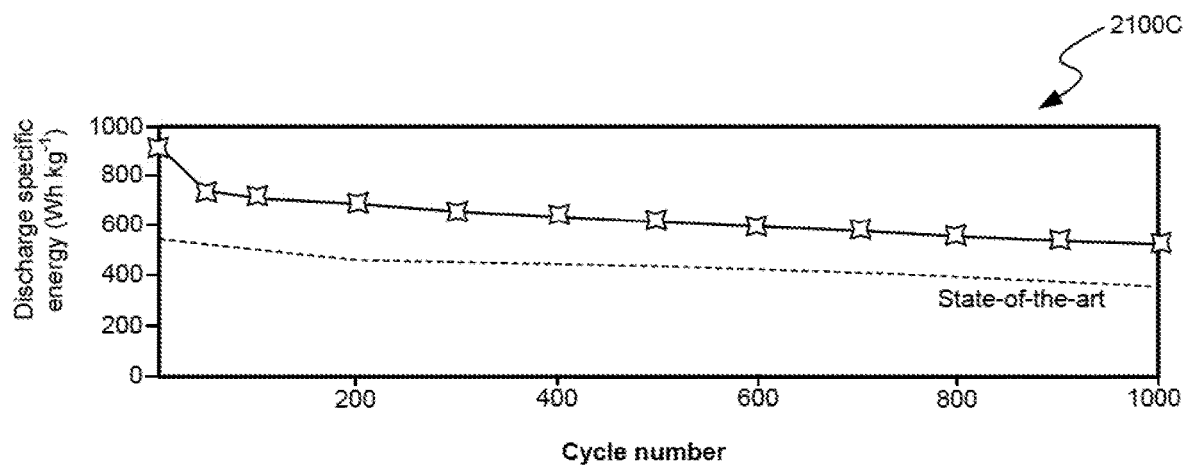
FIG. 21C shows the energy retention of the LMR half-cell cycled in RTIL+LiPF$_6$.
Figure 21D:
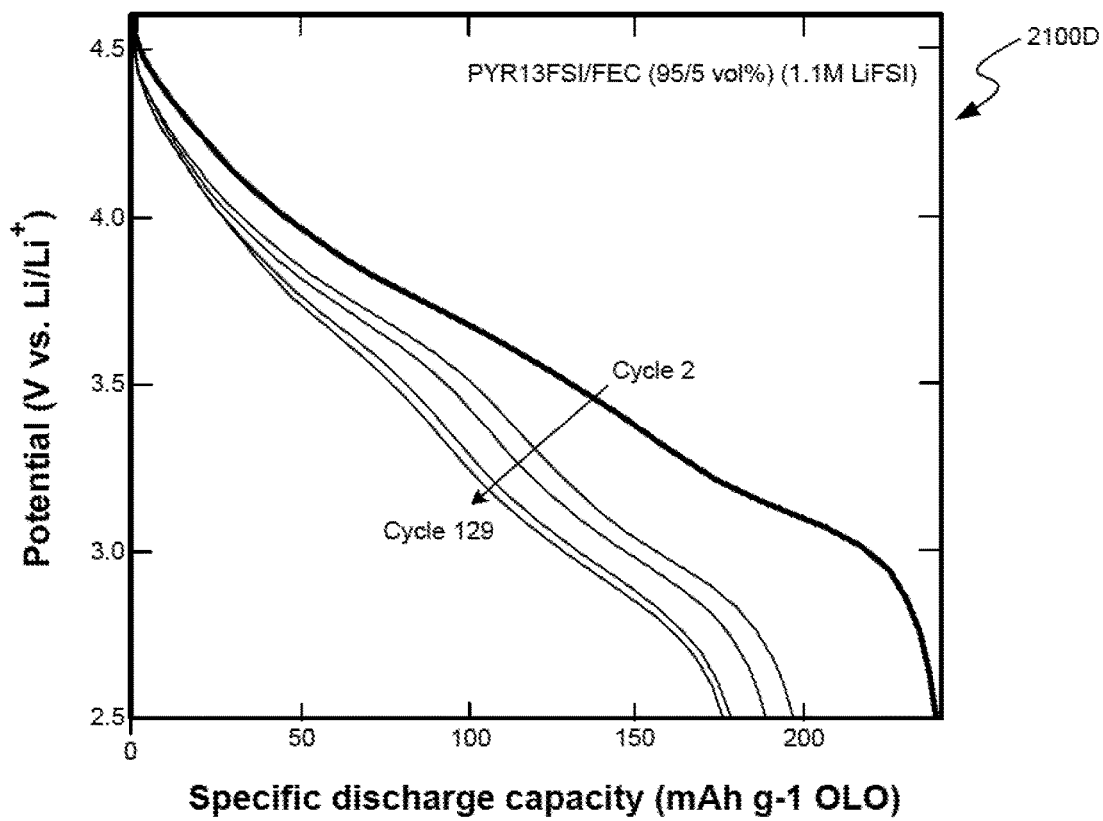
FIG. 21D shows voltage profiles of LMR half-cells cycled in FEC.

The addition of fluoroethylene carbonate to the $PYR_{13}FSI$ (1.2M LiFSI) electrolyte is an effective strategy for improving early cycle life performance. FIG. 21A shows voltage profiles 2100A of LMR half-cells cycled in pure RTIL electrolyte. FIG. 21B shows voltage profiles 2100B of LMR half-cells cycled in electrolytes with fluorinated additives $LiPF_6$. FIG. 21C shows the energy retention 2100C of the cell cycled in RTIL+$LiPF_6$. FIG. 21D shows voltage profiles 2100D of LMR half-cells cycled in FEC. As shown in FIGS. 21A-21D, adding 10% vol. fluoroethylene carbonate to the $PYR_{13}FSI$ (1.2M LiFSI) reduces the growth of the <3.0 V dip in the voltage trace of the lithium-manganese-rich oxide material, which begins at the 100*th* cycle when not using fluoroethylene carbonate. The capacities in the 10% fluoroethylene carbonate electrolyte are slightly lower, but this is caused by buildup of fluoroethylene carbonate decomposition products on the surface of the electrode. Capacities can be increased by using a 5% vol. fluoroethylene carbonate electrolyte composition, as shown in FIG. 21D.

Interfacial Chemical Make-Up

Figure 22A:
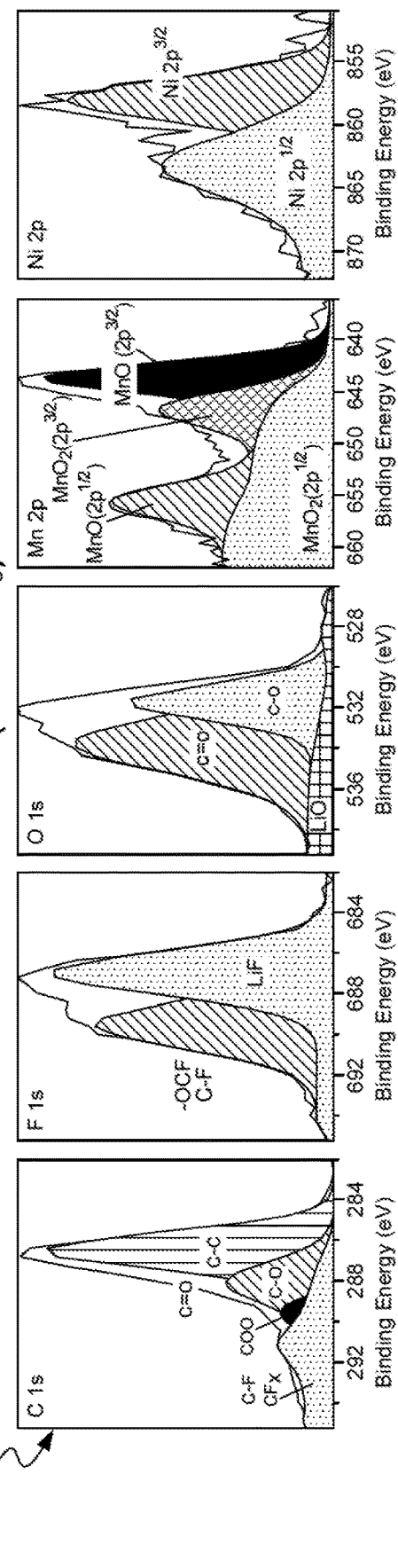
FIG. 22A shows XPS analysis of the major elemental constituents forming the cathode electrolyte interface CEI on LMR electrodes after cycling in EC/DEC (1M LiPF$_6$) electrolyte (including carbon, fluorine, oxygen, manganese, and nickel).
Figure 22B:
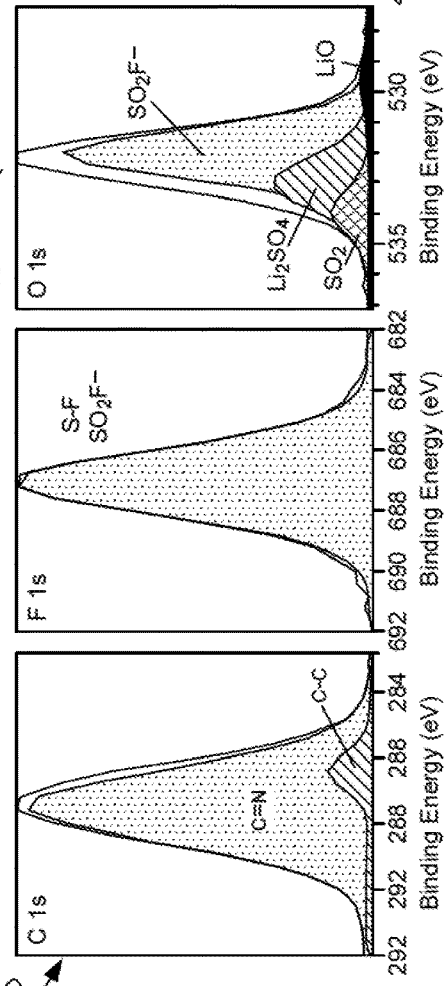
FIG. 22B shows XPS analysis of the major elemental constituents forming the CEI on LMR electrodes after cycling in RTIL PYR$_{13}$FSI (1.2M LiFSI) electrolyte.

FIGS. 22A-22C show X-ray photoelectron spectroscopy (XPS) studies of the CEI's chemical make-up after cycling in each electrolyte (conventional electrolyte, ionic liquid electrolyte, modified ionic liquid electrolyte). FIG. 22A shows XPS analysis 2200A of the major elemental constituents forming the CEI on LMR electrodes after cycling in EC/DEC (1M $LiPF_6$) electrolyte (including carbon, fluorine, oxygen, manganese, and nickel). FIG. 22B shows XPS analysis 2200B of the major elemental constituents forming the CEI on LMR electrodes after cycling in $PYR_{13}FSI$ (1.2M LiFSI) electrolyte. FIG. 22C shows XPS analysis 2200C of the major elemental constituents forming the CEI on LMR electrodes after cycling in $PYR_{13}FSI$ (1.2M LiFSI, 0.1M $LiPF_6$) electrolytes (including carbon, fluorine, oxygen, nitrogen, and sulfur). FIG. 22D shows XPS depth profiling 2200D highlighting fluorine content in the CEI formed in each electrolyte of FIGS. 22A-22C.

The XPS depth profiling of fluorine content present through the LMR-electrolyte interface demonstrates the ability of the $PYR_{13}FSI$ (1.2M LiFSI, 0.1M $LiPF_6$) electrolyte to create a heavily fluorinated CEI in situ (during electrochemical cycling), showing increasing fluorine content with proximity to the LMR surface, as shown in FIG. 22D. This indicates the sacrificial nature and preferential decomposition of the $LiPF_6$ additive at high voltages. Of high importance is the evidence of transition metals (TMs: Ni, Mn) throughout the CEI formed in conventional electrolyte, as shown in FIG. 22A. Contrastingly, TM traces do not appear in the CEI formed in the fluorinated RTIL until 40 nm depth. This is indicative of a much higher degree of TM leaching in conventional electrolyte as compared to the modified RTIL and also suggests a thin, 40-80 nm thick CEI formed in the optimized RTIL electrolyte (the CEI formed in conventional electrolyte was found to be >150 nm thick). The XPS spectra deconvolutions provided in FIGS. 22A-22C display the molecular constituents found on the CEIs formed in each electrolyte tested, with LiF found in electrolytes containing the $LiPF_6$ salt. While the CEIs formed in both modified RTIL and conventional electrolytes contain significant contents of favorable fluorinated compounds (LiF), the parasitic byproducts of EC and DEC breakdown likely attack the LMR surface and exacerbate phase transformation and TM dissolution. $H^+$ formation in the organic electrolyte is inferred by the formation of C—F bonds found in the CEI of the sample cycled in EC/DEC (1M $LiPF_6$) electrolyte. Based on this interfacial characterization, favorable LMR/modified RTIL interfacial behavior may be induced through the in situ formation of a heavily fluorinated interface, leveraging the electrochemical properties of a high voltage RTIL-based electrolyte and the chemical interplay between the LMR lattice and the decomposition products of a sacrificial salt additive.

High-Resolution Microscopy: Crystallography

Figure 23:
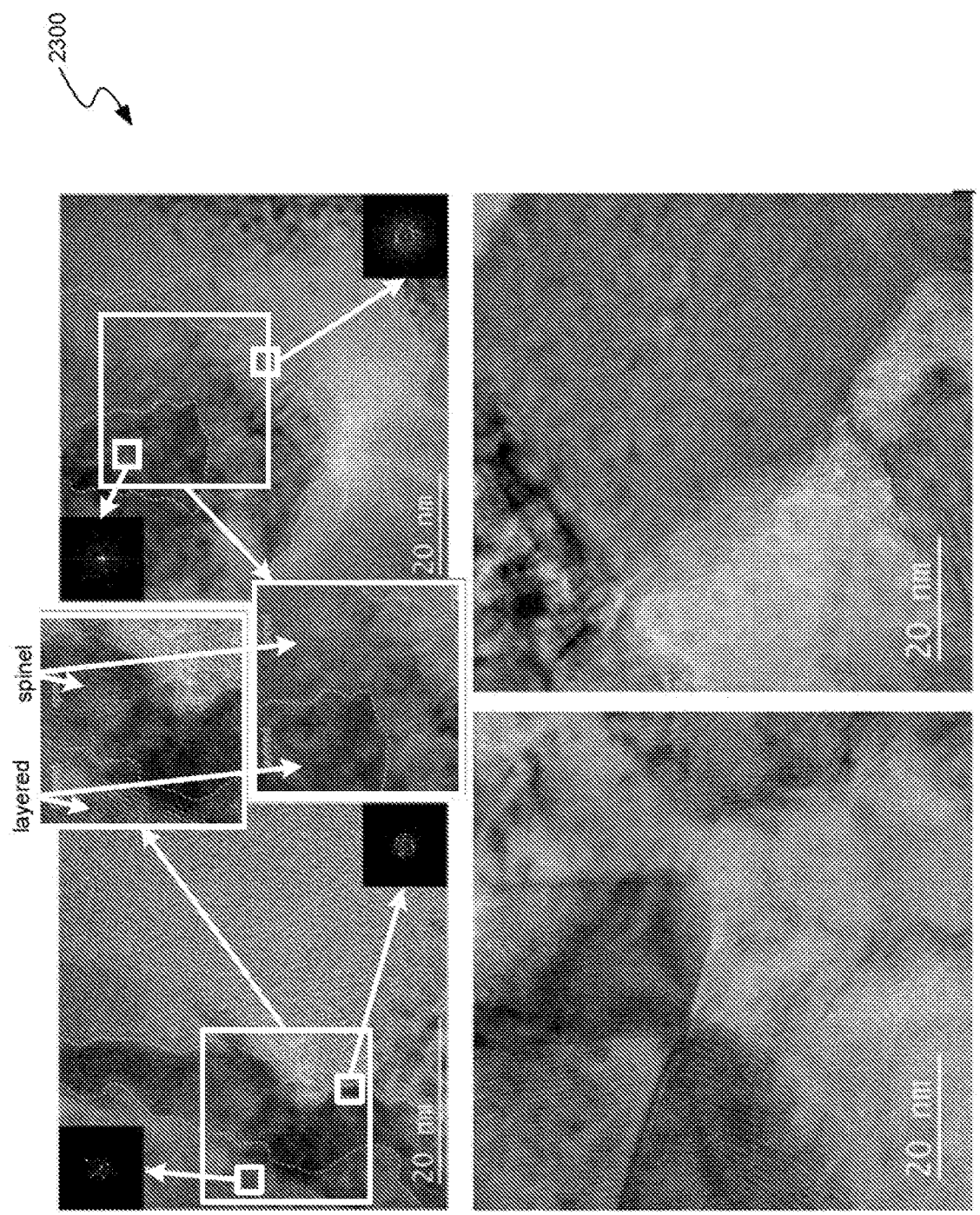
FIG. 23 shows crystallographic analysis of LMR particles after cycling (RTIL+LiPF$_6$ on left, conventional electrolyte on right).

The most effective means of confirming the proposed interfacial mechanism behind the observed LMR energy retention is the direct observation of phase stability via high resolution microscopy. To investigate the physical implications of the CEI formed in situ between the LMR and the modified RTIL, high resolution transmission electron microscopy (HR-TEM) was performed on electrode samples after undergoing 1 and 100 cycles in both conventional and modified RTIL electrolytes, as shown in FIG. 23. FIG. 23 shows crystallographic analysis of LMR particles after cycling. HR-TEM images 2300 of LMR particles cycled in modified RTIL electrolyte are shown in the top left and bottom left of FIG. 23. HR-TEM images 2300 of LMR particles cycled in conventional organic electrolyte are shown in the top right and bottom right of FIG. 23.

The HR-TEM images 2300 are of the outer edge of LMR particles cycled 100 times. The surface reconstruction layer (SRL) formed in the LMR particles extended into the interior of the particles, though its localization is still restricted to the particle edge. The SRL formed in the sample cycled in modified RTIL extends to a thickness of just 5-10 nm compared to at least 20 nm in conventional electrolyte. Fast Fourier Transform (FFT) analysis identified layered regions at the center of the particles and spinel-like structures at the particle edge and throughout the particles cycled in conventional electrolyte. Of high importance is the relative disorder found in the LMR particles cycled in conventional electrolyte; a highly irregular surface is visible, likely caused by continuous attack by electrolyte decomposition byproducts and particle breakage, along with evidence of seemingly amorphous domains. As formation of spinel intergrowths dominates the bulk structure, severe strains and lattice distortion (due to the Jahn-Teller effect induced by the presence of $Mn^{3+}$ in the spinel crystal) leads to the formation of amorphous regions with indistinct FFT. After 100 cycles in conventional electrolyte, the spinel/amorphous regions dominate both the bulk and particle edge whereas the LMR particles cycled in modified RTIL retain their layered structure except at the particle edge.

This TEM analysis allows for the direct observation of increased LMR phase stability in the modified RTIL electrolyte. TEM imaging substantiates the characterization described above, finding activation and formation of a SRL during early cycling while showing evidence of long-term phase stability in the bulk of the LMR particles.

Nickel-Rich (NMC) Oxide Cathode

Most efforts aimed at solving the aforementioned problems with the $LiNi_xM_{1-x}O_2$ material attempt to passivate the electrode-electrolyte interface using complex surface modifications, often with a conductive polymer. Despite resulting in significant improvements in cycling stability, such advances are not sufficient for commercial application, which requires high stability for over 1000 cycles.

The hypothesis behind the work presented in this disclosure was formulated by observing the origins of the phase change and metal dissolution which plague the nickel-rich material. This phase change is intimately linked to the dissolution of $Mn^{2+}$ and $Ni^{2+}$ ions, which are formed during the disproportionation of $Mn^{3+}$ and $Ni^{3+}$, and is also known to lead to the Mn and Ni migration associated with layered-to-spinel phase change. These mechanisms are closely related to the decomposition of organic electrolytes most typically used to study high-voltage materials. Carbonate electrolytes, including those containing $LiPF_6$, undergo oxidative decomposition during battery charging above 4.4 V vs. $Li/Li^+$, forming acidic $H^+$ and HF species. Subsequently, these protons promote disproportionation of $Mn^{3+}$ and $Ni^{3+}$, accelerating the dissolution/migration of Mn and Ni and leading to the capacity fade that stigmatizes the nickel-rich chemistry. Also of note is the fact that the spinel phase of oxide materials is more thermodynamically stable in acidic environments. Moreover, the accumulation of a thick solid electrolyte interphase layer on the cathode and attack by acidic species readily damage the electrode/electrolyte interface, inducing large charge transfer resistances ($R_{ct}$) that reduce capacity and rate performance.

The ability to synthesize high-purity FSI-compounds is a recent development. Conventional techniques typically do not utilize these high-purity electrolyte materials. By stabilizing the nickel-rich cathode-electrolyte interface, the rate of metal dissolution of the electroactive material using a $PYR_{13}FSI$ (1.2M LiFSI) electrolyte is reduced. The only known way to achieve stable capacities in the nickel-rich oxide material is to reduce or eliminate metal ion migration into lithium sites and loss of active material caused by metal ion dissolution.

By utilizing the imide-based $PYR_{13}FSI$ (1.2M LiFSI) electrolyte, along with fluorinated electrolyte additives, the nickel-rich oxide cathode material may be successfully stabilized. Cycling between 2.5-4.2 V vs. $Li/Li^+$, this electrolyte system allows for 100% capacity retention at a high rate of 1 C for >150 cycles. In addition, cycling between 2.5-4.5 V vs. $Li/Li^+$ in this imide-based electrolyte allows for 100% capacity retention at the rate of 1 C over 100+ cycles. This is, to the knowledge of the inventors, the first time that 100% capacity retention of the nickel-rich oxide material has been demonstrated over long-term cycling.

Returning to FIG. 2, the cathode 205 includes a transition metal oxide material 207. Exemplary transition metal oxide materials 207 suitable for use in connection with forming the cathode 205 include an over-lithiated oxide material and a nickel-rich oxide material.

The cathode 205 is an electrode by which electrons enter the energy storage device 201 during discharging. The cathode 205 is not limited to being formed from a particular material. In some embodiments, the cathode 205 includes a transition metal oxide material 207, such as a nickel-rich oxide material having the formula $Li(Ni_xMn_yCo_zR_w)O_2$ (x+y+z+w=1, x>⅓, R=Aluminum or other metal). In some embodiments, the nickel-rich oxide material includes $Li(Ni_{0.6}Mn_{0.2}Co_{0.2})O_2$ ("NMC622" or "NMC[622]"), $Li(Ni_{0.8}Mn_{0.1}Co_{0.01})O_2$ ("NMC811" or "NMC[811]"), or $Li(Ni_{0.8}Co_{0.15}Al_{0.05})O_2$ ("NCA").

In some embodiments, the nickel-rich oxide material comprises a doped over-lithiated oxide material. Doped nickel-rich oxide materials are formed by including an anion dopant or a cation dopant in the nickel-rich oxide material. Exemplary anion dopants include halides, such as fluorine, chlorine, and bromine or combinations thereof. Exemplary cation dopants include elements such as boron, aluminum, zinc, chromium, titanium, calcium, and gallium or combinations thereof. In some embodiments, the weight percent of the nickel-rich oxide material is between about eighty percent of the weight of the cathode and about ninety-five percent of the weight of the cathode. In some embodiments, the cathode 205 undergoes a pretreatment. Pretreatment includes forming a film including carbon, lithium, fluorine, sulfur, and oxygen on materials or particles. Nickel-rich oxide materials or particles and over-lithiated oxide materials or particles can be pretreated. Exemplary methods of pretreatment include coating materials or particles through molecular layer deposition, atomic layer deposition, dip coating, and etching. The molecular layer deposition and atomic layer deposition methods of pretreatment induce chemical reactions on the surface of materials or particles that create a film having a particular composition. Selection of the reaction precursors substantially determine the film composition. Dip coating refers to a process by which materials or particles are dipped into reactants sequentially to form the desired film. Etching utilizes an acid, such as hydrofluoric acid or sulfuric acid, to alter the surface of materials or particles and induce a fluorine/sulfur rich surface composition. The film thickness resulting from acid etching is typically less than about ten nanometers, while for the molecular layer deposition, atomic layer deposition, and dip coating methods the thickness of the film is controlled by the number of times the reaction is performed. Thus, atomic layer deposition, molecular layer deposition, and dip coating enable the formation of films having a thickness of hundreds of nanometers.

Imide-Based Room Temperature Ionic Liquid $PYR_{13}FSI$ (1.2M LiFSI) is an exemplary imide-based room temperature ionic liquid 209 suitable for use in connection with the energy storage device 201 shown in FIG. 2. $PYR_{13}$ is N-methyl-N-propyl pyrrolidinium formed by protonation of pyrrolidine. FSI is the anion bis(fluorosulfonyl) imide. In some embodiments, the LiFSI has a concentration of 1.2M. A room temperature ionic liquid functions as an electrolyte in the energy storage device 201. A room temperature ionic liquid is any salt that has a melting point below the ambient temperature. Exemplary imide-based room temperature ionic liquids suitable for use in connection with the energy storage device 201 include room temperature ionic liquids that include FSI anions or TFSI anions. In some embodiments, the imide-based room temperature ionic liquid 209 includes an additive or co-solvent. Exemplary additives suitable for use in connection with some embodiments include lithium hexafluorophosphate and lithium salts. A cosolvent additive is a second solvent added to enhance the solvent power of the primary solvent. In some embodiments, the fluorinated cosolvent additive enhances the solvent power of the imide-based room temperature ionic liquid 209. Exemplary co-solvents suitable for use in connection with some embodiments include a fluorinated co-solvents such as fluoroethylene carbonate (FEC) and di(2,2,2 trifluoroethyl)carbonate (DFDEC). Fluoroethylene carbonate is a fluorinated cyclic carbonate. When used in lithium-ion energy storage devices, chemical cells, or batteries fluoroethylene carbonate enables the formation of a thin and stable solid electrolyte interphase layer, which is insoluble in the electrolyte, in turn increasing the cycling efficiency of the lithium-ion electrochemical cell.

Methods

Figure 24:
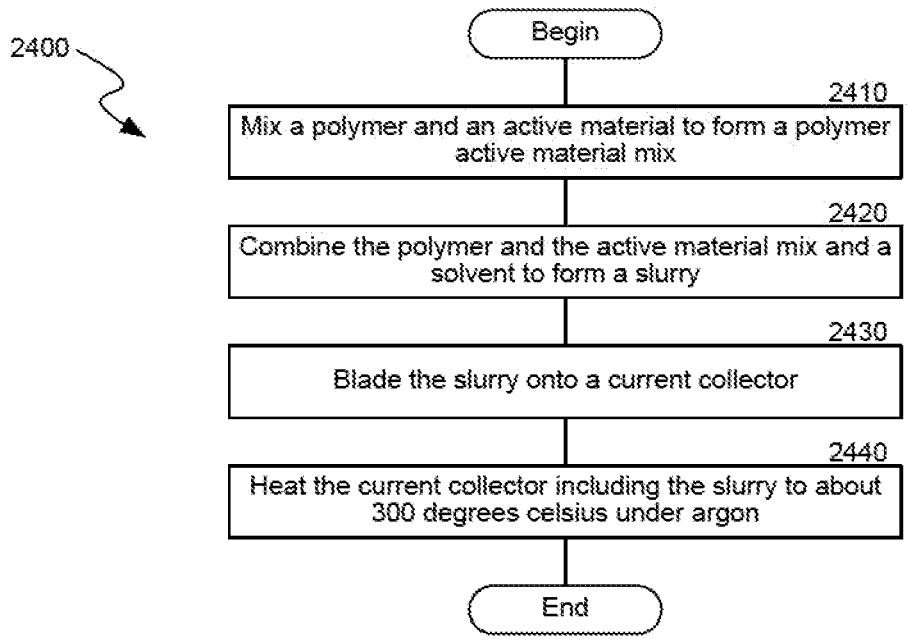
FIG. 24 shows a flow diagram of a method for forming an anode in accordance with various aspects of the present disclosure.

FIG. 24 shows a flow diagram of a method 2400 for forming an anode. In some embodiments, the method 2400 includes mixing a polymer and an active material to form a polymer active material mix (block 2410), combining the polymer active material mix and a solvent to form a slurry (block 2420), blading the slurry onto a current collector (block 2430), and heating the current collector including the slurry to about from 200 to 500 degrees Celsius under argon (block 2440). In some embodiments, mixing the polymer and the active material to form a polymer active material mix includes mixing polyacrylonitrile and one or more silicon particles having a diameter of between about one micrometer and about fifty micrometers. In some embodiments, combining the polymer and the solvent to form a slurry includes combining polyacrylonitrile and dimethylformamide to form the slurry.

Figure 25:
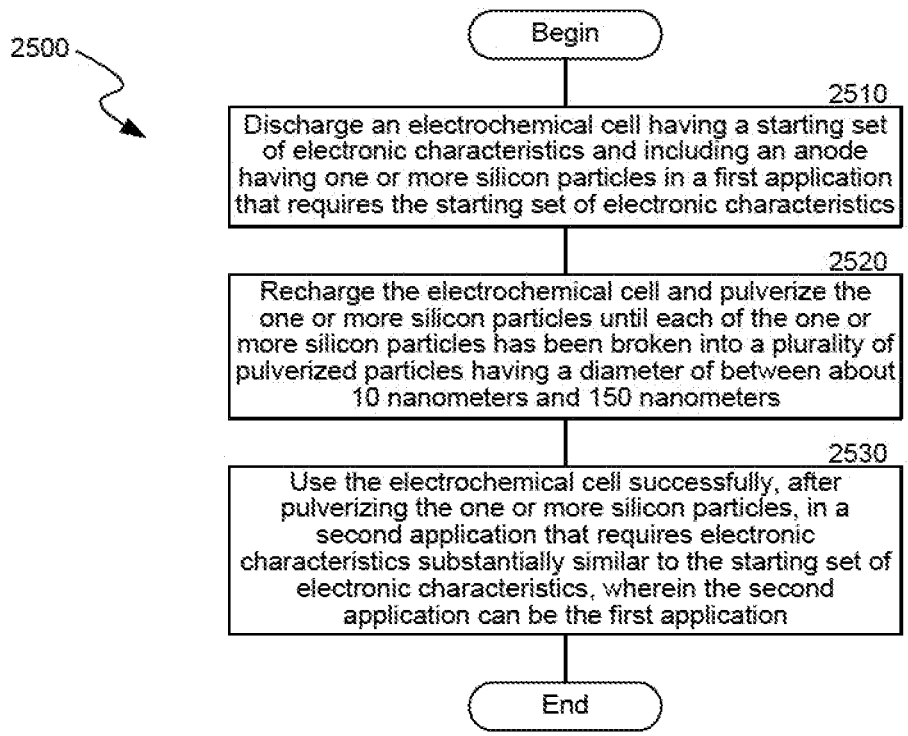
FIG. 25 shows a flow diagram of a method including discharging an electrochemical cell, recharging the electrochemical cell and pulverizing the one or more silicon particles, and using the electrochemical cell successfully, after pulverizing the one or more silicon particles in accordance with various aspects of the present disclosure.

FIG. 25 shows a flow diagram of a method 2500 including discharging an electrochemical cell having a starting set of electronic characteristics and including an anode having one or more silicon particles in a first application that requires the starting set of electronic characteristics (block 2510), recharging the electrochemical cell and pulverizing the one or more silicon particles until each of the one or more silicon particles has been broken into a plurality of pulverized particles having a diameter of between about 10 nanometers and about 150 nanometers (block 2520), and using the electrochemical cell successfully, after pulverizing the one or more silicon particles, in a second application that requires electronic characteristics substantially similar to the starting set of electronic characteristics, wherein the second application can be the first application (block 2530).

Figure 26:
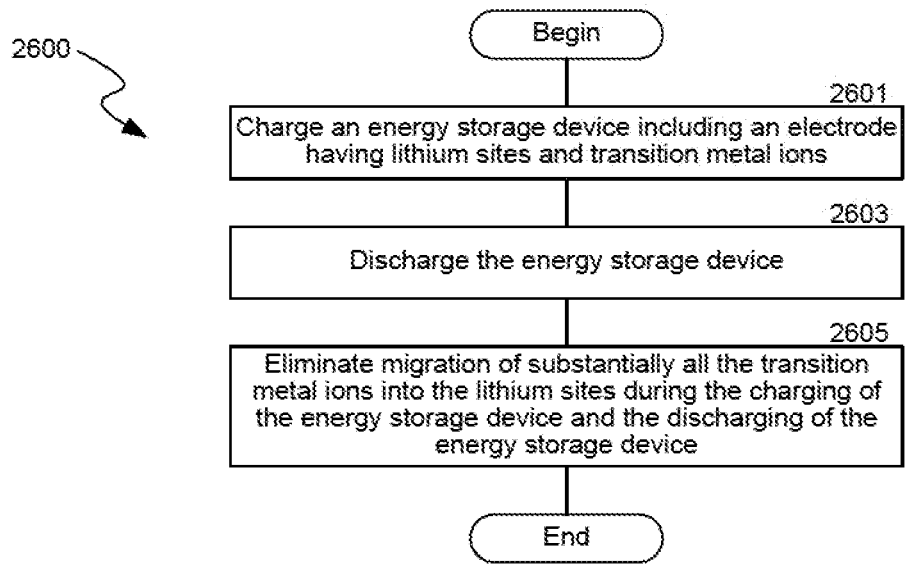
FIG. 26 shows a flow diagram of a method including charging an energy storage device including an electrode having lithium sites and transition metal ions, discharging the energy storage device, and eliminating migration of substantially all the transition metal ions into the lithium sites during the charging of the energy storage device and the discharging of the energy storage device in accordance with various aspects of the present disclosure.

FIG. 26 shows a flow diagram of a method 2600 including charging an energy storage device including an electrode having lithium sites and transition metal ions (block 2601), discharging the energy storage device (block 2603), and eliminating migration of substantially all the transition metal ions into the lithium sites during the charging of the energy storage device and the discharging of the energy storage device (block 2605).

Figure 27:
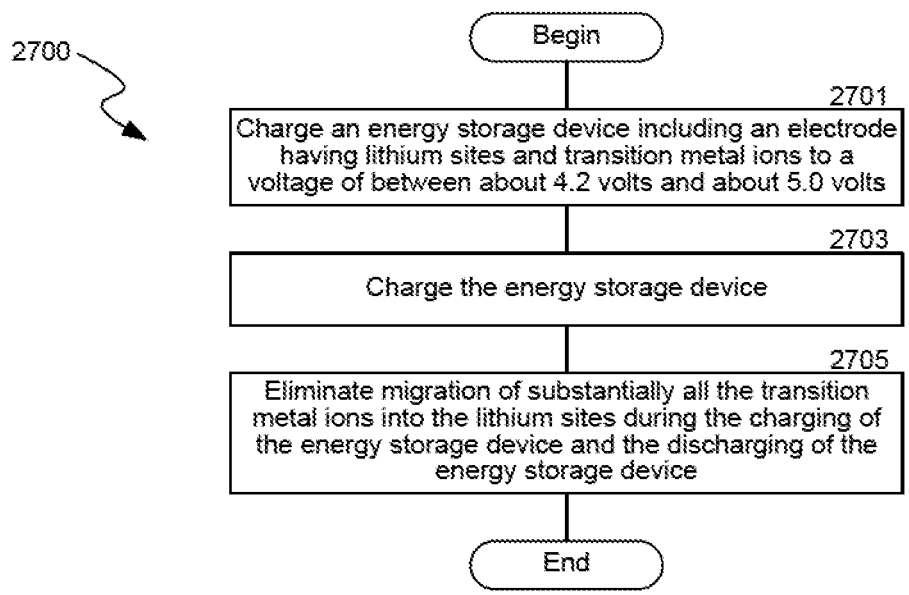
FIG. 27 shows a flow diagram of a method including charging an energy storage device including an electrode having lithium sites and transition metal ions to a voltage of between about 4.2 volts and about 5.0 volts, discharging the energy storage device, and eliminating migration of substantially all the transition metal ions into the lithium sites during the charging of the energy storage device and the discharging of the energy storage device in accordance with various aspects of the present disclosure.

FIG. 27 shows a flow diagram of a method 2700 including charging an energy storage device including an electrode having lithium sites and transition metal ions to a voltage of between about 4.2 volts and about 5.0 volts (block 2701), discharging the energy storage device (block 2703), and eliminating migration of substantially all the transition metal ions into the lithium sites during the charging of the energy storage device and the discharging of the energy storage device (block 2705).

Figure 28:
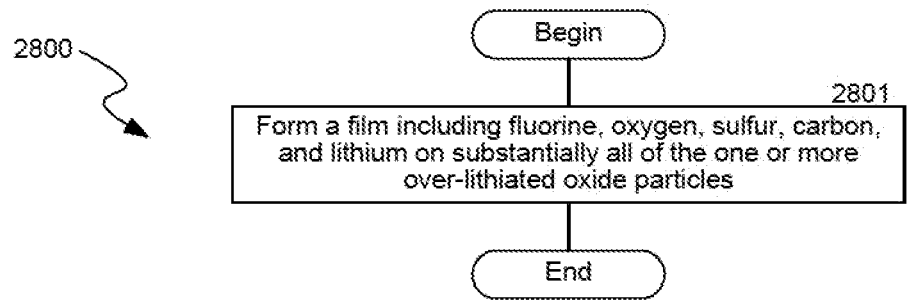
FIG. 28 shows a flow diagram of a method of forming a composition of matter in a battery including an electrode having one or more over-lithiated oxide particles in accordance with various aspects of the present disclosure.

FIG. 28 shows a flow diagram of a method 2800 of forming a composition of matter in a battery including an electrode having one or more over-lithiated oxide particles. The method includes forming a film including fluorine, oxygen, sulfur, carbon, and lithium on substantially all of the one or more over-lithiated oxide particles (block 2801).

Figure 29:
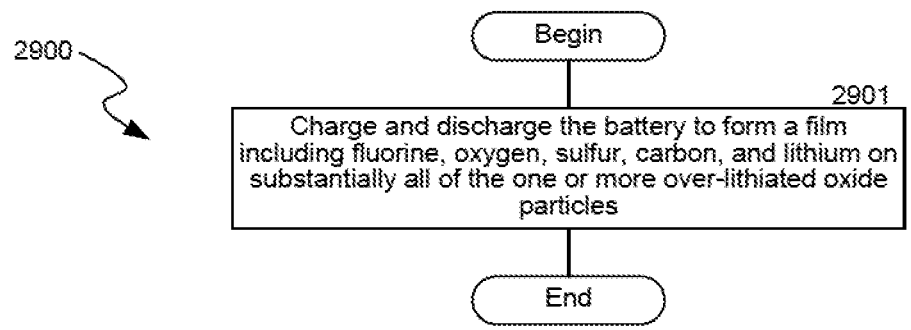
FIG. 29 shows a flow diagram of a method of forming a composition of matter in a battery including an electrode having one or more over-lithiated oxide particles in accordance with various aspects of the present disclosure.

FIG. 29 shows a flow diagram of a method 2900 of forming a composition of matter in a battery including an electrode having one or more over-lithiated oxide particles. The method includes charging and discharging the battery to form a film including fluorine, oxygen, sulfur, carbon, and lithium on substantially all of the one or more over-lithiated oxide particles (block 2901).

Figure 30:
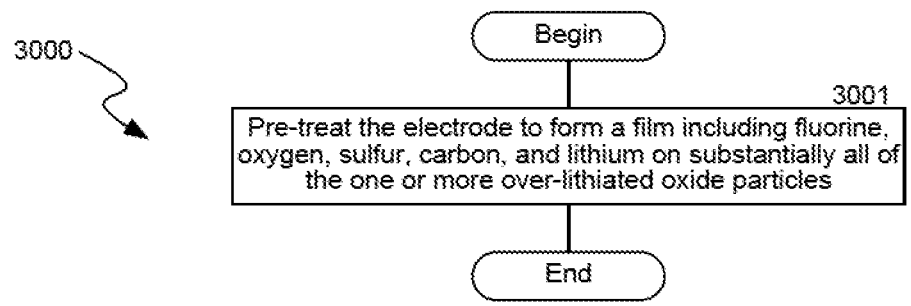
FIG. 30 shows a flow diagram of a method of forming a composition of matter in a battery including an electrode having one or more over-lithiated oxide particles in accordance with various aspects of the present disclosure.

FIG. 30 shows a flow diagram of a method 3000 of forming a composition of matter in a battery including an electrode having one or more over-lithiated oxide particles. The method includes pre-treating the electrode to form a film including fluorine, oxygen, sulfur, carbon, and lithium on substantially all of the one or more over-lithiated oxide particles (block 3001).

Figure 31:
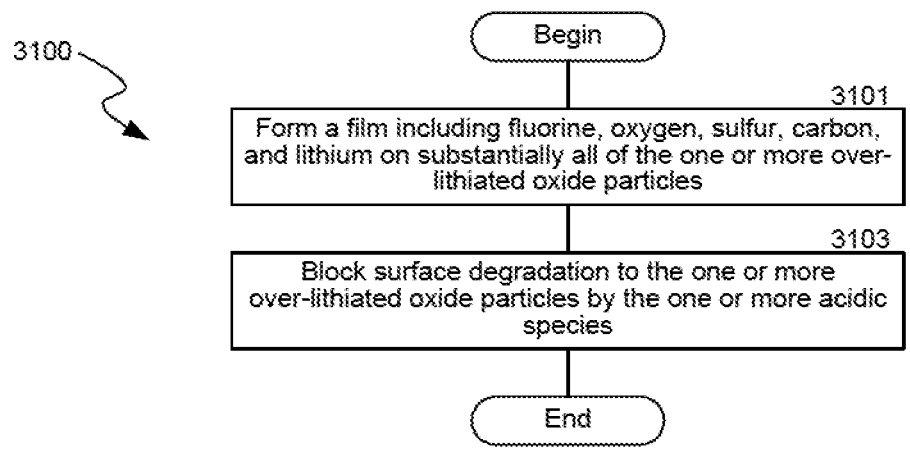
FIG. 31 shows a flow diagram of a method of forming a composition of matter in a battery including an electrode having one or more over-lithiated oxide particles and an electrolyte including one or more acidic species in accordance with various aspects of the present disclosure.

FIG. 31 shows a flow diagram of a method 3100 of forming a composition of matter in a battery including an electrode having one or more over-lithiated oxide particles and an electrolyte including one or more acidic species. The method includes forming a film including fluorine, oxygen, sulfur, carbon, and lithium on substantially all of the one or more over-lithiated oxide particles (block 3101), and blocking surface degradation to the one or more over-lithiated oxide particles by the one or more acidic species (block 3103).

Figure 32:
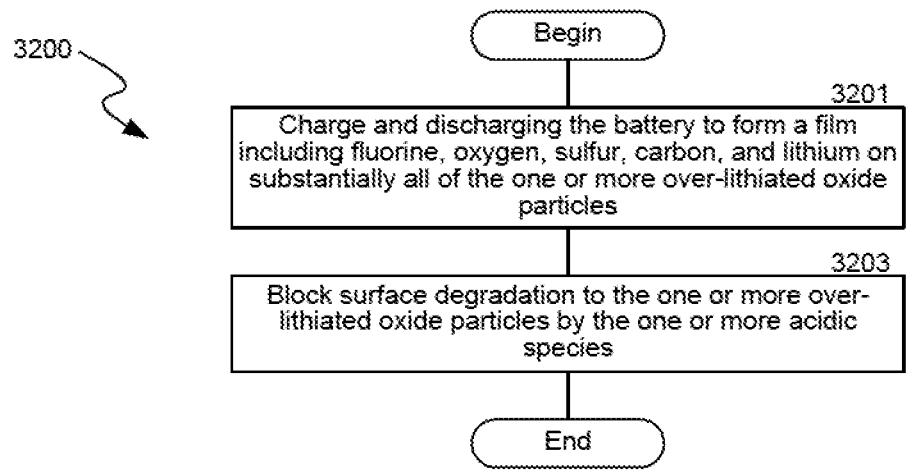
FIG. 32 shows a flow diagram of a method of forming a composition of matter in a battery including an electrode having one or more over-lithiated oxide particles and an electrolyte including one or more acidic species in accordance with various aspects of the present disclosure.

FIG. 32 shows a flow diagram of a method 3200 of forming a composition of matter in a battery including an electrode having one or more over-lithiated oxide particles and an electrolyte including one or more acidic species. The method includes charging and discharging the battery to form a film including fluorine, oxygen, sulfur, carbon, and lithium on substantially all of the one or more over-lithiated oxide particles (block 3201), and blocking surface degradation to the one or more over-lithiated oxide particles by the one or more acidic species (block 3203).

Figure 33:
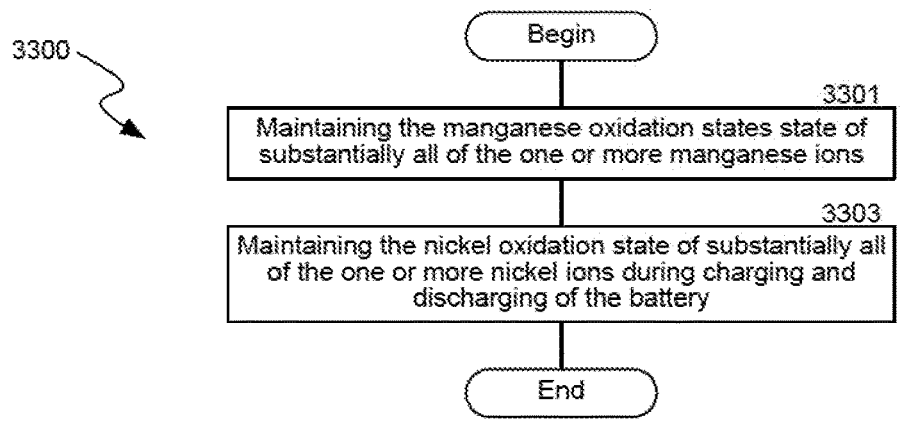
FIG. 33 shows a flow diagram of a method in a battery including an over-lithiated oxide material having a crystal structure including one or more manganese ions and one or more nickel ions with each of the one or more manganese ions having a manganese oxidation state and each of the one or more nickel ions having an a nickel oxidation state in accordance with various aspects of the present disclosure.

FIG. 33 shows a flow diagram of a method 3300 in a battery including an over-lithiated oxide material having a crystal structure including one or more manganese ions and one or more nickel ions with each of the one or more manganese ions having a manganese oxidation state and each of the one or more nickel ions having an a nickel oxidation state. The method includes maintaining the manganese oxidation states state of substantially all of the one or more manganese ions (block 3301), and maintaining the nickel oxidation state of substantially all of the one or more nickel ions during charging and discharging of the battery (block 3303).

Figure 34:
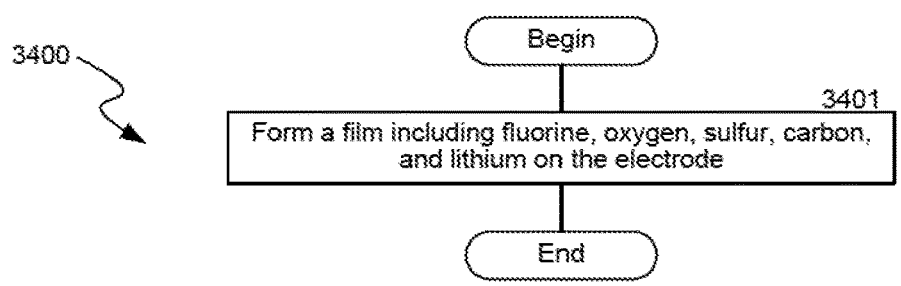
FIG. 34 shows a flow diagram of a method in a battery that evolves an amount of oxygen during operation, the battery including an electrode having an over-lithiated oxide material, the method for lowering the amount of oxygen evolved from the over-lithiated oxide material during operation of the battery in accordance with various aspects of the present disclosure.

FIG. 34 shows a flow diagram of a method 3400 in a battery that evolves an amount of oxygen during operation, the battery including an electrode having an over-lithiated oxide material, the method for lowering the amount of oxygen evolved from the over-lithiated oxide material during operation of the battery. The method includes forming a film including fluorine, oxygen, sulfur, carbon, and lithium on the electrode (block 3401).

Figure 35:
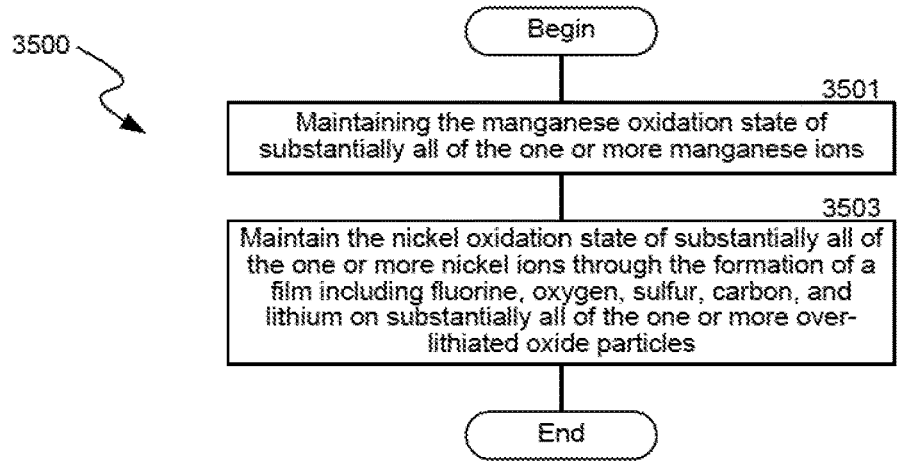
FIG. 35 shows a method in a battery including one or more over-lithiated oxide particles, each of the one or more over-lithiated oxide particles having a crystal structure including one or more manganese ions and one or more nickel ions with each of the one or more manganese ions having a manganese oxidation state and each of the one or more nickel ions having an a nickel oxidation state in accordance with various aspects of the present disclosure.

FIG. 35 shows a flow diagram of a method 3500 in a battery including one or more over-lithiated oxide particles, each of the one or more over-lithiated oxide particles having a crystal structure including one or more manganese ions and one or more nickel ions with each of the one or more manganese ions having a manganese oxidation state and each of the one or more nickel ions having an a nickel oxidation state. The method includes maintaining the manganese oxidation state of substantially all of the one or more manganese ions (block 3501), and maintaining the nickel oxidation state of substantially all of the one or more nickel ions through the formation of a film including fluorine, oxygen, sulfur, carbon, and lithium on substantially all of the one or more over-lithiated oxide particles (block 3503).

Figure 36:
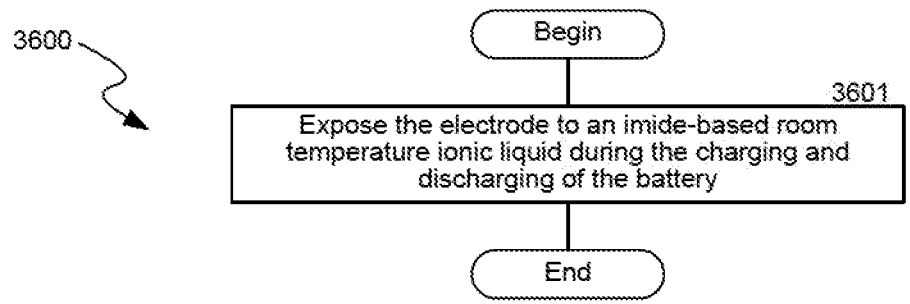
FIG. 36 shows a flow diagram of a method of forming a film comprising fluorine, oxygen, sulfur, carbon, and lithium on an electrode including an over-lithiated oxide material by charging and discharging of a battery including the electrode in accordance with various aspects of the present disclosure.

FIG. 36 shows a flow diagram of a method 3600 of forming a film comprising fluorine, oxygen, sulfur, carbon, and lithium on an electrode including an over-lithiated oxide material by charging and discharging of a battery including the electrode. The method includes exposing the electrode to an imide-based room temperature ionic liquid during the charging and discharging of the battery (block 3601).

Figure 37:
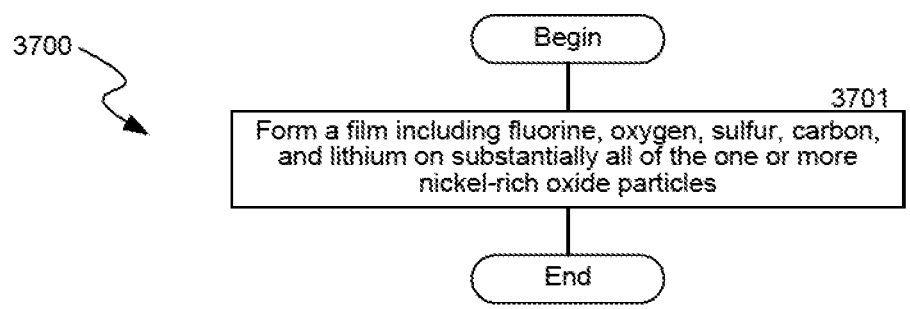
FIG. 37 shows a flow diagram of a method of forming a composition of matter in a battery including an electrode having one or more nickel-rich oxide particles in accordance with various aspects of the present disclosure.

FIG. 37 shows a flow diagram of a method 3700 of forming a composition of matter in a battery including an electrode having one or more nickel-rich oxide particles. The method includes forming a film including fluorine, oxygen, sulfur, carbon, and lithium on substantially all of the one or more nickel-rich oxide particles (block 3701).

Figure 38:
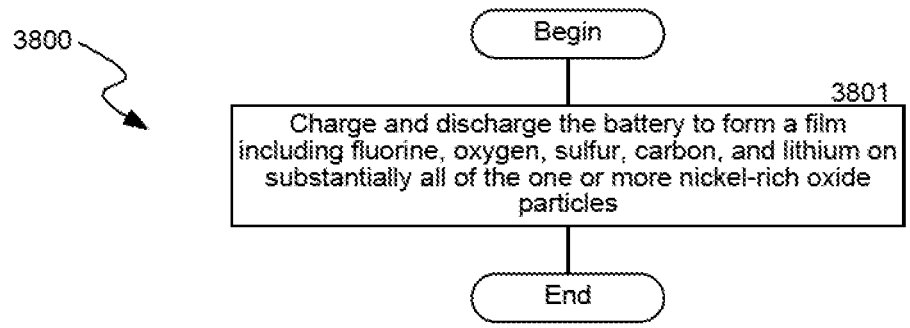
FIG. 38 shows a flow diagram of a method of forming a composition of matter in a battery including an electrode having one or more nickel-rich oxide particles in accordance with various aspects of the present disclosure.

FIG. 38 shows a flow diagram of a method 3800 of forming a composition of matter in a battery including an electrode having one or more nickel-rich oxide particles. The method includes charging and discharging the battery to form a film including fluorine, oxygen, sulfur, carbon, and lithium on substantially all of the one or more nickel-rich oxide particles (block 3801).

Figure 39:
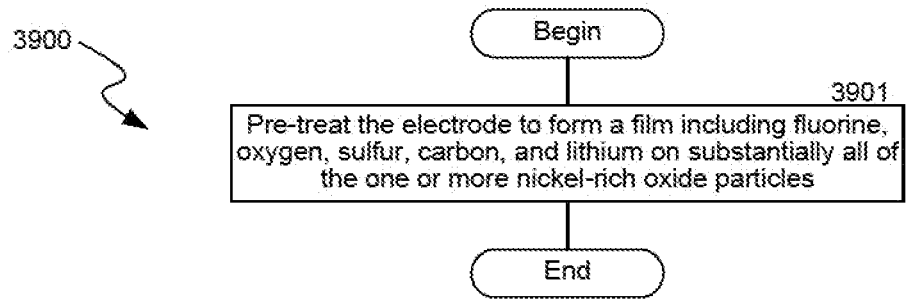
FIG. 39 shows a flow diagram of a method of forming a composition of matter in a battery including an electrode having one or more nickel-rich oxide particles in accordance with various aspects of the present disclosure.

FIG. 39 shows a flow diagram of a method 3900 of forming a composition of matter in a battery including an electrode having one or more nickel-rich oxide particles. The method includes pre-treating the electrode to form a film including fluorine, oxygen, sulfur, carbon, and lithium on substantially all of the one or more nickel-rich oxide particles (block 3901).

Figure 40:
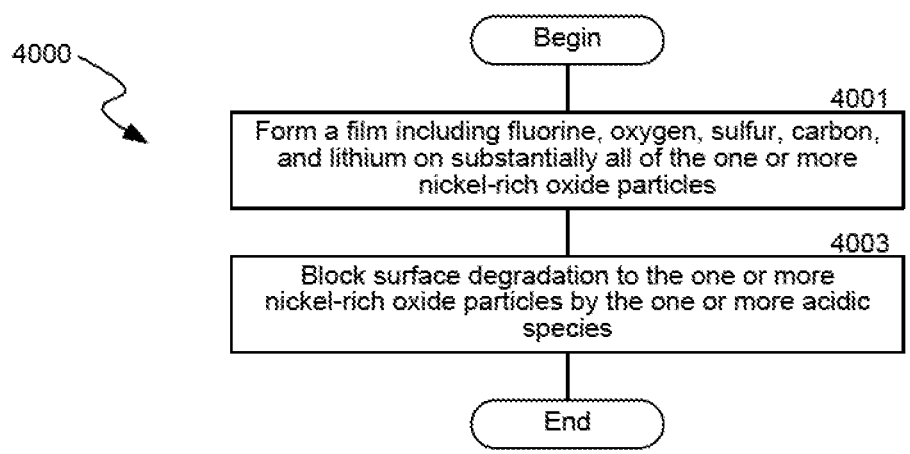
FIG. 40 shows a flow diagram of a method of forming a composition of matter in a battery including an electrode having one or more nickel-rich oxide particles and an electrolyte including one or more acidic species in accordance with various aspects of the present disclosure.

FIG. 40 shows a flow diagram of a method 4000 of forming a composition of matter in a battery including an electrode having one or more nickel-rich oxide particles and an electrolyte including one or more acidic species. The method includes forming a film including fluorine, oxygen, sulfur, carbon, and lithium on substantially all of the one or more nickel-rich oxide particles (block 4001), and blocking surface degradation to the one or more nickel-rich oxide particles by the one or more acidic species (block 4003).

Figure 41:
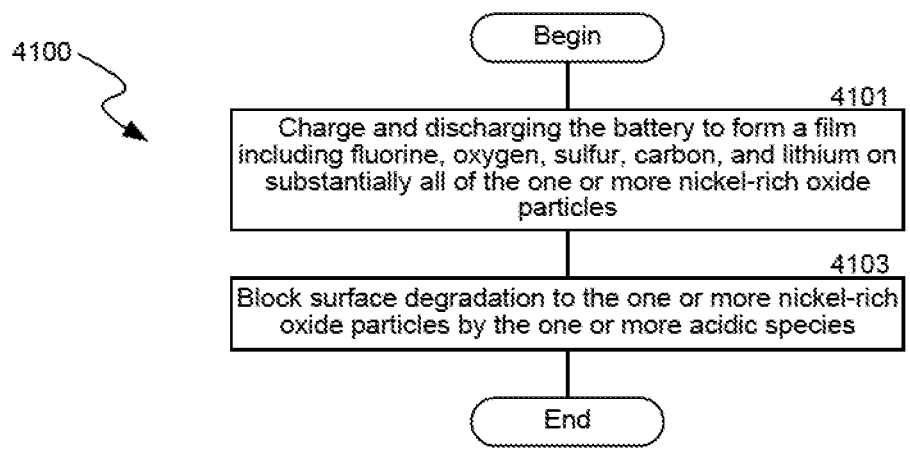
FIG. 41 shows a flow diagram of a method of forming a composition of matter in a battery including an electrode having one or more nickel-rich oxide particles and an electrolyte including one or more acidic species in accordance with various aspects of the present disclosure.

FIG. 41 shows a flow diagram of a method 4100 of forming a composition of matter in a battery including an electrode having one or more nickel-rich oxide particles and an electrolyte including one or more acidic species. The method includes charging and discharging the battery to form a film including fluorine, oxygen, sulfur, carbon, and lithium on substantially all of the one or more nickel-rich oxide particles (block 4101), and blocking surface degradation to the one or more nickel-rich oxide particles by the one or more acidic species (block 4103).

Figure 42:
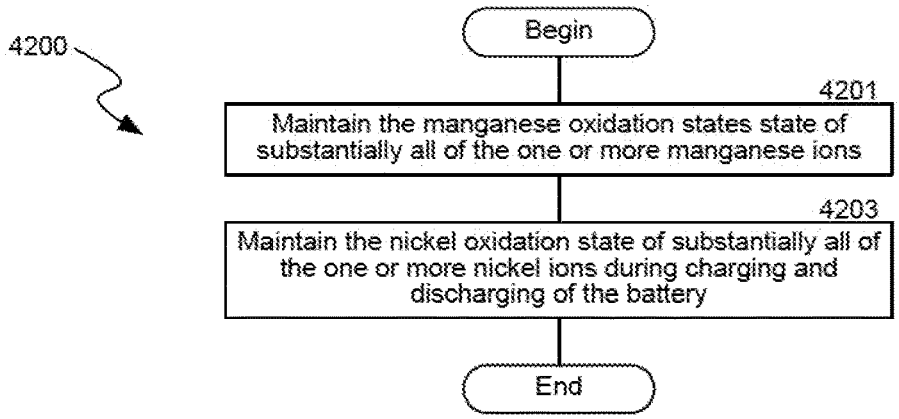
FIG. 42 shows a flow diagram of a method in a battery including a nickel-rich oxide material having a crystal structure including one or more manganese ions and one or more nickel ions with each of the one or more manganese ions having a manganese oxidation state and each of the one or more nickel ions having an a nickel oxidation state in accordance with various aspects of the present disclosure.

FIG. 42 shows a flow diagram of a method 4200 in a battery including a nickel-rich oxide material having a crystal structure including one or more manganese ions and one or more nickel ions with each of the one or more manganese ions having a manganese oxidation state and each of the one or more nickel ions having an a nickel oxidation state. The method includes maintaining the manganese oxidation states state of substantially all of the one or more manganese ions (block 4201), and maintaining the nickel oxidation state of substantially all of the one or more nickel ions during charging and discharging of the battery (block 4203).

Figure 43:
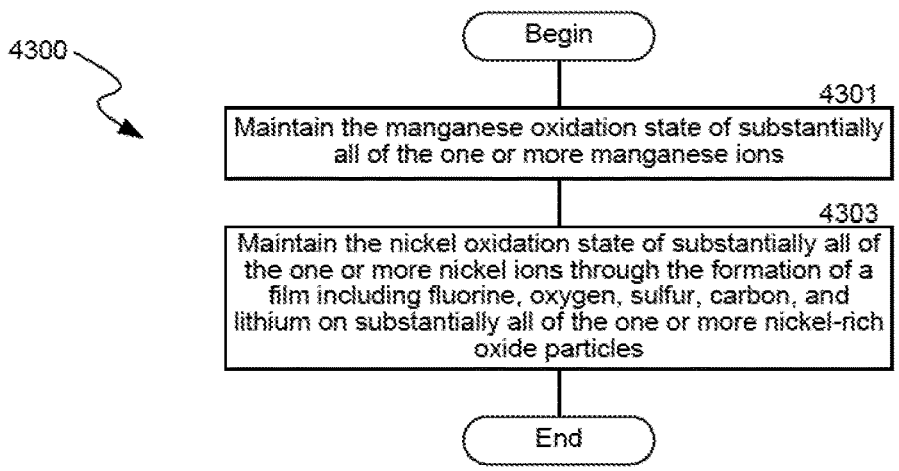
FIG. 43 shows a flow diagram of a method in a battery including one or more nickel-rich oxide particles, each of the one or more nickel-rich oxide particles having a crystal structure including one or more manganese ions and one or more nickel ions with each of the one or more manganese ions having a manganese oxidation state and each of the one or more nickel ions having an a nickel oxidation state in accordance with various aspects of the present disclosure.

FIG. 43 shows a flow diagram of a method 4300 in a battery including one or more nickel-rich oxide particles, each of the one or more nickel-rich oxide particles having a crystal structure including one or more manganese ions and one or more nickel ions with each of the one or more manganese ions having a manganese oxidation state and each of the one or more nickel ions having an a nickel oxidation state. The method includes maintaining the manganese oxidation state of substantially all of the one or more manganese ions (block 4301), and maintaining the nickel oxidation state of substantially all of the one or more nickel ions through formation of a film including fluorine, oxygen, sulfur, carbon, and lithium on substantially all of the one or more nickel-rich oxide particles (block 4303).

Figure 44:
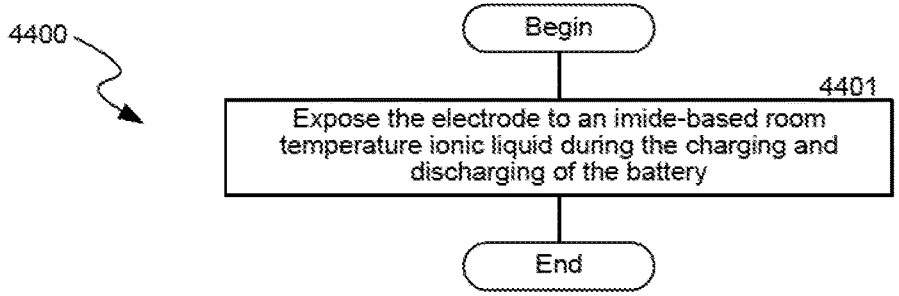
FIG. 44 shows a flow diagram of a method of forming a film comprising fluorine, oxygen, sulfur, carbon, and lithium on an electrode including a nickel-rich oxide material by a charging and discharging of a battery including the electrode in accordance with various aspects of the present disclosure.

FIG. 44 shows a flow diagram of a method 4400 of forming a film comprising fluorine, oxygen, sulfur, carbon, and lithium on an electrode including a nickel-rich oxide material by a charging and discharging of a battery including the electrode. The method includes exposing the electrode to an imide-based room temperature ionic liquid during the charging and discharging of the battery (block 4401).

Composition of Matter

Figure 45:
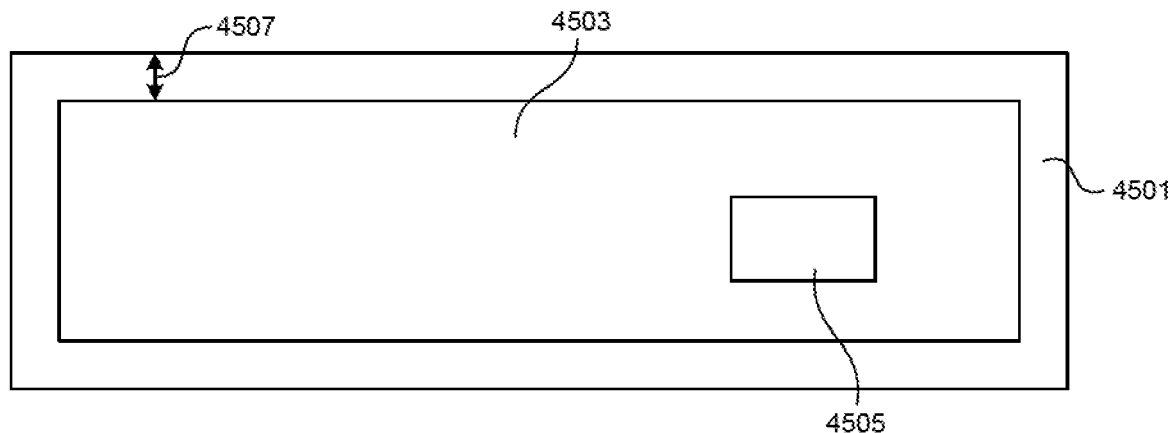
FIG. 45 shows a schematic representation of a composition of matter including a film including fluorine, oxygen, sulfur, carbon, and lithium formed on an electrode including an over-lithiated oxide material in accordance with various aspects of the present disclosure.

FIG. 45 shows a schematic representation of a composition of matter including a film 4501 including fluorine, oxygen, sulfur, carbon, and lithium formed on an electrode 4503 including an over-lithiated oxide material 4505. In some embodiments the over-lithiated oxide material includes $xLi_2MnO_3(1-x)LiMO_2$, (M=Mn, Ni, Co), and (0<x<1). In some embodiments, the over-lithiated oxide material includes $(0.35)Li_2MnO_3$ $(0.65)LiNi_{1/2}Mn_{1/2}O_2$. The thickness of the film can vary. In some embodiments, the film has a thickness 4507 of between about two nanometers and about two hundred nanometers. Although the film primarily includes fluorine, oxygen, sulfur, carbon, and lithium, the film may further include trace elements. Trace elements are elements that occur in small amounts in a sample and do not substantially influence the properties of the sample. Exemplary trace elements that may be included in the film include nitrogen, phosphorous, boron, and one or more halides.

Figure 46:
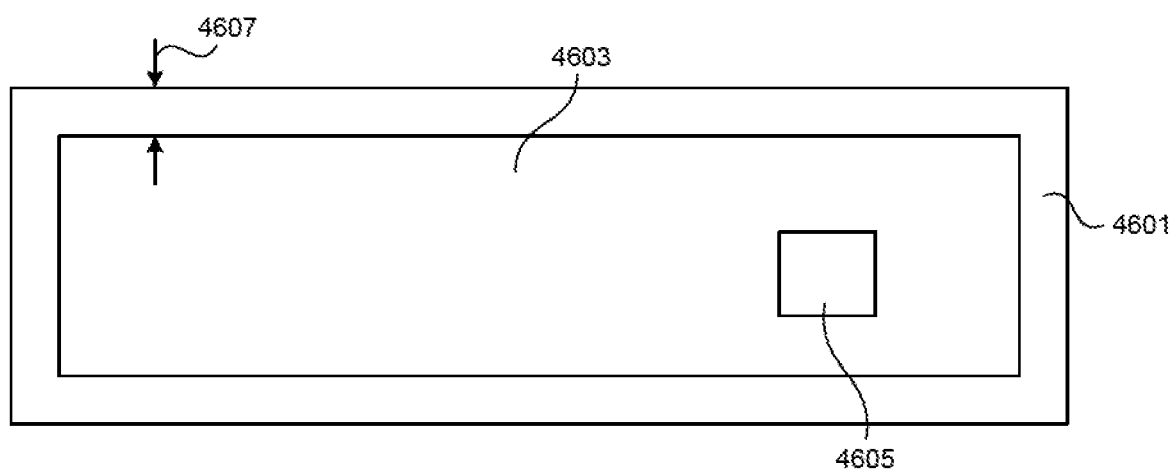
FIG. 46 shows a schematic representation of a composition of matter including a film including fluorine, oxygen, sulfur, carbon, and lithium formed on an electrode including a nickel-rich oxide material in accordance with various aspects of the present disclosure.

FIG. 46 shows a schematic representation of a composition of matter including a film 4601 including fluorine, oxygen, sulfur, carbon, and lithium formed on an electrode 4603 including a nickel-rich oxide material 4605. In some embodiments, the nickel-rich oxide material includes Li$(Ni_x,Mn_y,Co_z)O_2$ (x+y+z=1, x>⅓). In some embodiments, the nickel-rich oxide material includes Li$(Ni_{0.6}Mn_{0.2}Co_{0.2})O_2$. The thickness of the film can vary. In some embodiments, the film has a thickness 4607 of between about two nanometers and about two hundred nanometers. Although the film primarily includes fluorine, oxygen, sulfur, carbon and lithium, the film may further include trace elements. Trace elements are elements that occur in small amounts in a sample and do not substantially influence the properties of the sample. Exemplary trace elements that may be included in the film include nitrogen, phosphorous, boron, and one or more halides.

Electrode and Composition

Figure 47:
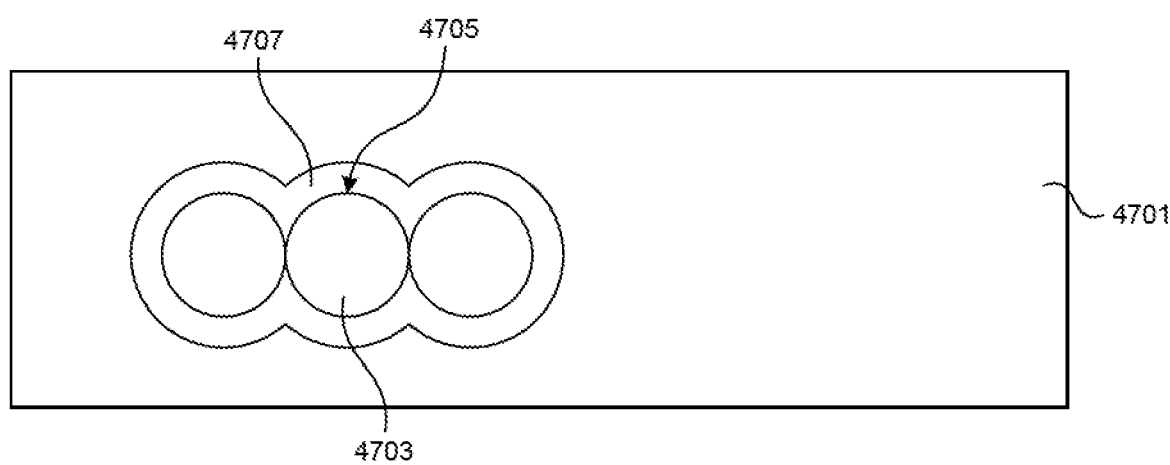
FIG. 47 shows a schematic representation of a composition of matter in an over-lithiated oxide composite electrode including one or more particles having an exposed surface and a film including oxygen, sulfur, carbon, and lithium formed on the exposed surface of substantially every one of the one or more particles in accordance with various aspects of the present disclosure.

FIG. 47 shows a schematic representation of an example of a composition of matter in an over-lithiated oxide composite electrode 4701 including one or more particles 4703 having an exposed surface 4705. If scaled up to a macroscopic size each of the one or particles is analogous to a pebble and the exposed surface of one of the one or more particles is any surface of the one or more particles that when immersed in a liquid would be in contact with the liquid. The composition of matter includes a film 4707 including fluorine, oxygen, sulfur, carbon, and lithium formed on the exposed surface 4705 of substantially every one of the one or more particles 4703.

Figure 48:
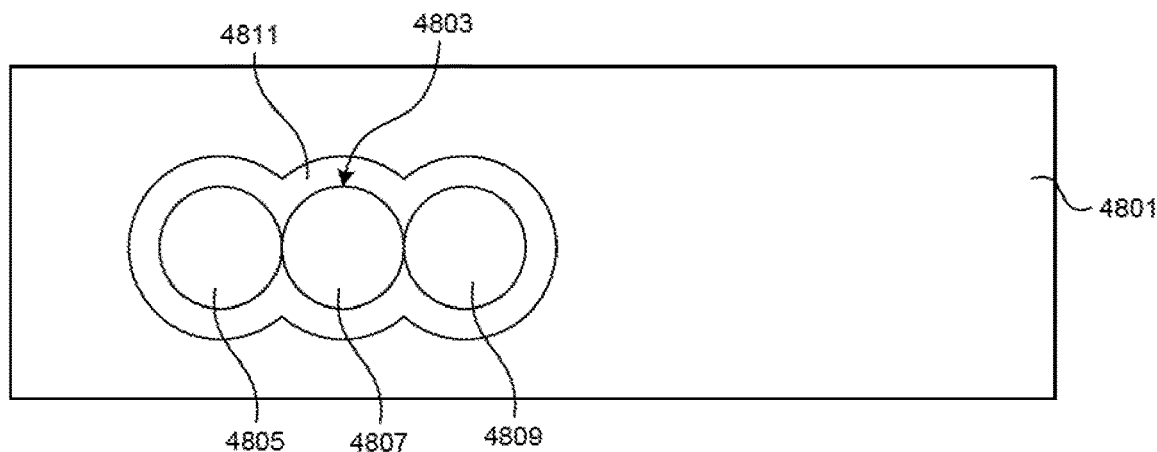
FIG. 48 shows a schematic representation of an electrode having a surface in accordance with various aspects of the present disclosure.

FIG. 48 shows a schematic representation of an example of an electrode 4801 having a surface 4803. The electrode 4801 is porous and the surface extends into the interior of the electrode 4801. The electrode includes one or more active materials including an over-lithiated oxide material 4805, a conductive material 4807 to transport electrons, a binder 4809 including a polymer, the binder 4809 to bind the one or more active materials including the over-lithiated oxide material 4805, and a film 4811 including fluorine, oxygen, sulfur carbon, and lithium formed on the surface 4803 of the electrode.

Figure 49:
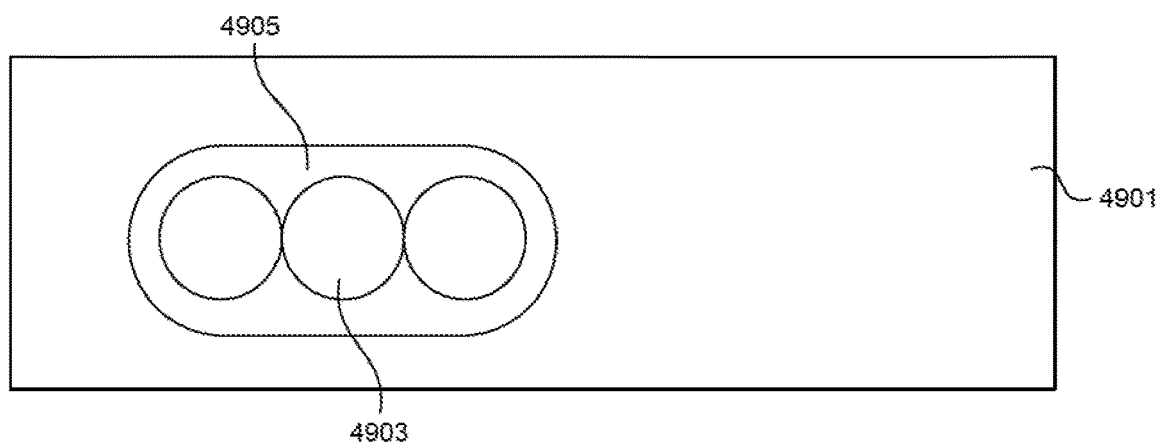
FIG. 49 shows a schematic representation of a composition of matter including an electrode including one or more over-lithiated oxide particles and a film including fluorine, oxygen, sulfur, carbon, and lithium formed on substantially all of the one or more over-lithiated oxide particles in accordance with various aspects of the present disclosure.

FIG. 49 shows a schematic representation of an example of a composition of matter including an electrode 4901 including one or more over-lithiated oxide particles 4903 and a film 4905 including fluorine, oxygen, sulfur, carbon, and lithium formed on substantially all of the one or more over-lithiated oxide particles 4903.

Figure 50:
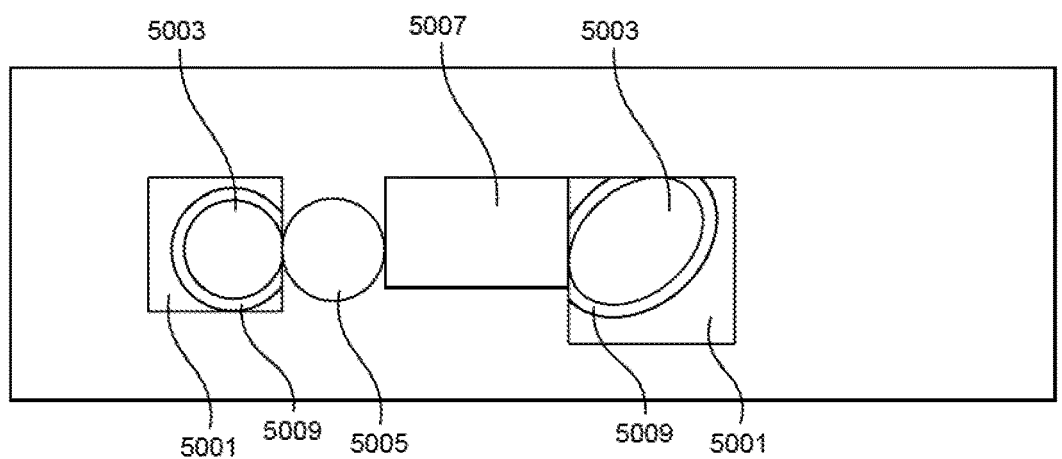
FIG. 50 shows a schematic representation of an electrode including one or more active materials including one or more over-lithiated oxide particles, a conductive material to transport electrons, a binder including a polymer in accordance with various aspects of the present disclosure.

FIG. 50 shows a schematic representation of an example of an electrode including one or more active materials 5001 including one or more over-lithiated oxide particles 5003, a conductive material 5005 to transport electrons, a binder 5007 including a polymer. The binder 5007 binds the one or more active materials 5001 including the one or more over-lithiated oxide particles 5003 and the conductive material 5005. A film 5009 including fluorine, oxygen, sulfur, carbon, and lithium is formed on substantially all of the one or more over-lithiated oxide particles 5003.

Figure 51:
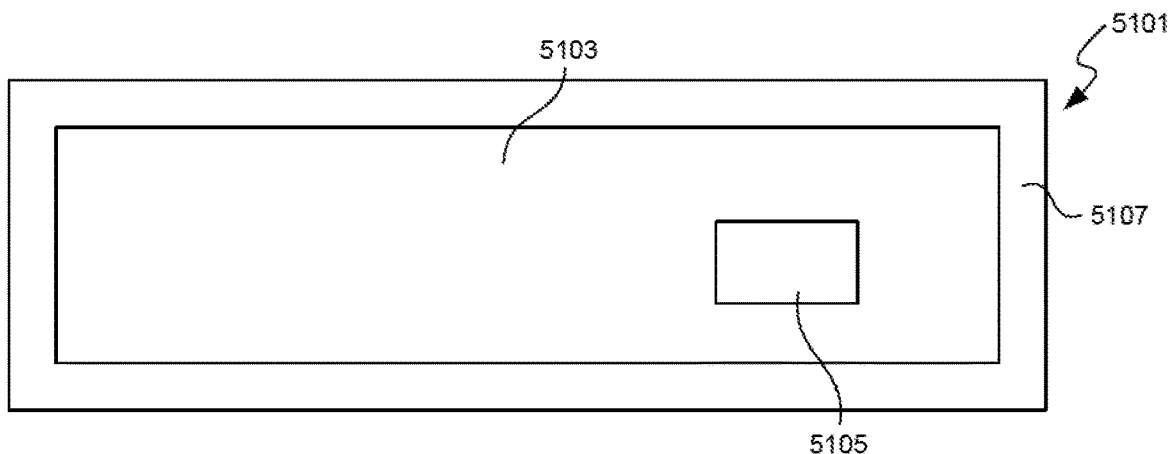
FIG. 51 shows a schematic representation of a coated electrode prepared by exposing an electrode including an over-lithiated oxide material to an imide-based RTIL under conditions where a film forms on the electrode in accordance with various aspects of the present disclosure.

FIG. 51 shows a schematic representation of an example of a coated electrode 5101 prepared by exposing an electrode 5103 including an over-lithiated oxide material 5105 to an imide-based room temperature ionic liquid under conditions where a film 5107 forms on the electrode 5101.

Figure 52:
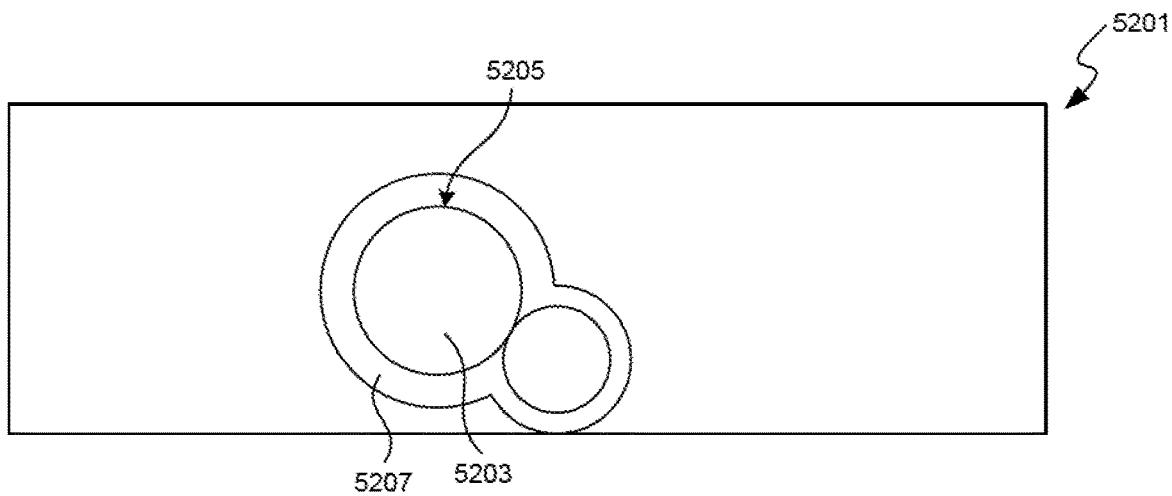
FIG. 52 shows a schematic representation of a composition of matter in a nickel-rich oxide composite electrode including one or more particles having an exposed surface in accordance with various aspects of the present disclosure.

FIG. 52 shows a schematic representation of an example of a composition of matter in a nickel-rich oxide composite electrode 5201 including one or more particles 5203 having an exposed surface 5205. The composition of matter includes a film 5207 including fluorine, oxygen, sulfur, carbon, and lithium formed on the exposed surface 5205 of substantially every one of the one or more particles 5203.

Figure 53:
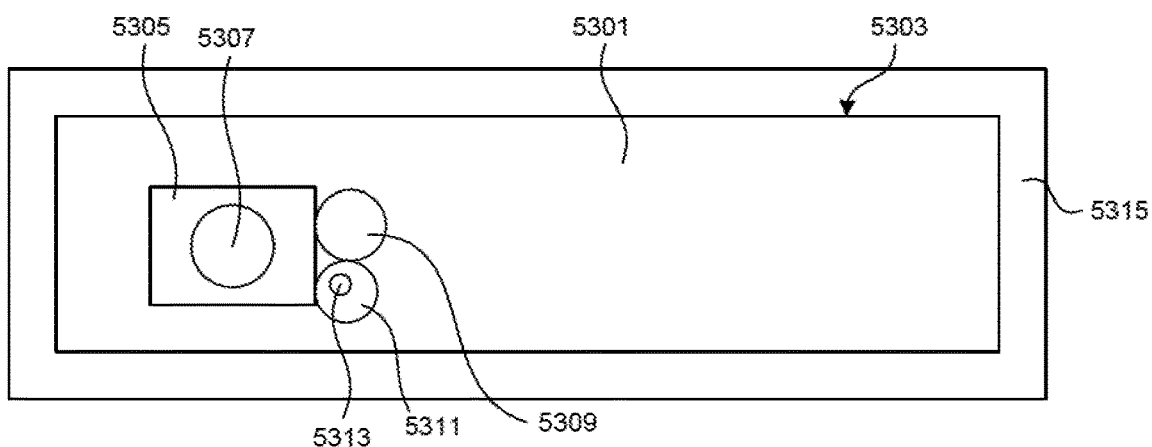
FIG. 53 shows a schematic representation of an electrode having a surface in accordance with various aspects of the present disclosure.

FIG. 53 shows a schematic representation of an example of an electrode 5301 having a surface 5303. The electrode 5301 includes one or more active materials 5305 including a nickel-rich oxide material 5307, a conductive material 5309 to transport electrons, a binder 5311 including a polymer 5313 to bind the one or more active materials 5305 including the nickel-rich oxide material 5307, and a film 5315 including fluorine, oxygen, sulfur carbon, and lithium formed on the surface 5303 of the electrode 5301.

Figure 54:
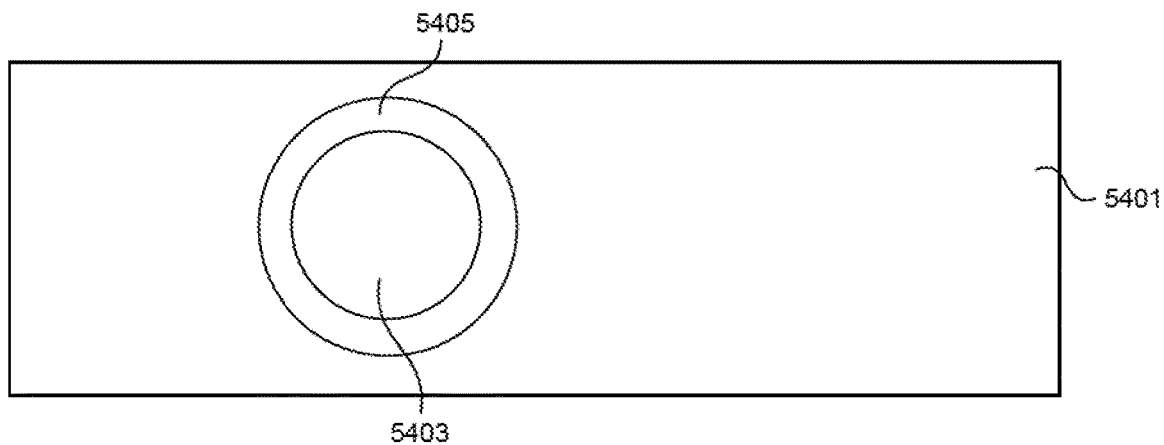
FIG. 54 shows a schematic representation of a composition of matter comprising an electrode including one or more nickel-rich oxide particles and a film including fluorine, oxygen, sulfur, carbon, and lithium formed on substantially all of the one or more nickel-rich oxide particles in accordance with various aspects of the present disclosure.

FIG. 54 shows a schematic representation of an example of a composition of matter comprising an electrode 5401 including one or more nickel-rich oxide particles 5403 and a film 5405 including fluorine, oxygen, sulfur, carbon, and lithium formed on substantially all of the one or more nickel-rich oxide particles 5403.

Figure 55:
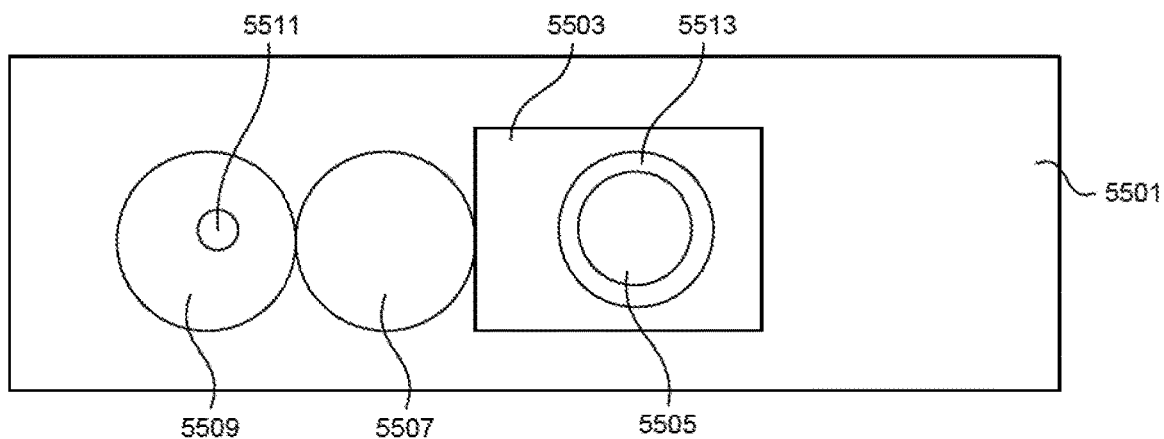
FIG. 55 shows a schematic representation of an electrode including one or more active materials including one or more nickel-rich oxide particles, a conductive material to transport electrons, and a binder including a polymer in accordance with various aspects of the present disclosure.

FIG. 55 shows a schematic representation of an example of an electrode 5501 including one or more active materials 5503 including one or more nickel-rich oxide particles 5505, a conductive material 5507 to transport electrons, and a binder 5509 including a polymer 5511. The binder 5509 binds the one or more active materials 5503 including the one or more nickel-rich oxide particles 5505 and the conductive material 5507. A film 5513 including fluorine, oxygen, sulfur, carbon, and lithium is formed on substantially all of the one or more nickel-rich oxide particles 5505.

Figure 56:
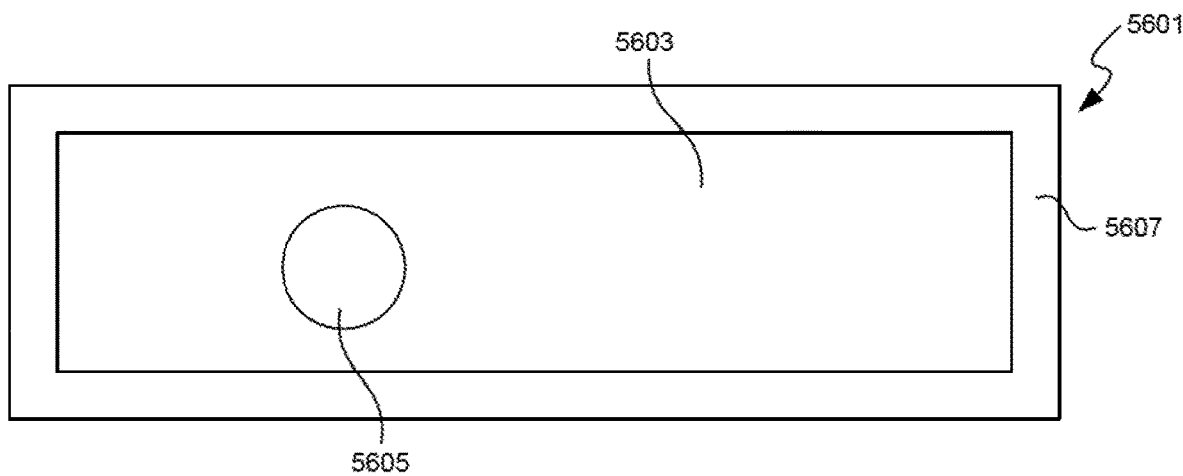
FIG. 56 shows a schematic representation of a coated electrode prepared by exposing an electrode including a nickel-rich oxide material to an imide-based RTIL under conditions where a film forms on the electrode in accordance with various aspects of the present disclosure.

FIG. 56 shows a schematic representation of an example of a coated electrode 5601 prepared by exposing an electrode 5603 including a nickel-rich oxide material 5605 to an imide-based room temperature ionic liquid under conditions where a film 5607 forms on the electrode.

Data

Figure 57A:
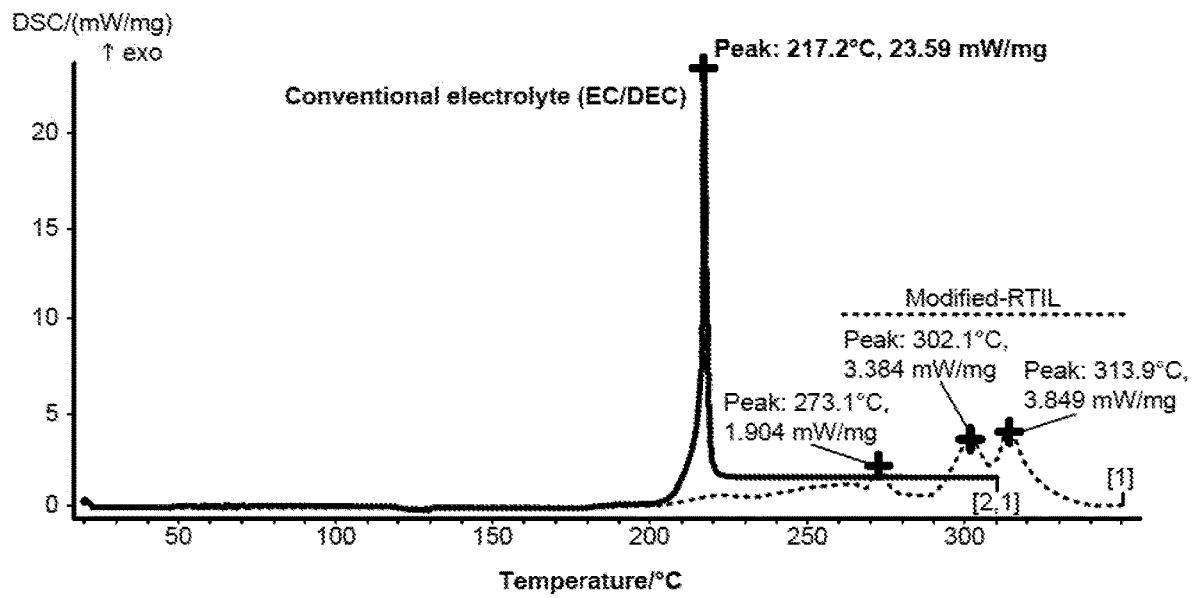
FIG. 57A shows differential scanning calorimetry (DSC) data for a NMC[811]/(RTIL+LiPF$_6$) and NMC[811]/carbonate electrolyte systems.
Figure 57B:
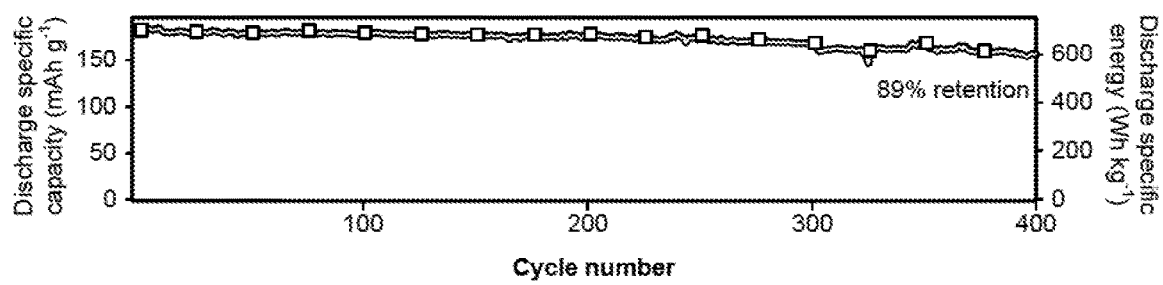
FIG. 57B shows cycling data for NMC[622]/RTIL systems.
Figure 57C:
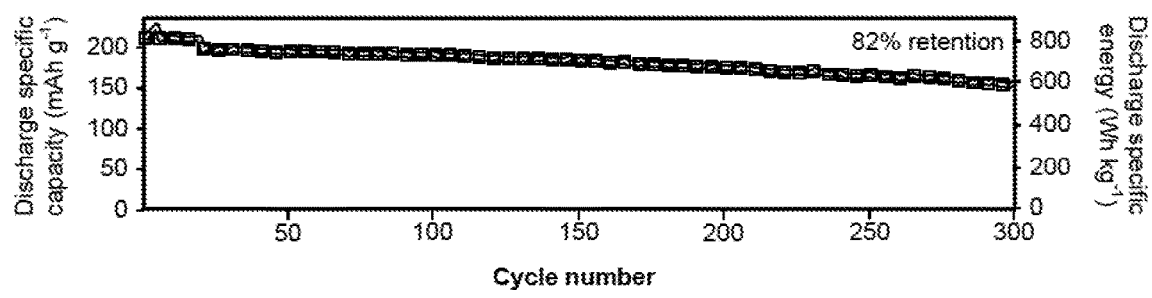
FIG. 57C shows cycling data for NMC[811]/RTIL systems.

FIG. 57 shows data 5700 for a NMC/RTIL system. The enhanced thermal stability of the [811] chemistry during DSC is shown in (a). The high capacity and energy retention of the NMC[622] material is shown in (b). And The high capacity and energy retention of the NMC[811] material is shown in (c).

The dual functionality of the PYR$_{13}$FSI (1.2M LiFSI) electrolyte enables the Si/NMC[622] full-cell lithium-ion battery, which is integral to various embodiments described herein. Based on these findings, safety advantages of using RTIL electrolytes with nickel-rich electrodes were determined, whose breakdown products at high temperatures are known to react explosively with conventional electrolytes. The modified-RTIL electrolytes (containing low concentrations of sacrificial fluorinated salt additives) results in thermal stability of the NMC[811] chemistry. FIG. 57(a) presents differential scanning calorimetry (DSC) results of delithiated, wet NMC[811] electrodes. While a large exotherm peaks at <220° C. in conventional electrolytes, use of a fluorinated/modified RTIL electrolyte lessens the magnitude of the exotherm and moves it to high temperatures of ~300° C. These DSC results infer that the NMC[811]/modified RTIL system is safer than the conventional NMC[622] systems.

Figure 58A:
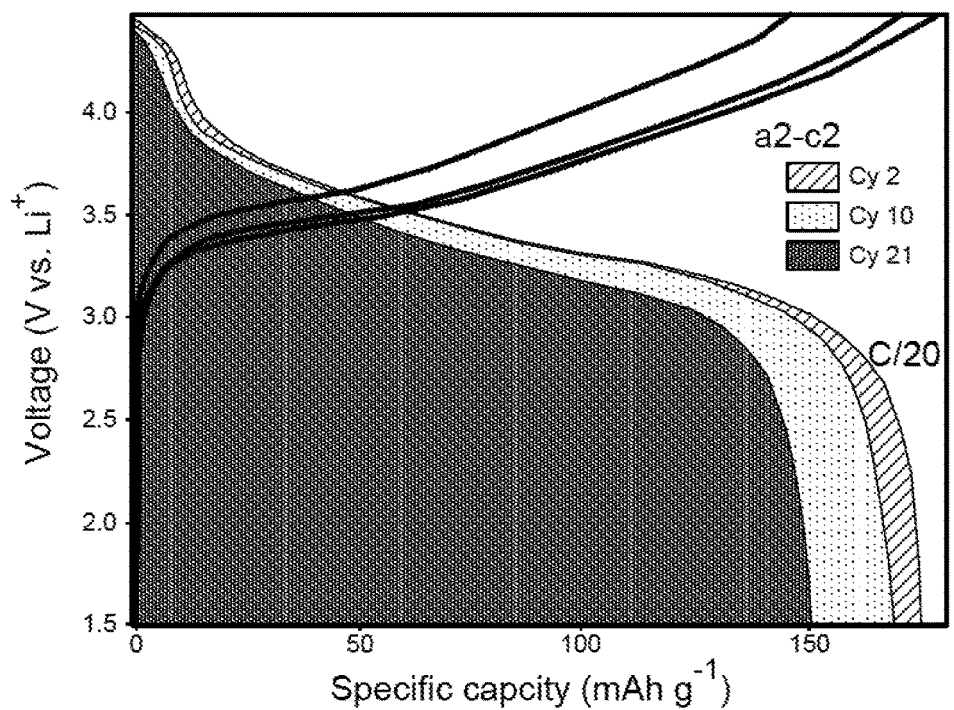
FIGS. 58A-58B show graphs of Ni-rich NMC[622]/μSi:PAN (8:2) full-cell cycled in RTIL PYR$_{13}$FSI (1.2M LiFSI) electrolyte, with voltage profiles and energies shown at various rates.
Figure 58B:
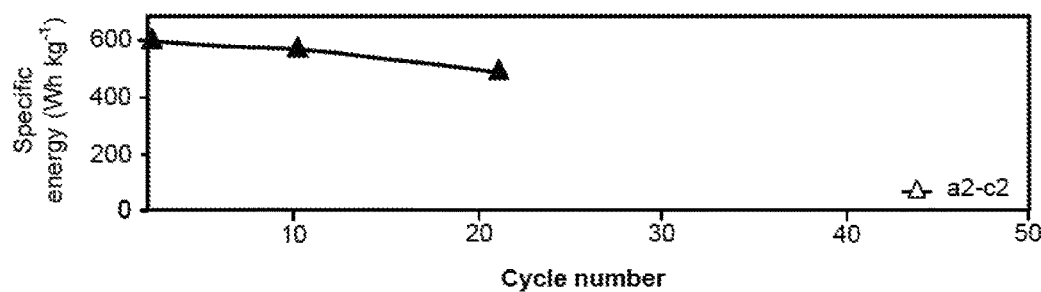

FIGS. 58A and 58B show graphs 5800A and 5800B of Ni-rich NMC[622]/μSi:PAN (8:2) full-cell cycled in PYR$_{13}$FSI (1.2M LiFSI) electrolyte, with voltage profiles and energies shown at various rates. FIG. 58A shows the high degree of stability in the voltage trace of the NMC[622]/micron-silicon chemistry in the imide-based electrolyte, showing no significant degradation or voltage fade. This indicates the phase stability of the materials as well as the absence of growing overpotentials due to interfacial instabilities. FIG. 58B shows the high degree of stability in cycling energy of the NMC[622]/micron-silicon chemistry in the imide-based electrolyte, showing no significant degradation.

Figure 58C:
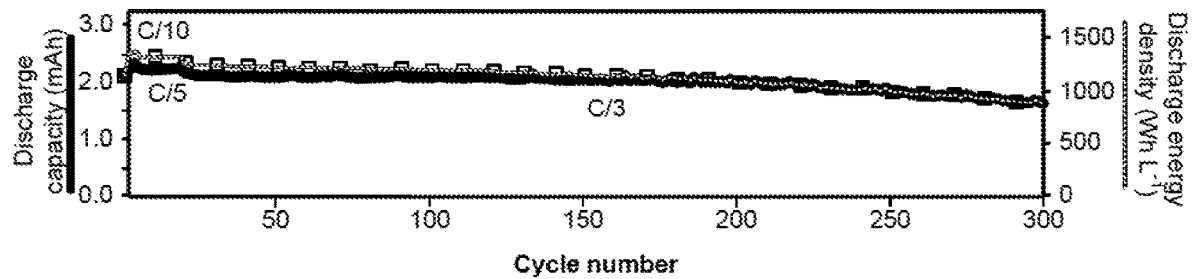
FIG. 58C shows a graph for μSi/NMC[622] full-cell technology, cycled in a high purity modified-RTIL (mRTIL) electrolyte.

FIG. 58C shows a graph 5800C for μSi/NMC[622] full-cell technology, cycled in a high purity modified-RTIL (mRTIL) electrolyte. The technology demonstrates a capacity and energy retention of >80% over 300 cycles (100% depth of discharge) at a C/3 rate. In FIG. 58C, the specific energy is normalized to electrode film thickness.

Figure 59A:
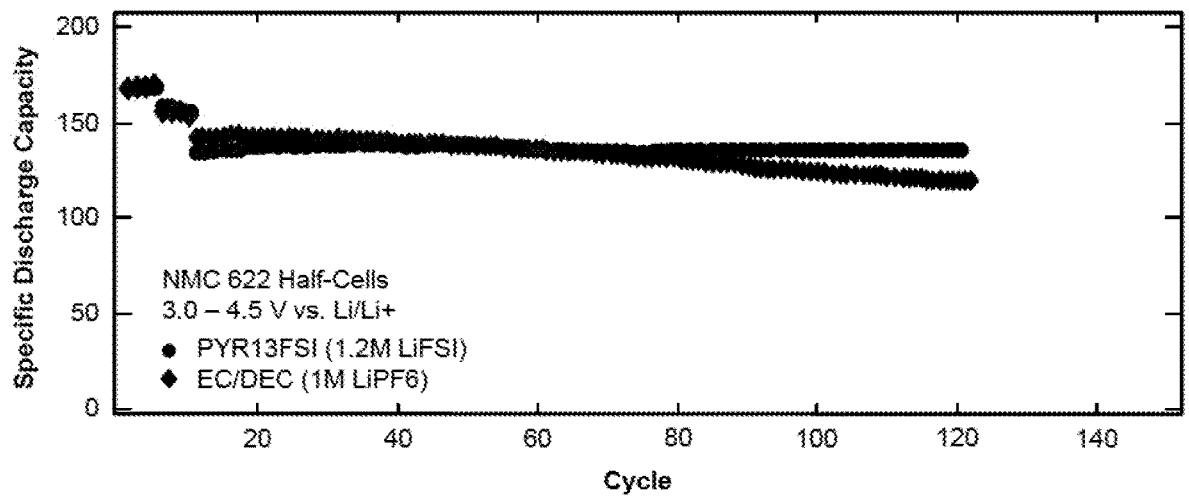
FIG. 59A shows a graph of specific discharge capacity versus cycles for NMC[622] half-cells at 3.0-4.5 V vs. Li/Li+.

FIG. 59A shows a graph 5900A of specific discharge capacity versus cycles for NMC[622] half-cells at 3.0-4.5 V vs. Li/Li+. The graph shows the high degree of stability of the NMC[622] material in the imide-based RTIL electrolyte cycled at high voltages (up to 4.5 V), while the NMC[622] material degrades in conventional electrolytes, as observed by the downward slope of the capacity curve for the conventional electrolyte.

Figure 59B:
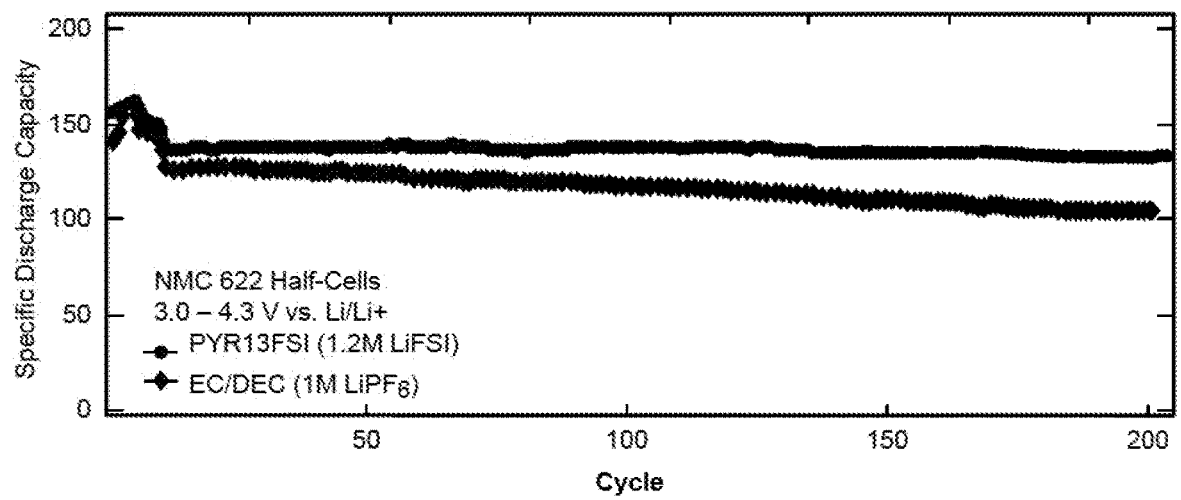
FIG. 59B shows a graph of specific discharge capacity versus cycles for NMC[622] half-cells at 3.0-4.3 V vs. Li/Li$^+$.

FIG. 59B shows a graph 5900B of specific discharge capacity versus cycles for NMC[622] half-cells at 3.0-4.3 V vs. Li/Li$^+$. The graph shows the high degree of stability of the NMC[622] material in the imide-based RTIL electrolyte cycled at typical voltages (up to 4.3 V), while the NMC[622] material degrades in conventional electrolytes, as observed by the downward slope of the capacity curve for the conventional electrolyte.

Figure 60A:
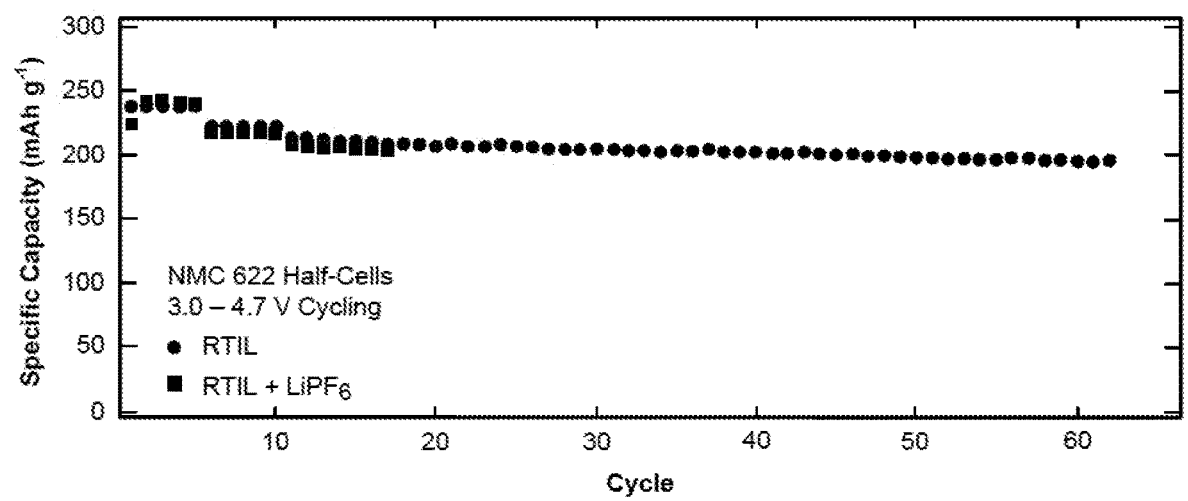
FIG. 60A shows a graph of specific discharge capacity versus cycles for NMC[622] half-cells at 3.0-4.7 V vs. Li/Li$^+$.

FIG. 60A shows a graph 6000A of specific discharge capacity versus cycles for NMC[622] half-cells at 3.0-4.7 V vs. Li/Li$^+$. The graph shows the surprisingly high degree of stability of the NMC[622] material in the imide-based RTIL electrolyte cycled at high voltages up to 4.7 V, with added stability attained by utilizing the LiPF$_6$ additive.

Figure 60B:
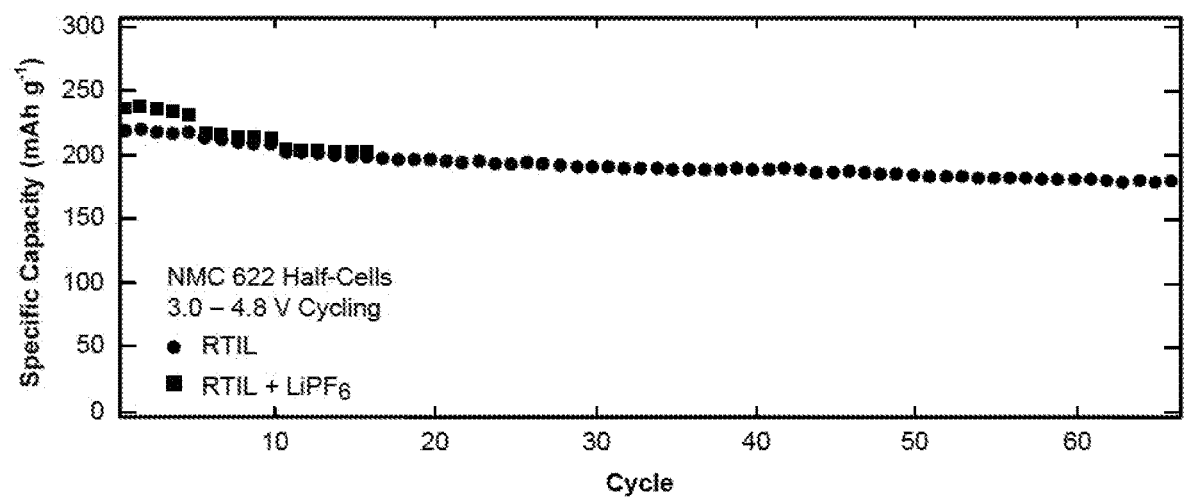
FIG. 60B shows a graph of specific discharge capacity versus cycles for NMC[622] half-cells at 3.0-4.8 V vs. Li/Li$^+$.

FIG. 60B shows a graph 6000B of specific discharge capacity versus cycles for NMC[622] half-cells at 3.0-4.8 V vs. Li/Li$^+$. The graph shows the surprisingly high degree of stability of the NMC[622] material in the imide-based RTIL electrolyte cycled at high voltages up to 4.8 V, with added stability attained by utilizing the LiPF$_6$ additive.

Figure 61A:
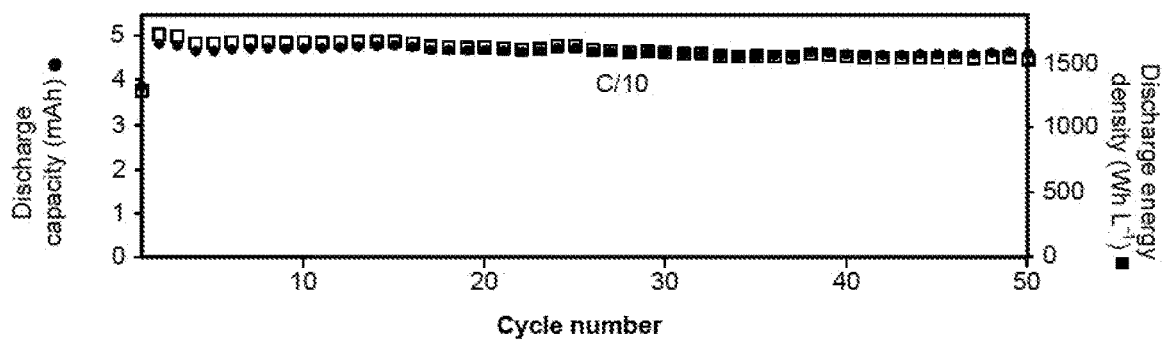
FIGS. 61A-61C show data related to the full-cell electrochemical performance of a Si-cPAN/LMR system with an optimized RTIL electrolyte.
Figure 61B:
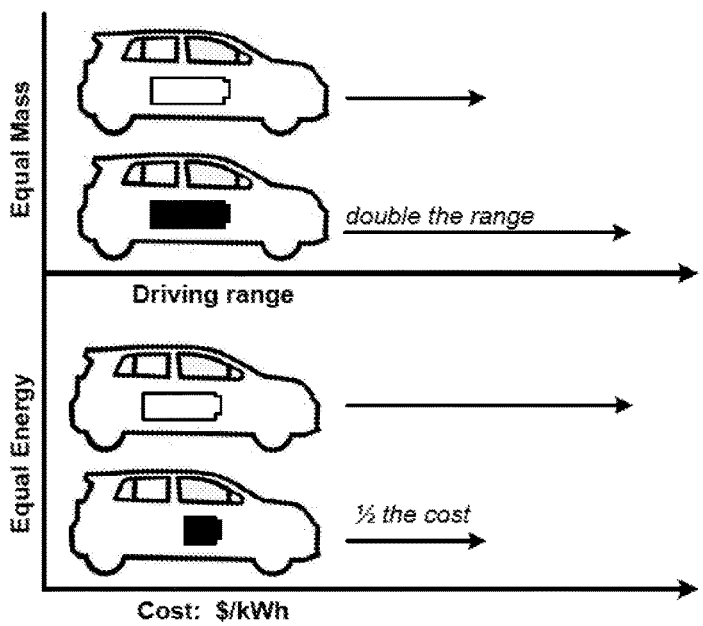
Figure 61C:
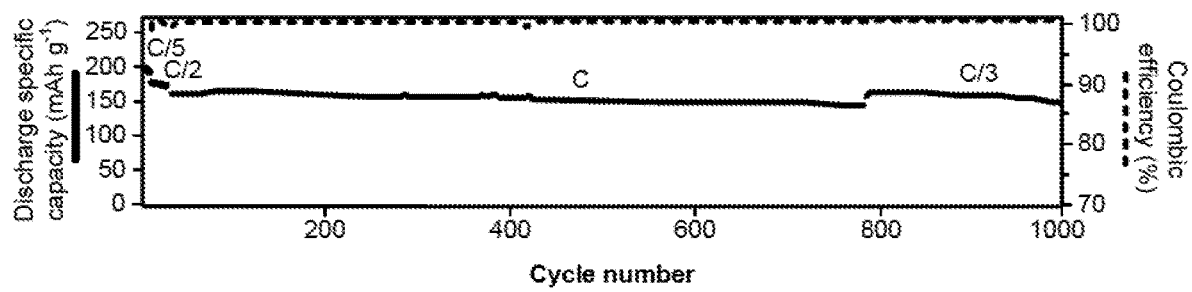

FIGS. 61A-61C show data related to the full-cell electrochemical performance of a Si-cPAN/LMR system with an optimized RTIL electrolyte. FIG. 61A shows specific capacities and energy density (normalized to total electrode volume) 6100A of micronSi-cPAN/LMR full-cell with high mass loading (>20 mg total active material) assembled with PYR$_{13}$FSI (1.2M LiFSI, 0.1M LiPF$_6$) electrolyte. FIG. 61B shows animation frames 6100B depicting the range and cost benefits of moving to the Si/LMR electrode chemistry. FIG. 61C shows long-term specific capacities and coulombic efficiencies 6100C of SiNW-cPAN/LMR full-cell assembled with PYR$_{13}$FSI (1.2M LiFSI, 0.1M LiPF$_6$) electrolyte. All cycling for the data of FIGS. 61A-61C was carried out at room temperature in 2032 coin-type cells operated between 1.5-4.65 V (vs. Li/Li$^+$).

FIGS. 61A-61C present demonstrations of the long-term, high energy cycling of Li-ion full-cells containing a high performance Si anode and a LMR cathode. FIG. 61A presents a micronSi-cPAN/LMR full-cell, coin-type configuration, containing >20 mg of LMR active material, representing the performance of the Si/m-RTIL/LMR system with commercially viable mass loadings. This cell retains >90% of its first discharge energy density at its 50th discharge, proving that the early-cycling half-cell energy retention behavior propagates into truly exceptional full-cell performance. Such a cell was included to draw attention to the ability of RTIL-based electrolytes to fully wet thick, calendared electrode composites and to begin dispelling the stigmas associated with RTIL viscosity. This cell is run at the C/10 rate. To supplement the demonstration of a non-flammable 5 mAh coin-type Si/LMR full-cell, a LMR/m-RTIL system may be combined with ultra-stable nano-wire Si anode system (SiNW-cPAN). This full-cell, as shown in FIG. 61C, maintains 90.84% capacity over more than 750 cycles at the 10 rate, leveraging both the high rate performance and stability of the SiNW-cPAN anode system and the stability of the LMR/m-RTIL cathode system, and retains greater than 84% capacity over 1000 cycles at various rates. This cycling performance is well within the Department of Energy Vehicle Technology Office's (DOE VTO) LIB performance requirements (>80% retention @ 1000 cycles with 80% DoD).

Methods for Formation Cycles

Figure 62A:
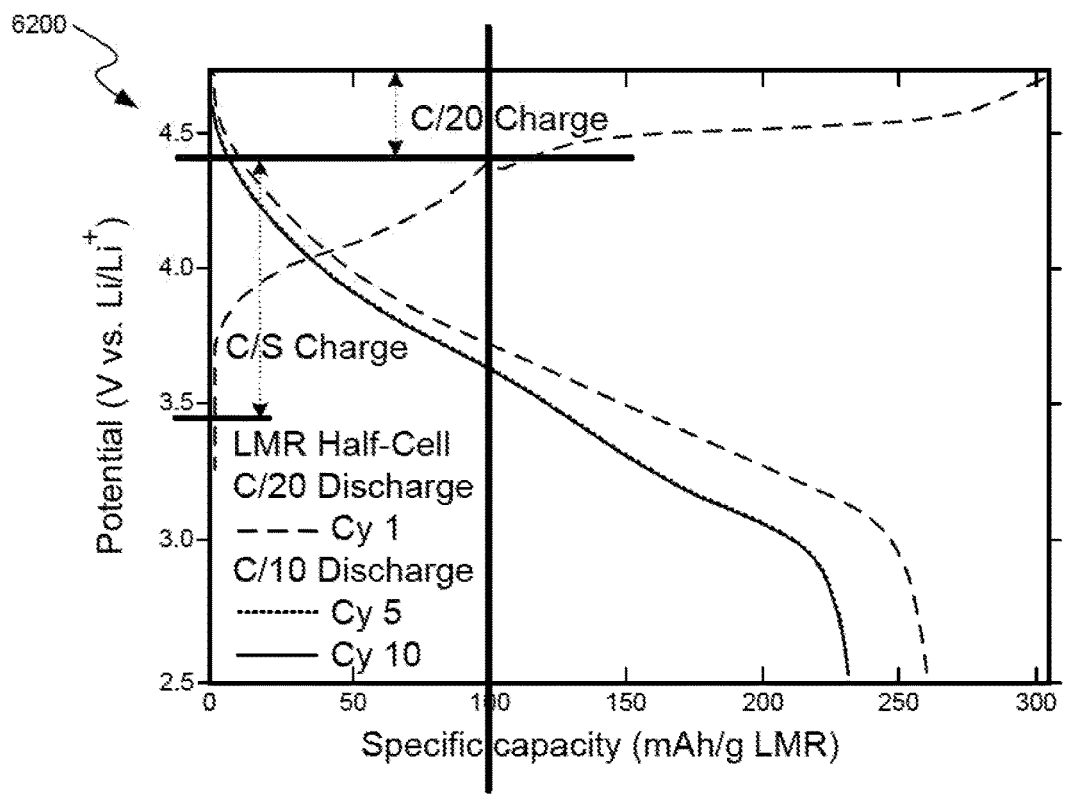
FIG. 62 shows data 6200 related to a method of activating the LMR material.
Figure 62B:
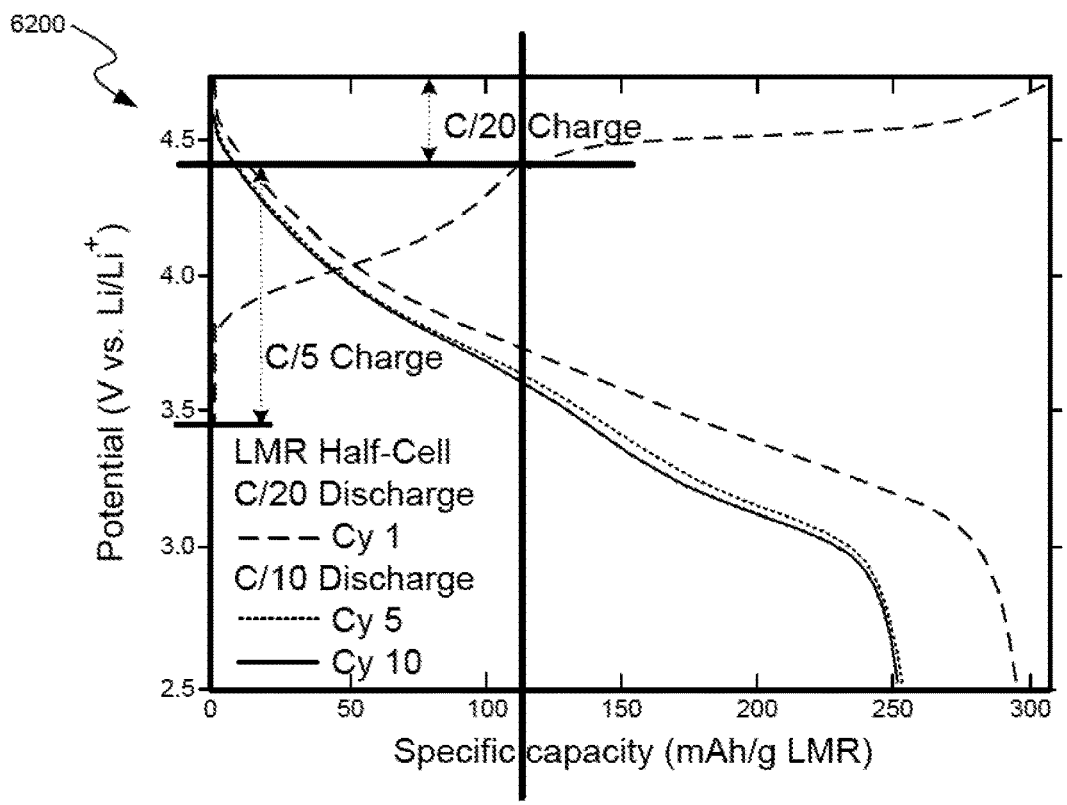

Full-cells containing non-preconditioned electrodes should undergo formation cycling prior to regular use. Formation cycling involves cycling as-made full-cells very slowly so as to enable adequate SEI/CEI formation. Formation cycling includes up to 10 cycles of rates as slow as C/80 (80 hour full discharge and 80 hour full charge). Formation cycling also includes a method of activating the LMR material by charging to 4.4 V at a faster rate (including C/5, C/2, or 1 C) and then charging to 4.7 V at the C/20 rate. FIG. 62 shows data 6200 related to the method of activating the LMR material. This method extracts less Li from the LiMO$_2$ component in the LMR cathode, leaving fewer vacancies for TM migration and thereby inducing high degrees of phase stability and mitigation of voltage fade as shown in FIG. 62. This method provides early cycling stability in both RTIL and conventional electrolytes.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. An energy storage device comprising:
   an anode including a plurality of active material particles, each of the plurality of active material particles having a particle size of between about one micrometer and about fifty micrometers, wherein one or more of the plurality of active material particles are enclosed by and in contact with a coating permeable to lithium ions;
   a cathode including a transition metal oxide material; and
   an electrolyte coupling the anode to the cathode, wherein the electrolyte comprises a room temperature ionic liquid solvent and a salt.

2. The energy storage device of claim 1, wherein the plurality of active material particles comprise a plurality of silicon particles.

3. The energy storage device of claim 1, wherein the anode comprises one or more of hard-carbon, graphite, tin, and germanium particles mixed with the plurality of active material particles.

4. The energy storage device of claim 1, wherein the coating comprises a polyacrylonitrile coating.

5. The energy storage device of claim 1, wherein the transition metal oxide material comprises an over-lithiated oxide material.

6. The energy storage device of claim 1, wherein the transition metal oxide material has a formula (x)Li$_2$MnO$_2$(1-x)LiR$_1$O$_2$, where R$_1$ is at least one of Mn, Ni, Co, and a cation or anion dopant, and x is greater than zero and less than one.

7. The energy storage device of claim 1, wherein the transition metal oxide material has a formula LiR$_x$M$_y$O$_2$, where R is Ni, M is at least one of Mn, Ni, Co, Al, and a cation or anion dopant, and x+y=1 where x is greater than 0.33 and less than 0.91.

8. The energy storage device of claim 1, wherein the solvent comprises a bisfluorosulfonylimide solvent anion and the salt comprises a lithium bisfluorosulfonylimide salt.

9. The energy storage device of claim 1, wherein the electrolyte further comprises an additive selected from at least one of a fluorinated cosolvent additive, a fluorinated lithium cosalt additive, and a lithium metal powder additive.

10. The energy storage device of claim 1, wherein the electrolyte further comprises an additive selected from at least one of fluoroethylene carbonate, di-(2,2,2 trifluoroethyl) carbonate, lithium hexafluorophosphate, lithium fluoride, lithium tetrafluoroborate, lithium difluoro(oxalato)borate, lithium difluoro(sulfate)borate, and stabilized lithium metal powder.

11. The energy storage device of claim 1, wherein substantially all of the transition metal oxide material is coated by a film including fluorine, sulfur, and at least one of oxygen, carbon, phosphorus, and lithium, the film blocking surface degradation of the transition metal oxide material by the electrolyte.

12. A method for cycling an anode in an energy storage device, comprising:
providing an energy storage device having an anode including a plurality of active material particles having particle sizes of between about one micrometer and about fifty micrometers, wherein one or more of the plurality of active material particles are enclosed by and in contact with a polyacrylonitrile coating permeable to lithium ions, and an electrolyte comprising a room temperature ionic liquid solvent and a salt; and
initiating a reaction in the energy storage device by:
discharging the energy storage device; and
recharging the energy storage device,
wherein discharging and recharging the energy storage device pulverizes the plurality of active material particles into a plurality of pulverized particles having particle sizes of between about 10 nanometers and about 500 nanometers, and
wherein one or more of the plurality of pulverized particles are enclosed by and in contact with the polyacrylonitrile coating.

13. The method of claim 12, wherein the plurality of active material particles comprise a plurality of silicon particles.

14. The method of claim 12, wherein the anode comprises one or more of hard-carbon, graphite, tin, and germanium particles mixed with the plurality of active material particles.

15. The method of claim 12, wherein the coating comprises a cyclized polyacrylonitrile coating.

16. A method for cycling a cathode in an energy storage device, comprising:
providing an energy storage device having a cathode including a transition metal oxide material and an electrolyte comprising a room temperature ionic liquid solvent and a salt;
initiating a reaction in the energy storage device by:
charging the energy storage device; and
discharging the energy storage device,
wherein charging and discharging the energy storage device forms a film including fluorine, sulfur, and at least one of oxygen, carbon, phosphorus, and lithium on substantially all of the transition metal oxide material, the film blocking surface degradation of the transition metal oxide material by the electrolyte.

17. The method of claim 16, wherein the transition metal oxide material comprises an over-lithiated oxide material.

18. The method of claim 16, wherein the transition metal oxide material has a formula $(x)Li_2MnO_2(1-x)LiR_1O_2$, where $R_1$ is at least one of Mn, Ni, Co, and a cation or anion dopant, and x is greater than zero and less than one.

19. The method of claim 16, wherein the transition metal oxide material comprises a nickel-rich oxide material.

20. The method of claim 16, wherein the transition metal oxide material has a formula LiRxMyO2, where R is Ni, M is at least one of Mn, Ni, Co, Al, and a cation or anion dopant, and x+y=1 where x is greater than 0.3 and less than 0.9.

21. The method of claim 16, wherein the solvent comprises a bisfluorosulfonylimide solvent anion and the salt comprises a lithium bisfluorosulfonylimide salt.

22. The method of claim 16, wherein the electrolyte further comprises an additive selected from at least one of a fluorinated cosolvent additive, a fluorinated lithium cosalt additive, and a lithium metal powder additive.

23. The method of claim 16, wherein the electrolyte further comprises an additive selected from at least one of fluoroethylene carbonate, di-(2,2,2 trifluoroethyl) carbonate, lithium hexafluorophosphate, lithium fluoride, lithium tetrafluoroborate, lithium difluoro (oxalato) borate, lithium difluoro (sulfate) borate, and stabilized lithium metal powder.

24. The energy storage device of claim 4, wherein the polyacrylonitrile coating is a cyclized polyacrylonitrile coating.

* * * * *